US012786981B2

(12) United States Patent
Newman et al.

(10) Patent No.: US 12,786,981 B2
(45) Date of Patent: Nov. 3, 2026

(54) ULTRA-LEAN BEAM OPTIMIZATION IN 5G AND 6G

(71) Applicants: David E. Newman, Poway, CA (US); R. Kemp Massengill, Palos Verdes, CA (US)

(72) Inventors: David E. Newman, Poway, CA (US); R. Kemp Massengill, Palos Verdes, CA (US)

( * ) Notice: Subject to any disclaimer, the term of this patent is extended or adjusted under 35 U.S.C. 154(b) by 286 days.

(21) Appl. No.: 18/771,802

(22) Filed: Jul. 12, 2024

(65) Prior Publication Data

US 2024/0373416 A1 Nov. 7, 2024

Related U.S. Application Data

(63) Continuation of application No. 18/461,764, filed on Sep. 6, 2023, now Pat. No. 12,069,635, which is a (Continued)

(51) Int. Cl.
*H04W 72/044* (2023.01)
*H04B 7/0426* (2017.01)
(Continued)

(52) U.S. Cl.
CPC .......... *H04W 72/046* (2013.01); *H04B 7/043* (2013.01); *H04B 7/0639* (2013.01); (Continued)

(58) Field of Classification Search
CPC ................ H04B 17/382; H04B 7/0639; H04B 7/06952; H04B 17/373; H04B 7/043; H04B 7/0617; H04W 52/325; H04W 52/48; H04W 72/542; H04W 72/046; H04W 52/241; H04W 74/0833; H04W 52/50; H04W 24/06; H04W 24/10; H04W 24/02; H04W 52/146
See application file for complete search history.

(56) References Cited

U.S. PATENT DOCUMENTS 11,533,098 B2 12/2022 Pezeshki
11,546,029 B2 1/2023 Soriaga
(Continued)

*Primary Examiner* — Syed Ali

(57) ABSTRACT

Optimization of transmission beams in 5G/6G requires feedback to the transmitting entity. Current beam alignment/optimization methods are so complex and resource-intensive, that users often delay re-alignment even when required by to changing conditions. Therefore, methods are provided for a transmitter to add two brief, single-resource-element test signals, with slightly different transmission parameters (such as direction), to the end each message. The receiver selects which test signal, or the message itself, that has the best signal, and informs the transmitter using a terse bit-level acknowledgement code. The reception beam must also be aligned, generally without feedback. The transmitter provides a series of identical signals, sequentially in time, while the receiver varies its reception beam parameters while measuring the signal level and optimizing its reception parameters. Both transmitter and receiver can thereby align their beams and optimize their beam parameters for the best communications, at negligible resource cost.

11 Claims, 18 Drawing Sheets

Related U.S. Application Data continuation of application No. 18/215,192, filed on Jun. 28, 2023, now Pat. No. 11,832,118, which is a continuation of application No. 18/191,015, filed on Mar. 28, 2023, now Pat. No. 11,871,254.

(60) Provisional application No. 63/451,722, filed on Mar. 13, 2023, provisional application No. 63/448,422, filed on Feb. 27, 2023, provisional application No. 63/447,167, filed on Feb. 21, 2023, provisional application No. 63/444,380, filed on Feb. 9, 2023, provisional application No. 63/441,488, filed on Jan. 27, 2023, provisional application No. 63/426,853, filed on Nov. 21, 2022, provisional application No. 63/418,784, filed on Oct. 24, 2022, provisional application No. 63/327,007, filed on Apr. 4, 2022.

(51) Int. Cl.

| | |
|---|---|
| ***H04B 7/06*** | (2006.01) |
| ***H04B 17/373*** | (2015.01) |
| ***H04B 17/382*** | (2015.01) |
| ***H04W 24/02*** | (2009.01) |
| ***H04W 24/06*** | (2009.01) |
| ***H04W 24/10*** | (2009.01) |
| ***H04W 52/24*** | (2009.01) |
| ***H04W 72/542*** | (2023.01) |
| ***H04W 74/0833*** | (2024.01) |

(52) U.S. Cl.

CPC ....... *H04B 7/06952* (2023.05); *H04B 17/373* (2015.01); *H04B 17/382* (2015.01); *H04W 24/02* (2013.01); *H04W 24/06* (2013.01); *H04W 24/10* (2013.01); *H04W 52/241* (2013.01); *H04W 72/542* (2023.01); *H04W 74/0833* (2013.01)

(56) References Cited

U.S. PATENT DOCUMENTS

| | | | | |
|---|---|---|---|---|
| 11,563,548 | B2 | 1/2023 | Hammarwall | |
| 2011/0268063 | A1 | 11/2011 | Hammarwall | |
| 2012/0183021 | A1 | 7/2012 | Watanabe | |
| 2014/0140229 | A1 | 5/2014 | Fujita | |
| 2018/0054744 | A1 | 2/2018 | Smith | |
| 2018/0138962 | A1 | 5/2018 | Islam | |
| 2018/0199226 | A1 | 7/2018 | Tsai | |
| 2020/0008226 | A1* | 1/2020 | Sano | H04B 7/0617 |
| 2020/0076648 | A1* | 3/2020 | Li | H04B 17/345 |
| 2020/0106502 | A1 | 4/2020 | Wang | |
| 2020/0128488 | A1* | 4/2020 | Zhou | H04B 7/0617 |
| 2020/0137592 | A1* | 4/2020 | Guo | H04B 7/02 |
| 2020/0162144 | A1* | 5/2020 | Zhou | H04L 5/0048 |
| 2020/0220676 | A1* | 7/2020 | Xu | H04W 72/04 |
| 2020/0260477 | A1* | 8/2020 | Kim | H04L 1/1812 |
| 2020/0376861 | A1 | 12/2020 | Kawajiri | |
| 2021/0029641 | A1 | 1/2021 | Khoshnevisan | |
| 2021/0144653 | A1 | 5/2021 | Jang | |
| 2021/0337426 | A1 | 10/2021 | Lee | |
| 2021/0352643 | A1 | 11/2021 | Ahn | |
| 2022/0070940 | A1 | 3/2022 | Taherzadeh Boroujeni | |
| 2022/0086671 | A1 | 3/2022 | Hong | |
| 2022/0141678 | A1 | 5/2022 | Newman | |
| 2022/0141773 | A1 | 5/2022 | Newman | |
| 2022/0182992 | A1 | 6/2022 | Kim | |
| 2022/0231740 | A1 | 7/2022 | Bhat | |
| 2022/0231900 | A1 | 7/2022 | Newman | |
| 2022/0286186 | A1 | 9/2022 | Newman | |
| 2022/0303048 | A1 | 9/2022 | Yang | |
| 2022/0321186 | A1 | 10/2022 | Elshafie | |
| 2022/0321250 | A1 | 10/2022 | Kim | |
| 2022/0352950 | A1 | 11/2022 | Faxer | |
| 2022/0360307 | A1 | 11/2022 | Matsumura | |
| 2022/0376759 | A1 | 11/2022 | Rahman | |
| 2022/0386375 | A1 | 12/2022 | Uesaka | |
| 2022/0400044 | A1 | 12/2022 | Paz | |
| 2023/0023210 | A1 | 1/2023 | Manolakos | |
| 2023/0033864 | A1 | 2/2023 | Shellhammer | |
| 2023/0035886 | A1 | 2/2023 | Chen | |
| 2023/0043847 | A1 | 2/2023 | Haustein | |
| 2023/0057684 | A1 | 2/2023 | Newman | |
| 2024/0089924 | A1* | 3/2024 | Yang | H04L 1/1854 |
| 2024/0171322 | A1* | 5/2024 | Balasubramanian | H04L 1/1864 |

* cited by examiner

ULTRA-LEAN BEAM OPTIMIZATION IN 5G AND 6G

PRIORITY CLAIMS AND RELATED APPLICATIONS

This application is a continuation of U.S. patent application Ser. No. 18/461,764, entitled "Resource-Efficient Low-Complexity Beamforming Feedback in 5G/6G", filed Sep. 6, 2023, which is a continuation of U.S. patent application Ser. No. 18/215,192, entitled "Beam Adjustment by Incremental Feedback in 5G and 6G", filed Jun. 28, 2023, which is a continuation of U.S. patent application Ser. No. 18/191,015, entitled "Incremental Realtime Signal-Quality Feedback in 5G/6G", filed Mar. 28, 2023, which claims the benefit of U.S. Provisional Patent Application Ser. No. 63/327,007, entitled "Modulation Including Zero-Power States in 5G and 6G", filed Apr. 4, 2022, and U.S. Provisional Patent Application Ser. No. 63/418,784, entitled "Demodulation for Phase-Noise Mitigation in 5G and 6G", filed Oct. 24, 2022, and U.S. Provisional Patent Application Ser. No. 63/426,853, entitled "Multiplexed Amplitude-Phase Modulation for 5G/6G Noise Mitigation", filed Nov. 21, 2022, and U.S. Provisional Patent Application Ser. No. 63/441,488, entitled "Multiplexed Code for ACK/SR/Power/Beam Feedback in 5G and 6G", filed Jan. 27, 2023, and U.S. Provisional Patent Application Ser. No. 63/444,380, entitled "Concise Feedback for Downlink Beam and Power Adjustment in 5G and 6G", filed Feb. 9, 2023, and U.S. Provisional Patent Application Ser. No. 63/447,167, entitled "Incremental Realtime Signal-Quality Feedback in 5G/6G", filed Feb. 21, 2023, and U.S. Provisional Patent Application Ser. No. 63/448,422, entitled "AI-Managed Channel Quality Feedback in 5G/6G", filed Feb. 27, 2023, and U.S. Provisional Patent Application Ser. No. 63/451,722, entitled "Lean Deterministic Beam/Power Feedback During 5G/6G Initial Access", filed Mar. 13, 2023, all of which are hereby incorporated by reference in their entireties.

FIELD OF THE INVENTION

The disclosure pertains to wireless messaging, and more particularly to methods and formats for providing feedback on signal quality.

BACKGROUND OF THE INVENTION

Wireless messages are required to reach the recipient antenna with sufficient amplitude for reliable reception. Certain messages, such as CSI (channel-state information) messages, can provide some of the needed feedback, but using bulky complex formats that may be difficult for reduced-capability user devices to manage. What is needed is a compact low-complexity message format that provides sufficient information to the transmitter while consuming minimal resources.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

In a first aspect, there is a method for a first wireless entity to communicate with a second wireless entity, the method comprising: transmitting a first message concatenated with a "higher" test signal, and a "lower" test signal, wherein the downlink message is transmitted with an initial value of a transmission parameter, the higher test signal is transmitted with a higher value of the transmission parameter higher than the initial value, and the lower test signal is transmitted with a lower value of the transmission parameter lower than the initial value; receiving a feedback message from the second wireless entity indicating that the first message, or the higher test signal, or the lower test signal, was received with a best signal quality; adjusting the transmission parameter to an adjusted value, according to the feedback message; and transmitting an acknowledgement message to the second wireless entity according to the adjusted value of the transmission parameter.

In another aspect, there is a method for a user device of a wireless network to communicate with a base station of the wireless network, the method comprising: receiving a downlink message concatenated with two or more test signals, wherein each test signal is transmitted using a different value of a transmission parameter; selecting a selected test signal that is received with a highest signal quality of the two or more test signals; and transmitting, to the base station, a feedback message specifying the selected test signal.

In another aspect, there is a method for a user device of a wireless network comprising a base station, the method comprising: receiving a system information message broadcast by the base station; receiving a plurality of identically transmitted signals, transmitted sequentially in time by the base station, concatenated with the system information message; for each particular signal, of the identically transmitted signals: selecting a selected value of a reception parameter; adjusting a reception beam according to the selected value; and determining a received signal quality of the particular signal, as received by the user device with the reception beam adjusted according to the selected value; determining a best-received signal of the plurality of identically transmitted signals; determining a best-received value of the reception parameter corresponding to the best-received signal; and receiving subsequent downlink messages with the reception beam adjusted according to the best-received value.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

BRIEF DESCRIPTION OF THE DRAWINGS

Like reference numerals refer to like elements throughout.

DETAILED DESCRIPTION

Figure 1A:
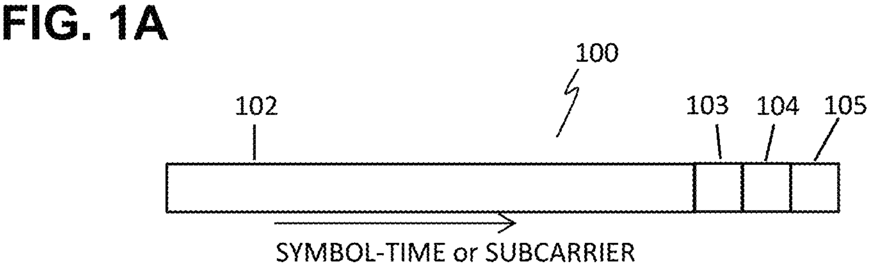
FIG. 1A is a schematic showing an exemplary embodiment of a downlink message with beam test signals, according to some embodiments.

Systems and methods disclosed herein (the "systems" and "methods", also occasionally termed "embodiments" or "arrangements" or "versions" or "examples", generally according to present principles) can provide urgently needed wireless communication protocols for a user device to provide feedback messages to its base station based on the received power or signal quality. In versions disclosed herein, the feedback message may be very brief, may include multiple feedback requests multiplexed in a terse bit-level code, may be combined with an acknowledgement responsive to a downlink message, and may include a scheduling request with optionally a buffer status report appended. The downlink message may include one or more test signals, each test signal transmitted with different transmission properties such as beam angle. The user device may then transmit the feedback message, indicating the best received test signal. In addition, the user device may evaluate the signal quality of the best received test signal, and may include, in the feedback message, a request for an increase or decrease in transmission power according to the received signal quality.

In response to the feedback request, the base station may adjust the transmission parameter incrementally, that is, by a predetermined small increment amount, in the direction requested. For example, the base station can change the transmitted power or the transmission beam angle by a predetermined positive or negative increment, in the direction requested by the user device. Such incremental adjustments may be more efficient and more timely than prior-art messages that attempt to specify a particular power level or beam angle. At its discretion, the base station may change the modulation scheme instead of the power level, such as switching to a modulation scheme with fewer modulation levels or with larger separation between modulation levels. The base station can create and then update a custom set of transmission parameters for each user device, thereby accommodating the user device's reception requirements in realtime.

In addition, user devices in an ad-hoc or sidelink network may provide signal quality feedback to each other using similar test signals and responsive feedback messages. For example, the user devices can provide test signals on initial contact and upon each sidelink message thereafter, and can provide responsive feedback messages concatenated with an acknowledgement or reply message. For example, sensors and actuators communicating with a manager node or with each other in an IoT setting, or mobile user devices in a dense urban environment, can maintain reliable D2D (device-to-device) communications by frequently making incremental adjustments in the transmission parameters (such as frequency, angle, and power) according to each recipient's feedback requests. More specifically, user-A can send a message to user-B including test signals, each test signal transmitted differently. User-B can reply with a feedback message indicating which test signal was best received. User-B can also include a second set of test signals, so user-A can select the best one and send another feedback message to user-B, completing the mutual alignment procedure.

The feedback message may be modulated in a compact modulation scheme that does not require amplitude calibration for reliable demodulation. For example, the feedback message may be configured in 9QAM (quadrature amplitude modulation with nine allowed states) of which one state may be a zero-power state. Alternatively, when the zero-power state would be problematic, the users can use 8QAM which excludes the zero-power state. 8/9QAM can provide a tidy modulation scheme for specifying incremental feedback choices. The data message and the feedback message may be configured as time-spanning (occupying multiple symbol-times at a single subcarrier) or frequency-spanning (occupying multiple subcarriers at a single symbol-time). Examples show how user devices and base stations can obtain enhanced angular precision using very few test signals. Further examples show multiplexed modulation schemes suitable for the feedback messages. For example, test signals may be transmitted in partially overlapping directional beams, thereby enhancing the angular resolution achievable.

Feedback opportunities may be provided with each downlink message by providing test signals in or with the downlink message. In addition, the initial access protocol may include multiple opportunities for the user device to provide signal quality feedback, thereby assisting the base station in aligning the downlink transmission beam toward the user device. In addition, either the user device or the base station may request an alignment and power adjustment by transmitting a "ping" message to the other entity. Downlink test signals concatenated with downlink messages, and feedback indicators concatenated with uplink messages, may thereby enable highly localized and timely feedback, resulting in reliable communication despite fluctuating backgrounds.

While most of the examples are described for adjusting the downlink beam, with the base station transmitting the beam test signals and the user device providing the feedback message, the reverse is often possible. For example, a user device with beamforming capability can provide the test signals, and the base station can provide the feedback message, thereby assisting the user device to optimize its uplink beam. As a further option, a base station, or other network asset, may communicate wirelessly to other network assets (as in IAB-integrated access and backhaul) or with other cells (as in multi-hop transfers and setup), and thus may use the lean multiplexed feedback procedures disclosed herein for improved communication among themselves. Core networks, in wireless communication with each other, can include test signals with backhaul messages, and feedback with reply or acknowledgement messages, so that they maintain sufficient communication reliability as conditions change.

The base station may determine whether or not the test signals and feedback responses should be used, depending on the capabilities and QoS requirements of each user device. Conventions and parameters related to feedback may be specified in system information messages, or initial access messages, or in subsequent uplink or downlink messages such as control messages. For example, mobile user devices that anticipate frequent changes in beam conditions, may request that test signals be provided with each downlink message, thereby providing frequent beam tracking while in motion. In other situations, where conditions remain unchanging for extended periods, the user device or the base station may determine that the frequent feedback messages are not necessary. The two entities can then agree to dispense with test signals and feedback responses until there is a decline in signal quality. In another embodiment, the network may decide to add test signals only to messages larger than a predetermined size, and not to smaller messages (except for "ping" messages, described later). Alternatively, the test signals may be added to messages modulated according to modulation schemes carrying 4 bits per message element or higher, and not to messages with smaller modulation schemes such as QPSK. In each case, the user device may determine, from control messages, whether to expect test signals on each downlink message.

Artificial intelligence and machine learning may be profitably applied in several aspects of the feedback process. For example, an artificial intelligence model, or an algorithm derived from it, may be developed to evaluate the signal quality of each received test signal based on the SNR, the received power or amplitude, the measured interference, and other parameters. Further AI models can manage the incremental adjustment of transmission parameters, such as determining when and by how much to adjust the beam angle or power in response to a user device's feedback. Further AI models may provide assistance in determining when to change the modulation scheme and to which other modulation scheme. These are complex multi-parameter problems of the kind that even expert humans generally do poorly, but which a well-trained AI model may provide improved decision-making in a fraction of the time, at negligible cost after installation.

Signal quality feedback, as disclosed herein, may be beneficial in each wireless communication instance where reliability is important. Transmission beam adaptation using feedback from the recipient may be especially important when external conditions change, such as atmospheric conditions or encroaching interference. Providing incremental feedback on signal quality upon each downlink message may provide enhanced reliability and timely responses to changing conditions, without burdensome signaling and complex encoding. When multiplexed with other requests, such as retransmissions or grant requests, the cost of feedback may be as low as a few resource elements, with each resource element configured to perform multiple tasks, as detailed below.

The examples presented herein are suitable for adoption by a wireless standards organization. Establishing standards for user devices to configure resource-efficient signal-quality feedback messages to the base station, may thereby optimize communication reliability while saving time, resources, and power.

Glossary of Terms

Terms herein generally follow 3GPP (third generation partnership project) standards, but with clarification where needed to resolve ambiguities. As used herein, "5G" represents fifth-generation, and "6G" sixth-generation, wireless technology in which a network (or cell or LAN Local Area Network or RAN Radio Access Network or the like) may include a base station (or gNB or generation-node-B or eNB or evolution-node-B or AP Access Point) in signal communication with a plurality of user devices (or UE or User Equipment or user nodes or terminals or wireless transmit-receive units) and operationally connected to a core network (CN) which handles non-radio tasks, such as administration, and is usually connected to a larger network such as the Internet. The time-frequency space is generally configured as a "resource grid" including a number of "resource elements", each resource element being a specific unit of time termed a "symbol period" or "symbol-time", and a specific frequency and bandwidth termed a "subcarrier". Symbol periods may be termed "OFDM symbols" (Orthogonal Frequency-Division Multiplexing) in which the individual signals of multiple subcarriers are added in superposition. The time domain may be divided into ten-millisecond frames, one-millisecond subframes, and some number of slots, each slot including 14 symbol periods. The number of slots per subframe ranges from 1 to 8 depending on the "numerology" selected. The frequency axis is divided into "resource blocks" including 12 subcarriers, each subcarrier at a slightly different frequency. The "numerology" of a resource grid corresponds to the subcarrier spacing in the frequency domain. Subcarrier spacings of 15, 30, 60, 120, and 240 kHz are defined in various numerologies. Each subcarrier can be independently modulated to convey message information. Thus a resource element, spanning a single symbol period in time and a single subcarrier in frequency, is the smallest unit of a message. "Quadrature" or "QAM" modulation (sometimes "PAM") refers to two signals, separately amplitude-modulated, and then multiplexed and transmitted with a fixed 90-degree phase shift between them. The two signals may be called the "I" and "Q" branch signals (for In-phase and Quadrature-phase) or "real and imaginary" among others. Standard modulation schemes in 5G and 6G include BPSK (binary phase-shift keying), QPSK (quad phase-shift keying), 16QAM (quadrature amplitude modulation with 16 modulation states), 64QAM, 256QAM and higher orders. "SNR" (signal-to-noise ratio) and "SINR" (signal-to-interference-and-noise ratio) are used interchangeably unless specifically indicated. "RRC" (radio resource control) is a control-type message from a base station to a user device. "Digitization" refers to repeatedly measuring a waveform using, for example, a fast ADC (analog-to-digital converter) or the like. An "RF mixer" is a device for multiplying an incoming signal with a local oscillator signal, thereby selecting one component of the incoming signal. Communications generally proceed in scheduled "channels" such as the PUSCH and PUCCH (physical uplink shared and control channels) or the PDSCH and PDCCH (physical downlink shared and control channels) in addition to the PRACH (physical random access channel) and PBCH (physical broadcast channel). System information messages include the SSB (synchronization signal block) and SIB1 (system information block number 1) among others. A BSR (buffer status report) indicates a size of a planned uplink message. "SR" stands for scheduling request. "CSI" (channel-state information) is a message indicating the signal quality obtained in a particular downlink channel with a particular beam configuration. "CSI-RS" is a test signal usually transmitted by the base station. "RSRP" (reference signal received power") is a measure of the signal quality observed by a recipient. "CSI-RSRP" (channel state information-reference signal received power) is a measure or a message indicating the signal quality observed by a user device receiving certain downlink test signals. "SRS" (sounding reference signal) is a measure or a message indicating the signal quality received by a base station from a user device. "IAB" or integrated access and backhaul refers to communication between core networks. "D2D" is device-to-device communication. "AI" is artificial intelligence. "ML" is machine learning. Other terms may be defined when used.

In addition to the 3GPP terms, the following terms are defined. Although in references a modulated resource element of a message may be referred to as a "symbol", this may be confused with the same term for a time interval ("symbol-time"), or a composite waveform or "OFDM symbol" (orthogonal frequency-division multiplexing), among other things. Therefore, each modulated resource element of a message is referred to as a "modulated message resource element", or more simply as a "message element", in examples below. A "demodulation reference" is one or more modulated "reference resource elements" or "reference elements" modulated according to the modulation scheme of the message and configured to exhibit levels of the modulation scheme (as opposed to conveying data), corresponding roughly to DMRS (demodulation reference signals) or "pilot" signals of prior art. A "calibration set" is one or more predetermined amplitude levels and/or phase levels of a modulation scheme, typically determined by a receiver from a demodulation reference. A "short-form" demodulation reference is a demodulation reference that exhibits only selected amplitude levels, such as the maximum and/or minimum amplitude levels, of the modulation scheme, from which the receiver can determine intermediate levels by calculation. A message may be transmitted "time-spanning" by occupying successive symbol-times on a single subcarrier, or "frequency-spanning" by occupying a single symbol-time on multiple subcarriers (not to be confused with time-division duplexing TDD and frequency-division duplexing FDD which pertain to duplexing of message pairs, and have nothing to do with the shape of each message in time-frequency space). "RF" or radio-frequency refers to electromagnetic waves in the MHz (megahertz) or GHz (gigahertz) frequency ranges. The "raw" signal is the as-received waveform before separation of the quadrature branch signals, and includes a raw-signal amplitude and a raw-signal phase. "Phase noise" is random noise or time jitter that alters the overall phase of a received signal, usually without significantly affecting the overall amplitude. "Phase-noise tolerance" or "phase-noise margin" is a measure of how much phase alteration can be imposed on a message element without causing a demodulation fault. "Amplitude noise" includes any noise or interference that primarily affects amplitudes of received signals. Interference due to competing signals is treated as noise herein, unless otherwise specified. A "faulted" message has at least one incorrectly demodulated message element. A "phase fault" is a message element demodulated as a state differing in phase from the intended modulation state, whereas an "amplitude fault" is a message element demodulated as a state differing in amplitude from the intended modulation state. The incoming signal to the receiver may be termed the "raw" waveform or signal, which includes a "raw amplitude" and a "raw phase". The receiver can then process the raw signal by separating it into two orthogonal branches, as mentioned. The receiver can also combine the branch amplitudes to determine a "sum-signal", which is the vector sum of the I and Q branch signals and generally approximates the raw waveform. A vector sum is a sum of two vectors, which in this case represent the amplitudes and phases of the two orthogonal branches in I-Q space. The sum-signal has a "sum-signal amplitude", equal to the square root of the sum of the I and Q branch amplitudes squared (the "root-sum-square" of I and Q), and a "sum-signal phase", equal to the arctangent of the ratio of the I and Q signal amplitudes (plus an optional base phase, ignored herein). Thus the sum-signal represents the raw received waveform of a particular subcarrier, aside from signal processing errors in the receiver-which are generally negligible and are ignored herein. As an alternative to QAM, a message may be modulated in multiplexed amplitude-phase modulation, which generally provides better noise margins than QAM. "Classical" amplitude-phase modulation (sometimes "polar" modulation, "star-QAM", "APSK" amplitude-phase-shift keying, "PQAM" polar QAM, among many others) refers to message elements modulated in both amplitude and phase, wherein both the amplitude and phase carry message data. These jargon terms are avoided herein because they can change over time, and are ambiguous. As used herein, "amplitude-phase modulation" includes all modulation schemes in which the amplitude of a transmitted signal is modulated to carry message data according to a set of predetermined amplitude levels, and the phase is modulated to carry message data according to a set of predetermined, equally-spaced, phase levels. Hence PSK schemes are excluded since they fail to encode message data in the amplitude, and QAM schemes are excluded since they fail to encode message data in the phase. An "isotropic" or "non-directional" or "omnidirectional" beam has substantially uniform intensity around a horizontal 360 degrees.

As used herein, a "test signal" is a transmission with a predetermined beam configuration. The receiver can measure the signal quality received during each test signal. Test signals may be configured as demodulation references or phase-tracking reference signals. Test signals may be concatenated with other messages such as acknowledgements, grant requests, uplink data messages, and so forth. A "feedback message" is a short message transmitted in response to a test signal. The feedback may be configured to select one particular test signal that provides the best reception, from a plurality of test signals. Test signals are roughly analogous to the CSI-RS of prior art, but with greater versatility and much lower resource consumption. Likewise feedback messages correspond to CSI but with many advantages detailed below. The signal quality may include the received amplitude or RSRP or SNR, as well as other relevant parameters such as current noise and interference. Uplink test signals correspond to SRS. In each case, the disclosed versions include enhanced features and options, with benefits vastly beyond the prior art, as described in the examples.

Turning now to the figures, the following examples show how test signals can be provided with a downlink message, and a feedback message can be provided with an acknowledgement.

Realtime Feedback

FIG. 1A is a schematic showing an exemplary embodiment of a downlink message with beam test signals, according to some embodiments. As depicted in this non-limiting example, a unicast downlink transmission 100 to a user device includes a message 102 and three test signals 103, 104, 105. The message 102 may be an incoming data message from another cell, or a control message from the base station, or other message. The message 102 may be a request for the user device to measure the three test signals and reply which one provides the best signal quality. The message may include an identification code of the user device, or it may be transmitted in resources that were previously granted to the user device for beam signal quality measurements. Alternatively, the message 102 may be absent, and the transmission 100 may consist of just the test signals 103-105, preferably at a pre-arranged time and frequency so the user device knows that they are arriving. The transmission 100 may be time-spanning or frequency-spanning. Each of the three test signals may occupy a single resource element each, thereby adding three resource elements to the length of the message 102. The test signals may be positioned before the message, or some before and some after the message, or all after the message as shown, or other distribution, so long as the user device knows where to find the test signals. As mentioned, it would be helpful for the format and usage to be specified in wireless standards.

The three test signals may be transmitted with different transmission parameters, such as different beam directions. The user device can measure the received signal quality of each test signal and then indicate which test signal was received best, thereby enabling the base station to direct its beams toward the user device. Alternatively, the test signals may be transmitted with different beam widths, or different transmission power, or polarization, or encoding, or modulation, or polarization, or frequency, or other feature that may be varied in a wireless transmission. In each case, the user device may select which of the test signals was best received, and may indicate the favored test signal in a feedback message to the base station. The user device thereby effectively requests an increase or decrease in the transmission parameter by choosing the test signal that is best received. The base station then knows, according to the feedback message, which way the selected test signal was transmitted, and thus can apply an increase or decrease in the transmission parameter.

In some embodiments, the user device can indicate, in the feedback message, that two of the test signals were received with about the same high signal quality. By specifying the two best test signals, the user device can enable the base station to further refine the parameter being varied, for example by adjusting the transmission parameter to an average of the two best-received test signals.

The example is non-limiting, as mentioned. Other embodiments may include a different number of test signals, such as two or four or other number, according to the parameter variations being explored.

Figure 1B:
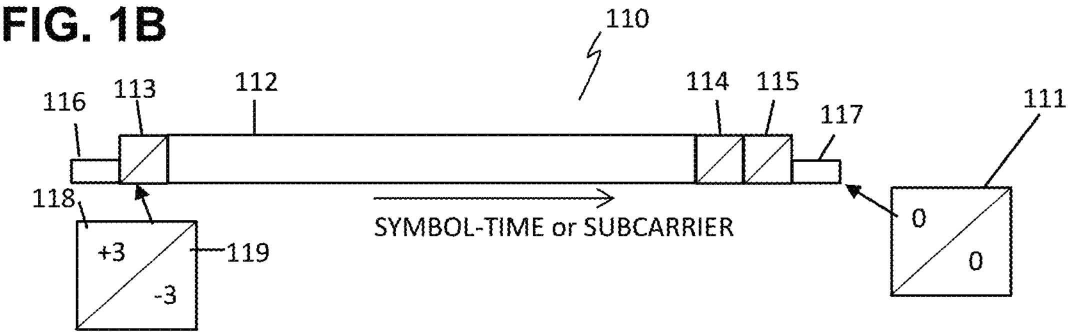
FIG. 1B is a schematic showing an exemplary embodiment of a downlink message with beam test signals configured as demodulation references, according to some embodiments.

FIG. 1B is a schematic showing an exemplary embodiment of a downlink message with beam test signals configured as demodulation references, according to some embodiments. As depicted in this non-limiting example, a transmission 110 is depicted including a message 112 with test signals 113, 114, 115 and blank spaces 116, 117. The horizontal dimension represents time or frequency, depending on whether the message 112 is transmitted time-spanning (in a single subcarrier) or frequency-spanning (in a single symbol-time). The blank spaces 116, 117 have no transmission, and thus demark the beginning and ending of the transmission 110. Each test signal 113, 114, 115 occupies a single reference element in this example, and includes two branches, such as the I and Q branches of a QAM modulation scheme, or the amplitude and phase of an amplitude-phase modulation scheme, as suggested by the diagonal strike-through. Thus the blank spaces 116, 117 are shown with zero amplitude in both branches 111.

In this example, the first test signal 113 is a short-form single-point demodulation reference occupying a single resource element, in which the I-branch 118 is modulated according to the maximum predetermined amplitude level of +3 arbitrary units, and a Q-branch 119 modulated according to the minimum branch amplitude of the modulation scheme of −3. The receiver can then calculate all of the other predetermined amplitude levels of the modulation scheme by interpolation. In the example, the message 112 is modulated in the same modulation scheme, and transmitted in the same way, as the first test signal 113. Hence the first test signal 113 provides a fresh calibration of the predetermined amplitude levels at the start of the message 112. In addition, the last two test signals, 114, 115 can serve as phase-tracking reference signals. In addition, each demodulation reference 113, 114, 115 also provides a measure of the current phase noise according to a ratio Q/I of the received branch amplitudes, since phase noise typically rotates power from one branch into the other branch. In addition, the blank spaces 116, 117 provide an indication of the interference level (both amplitude and phase of the interference) at the two ends of the message 112. In addition, the demodulation references (along with the blank spaces 116, 117) also provide a further indication of the starting and ending points of the message 112, which may assist the user device in finding the message start and end.

In this example, the final two test signals 114, 115 are modulated in the same way as the first test signal 113, but transmitted in different beam directions. For example, the first test signal 113 and the message 112 may be transmitted in a particular direction θ, and the second and third test signals 114, 115 may be transmitted in incrementally different directions θ+dθ and θ−dθ, where dθ is the angular increment. The receiver can then indicate, in a feedback message, which beam direction provides the best signal quality, such as the highest amplitude or SNR or received power, for example. As a further option, the final two test signals 114, 115 may be modulated differently from the first test signal. For example, the leading test signal 113 may have +3 amplitude units in the I branch and −3 in the Q branch, whereas the trailing test signals 114, 115 may have −3 amplitude units in the I-branch and +3 units in the Q-branch. The difference in modulation may thereby indicate the start and end of the data message 112 unambiguously, while still providing the same phase noise measurement at the start and end of the message 112.

In a first embodiment, the message 112 may be a downlink message including the test signals, from which the user device can provide feedback to the base station. The downlink message may be an incoming data message from elsewhere. Alternatively, the downlink message may be a control message such as a grant or an RRC message or one of the initial access messages such as the Msg2 or Msg4 of a 4-step initial access procedure, or MsgB of a 2-step initial access procedure, or other downlink transmission. In each case, the test signals 113, 114, 115 may enable the user device to indicate, in a subsequent uplink feedback transmission, which of the test signals provided the best reception, thereby enabling the base station to aim its transmission beams more directly toward the user device.

In a second embodiment, the message 112 may be an uplink message. The uplink message may be a data message from the user device, transmitted responsive to a previous grant. Alternatively, the message 112 could be a scheduling request at a predetermined time, or a BSR message responsive to a BSR grant, or an acknowledgement, or one of the initial access messages such as the random access preamble, or the Msg3 of a 4-step initial access procedure, or MsgA of a 2-step initial access procedure, or other uplink transmission. In each case, the test signals 113, 114, 115 may enable the base station to indicate, in a subsequent downlink feedback transmission, which of the uplink beam directions provides the best reception, thereby enabling the user device to aim its transmission beams more directly toward the base station.

In a third embodiment, either entity (the user device or the base station) may initiate a beam re-alignment procedure by transmitting a beam adjustment request to the other entity. The beam adjustment request may be transmitted on a contention-based channel such as the random access channel or other channel allocated for grant-free messages, or another channel allocated for user devices to request beam services. The first entity's message may include a series of beam test signals such as the (θ, θ+dθ, θ−dθ) sequence as discussed. The second entity can then reply by transmitting a feedback message indicating the favored test signal, thereby indicating the best beam direction. The feedback message may be transmitted on the same channel as the ping request. The feedback may also be multiplexed with a power adjustment request. In addition, the two entities can engage in mutual feedback, wherein the feedback message includes test signals transmitted back to the first entity, which can then send a second feedback message to the second entity indicating best beam angle from its perspective, and optionally a second power adjustment for the second entity. In this way the user device and the base station can both adjust their beam directions and power levels rapidly, based on feedback from the other entity, using only minimal resources and negligible additional power consumption.

In a fourth embodiment, two user devices in an ad-hoc network may communicate in sidelink, and may adjust their beams and power levels using test signals and responsive feedback messages in a similar way, without participation of a base station.

In a fifth embodiment, two base stations or core networks may communicate wirelessly, and may maintain good beam contact by exchanging test signals and responsive feedback messages, as disclosed.

By providing test signals with each downlink message, the base station and the user device can cooperate to keep the downlink and uplink beams aligned even as conditions (or positions) change, at low or negligible cost.

Figure 1C:
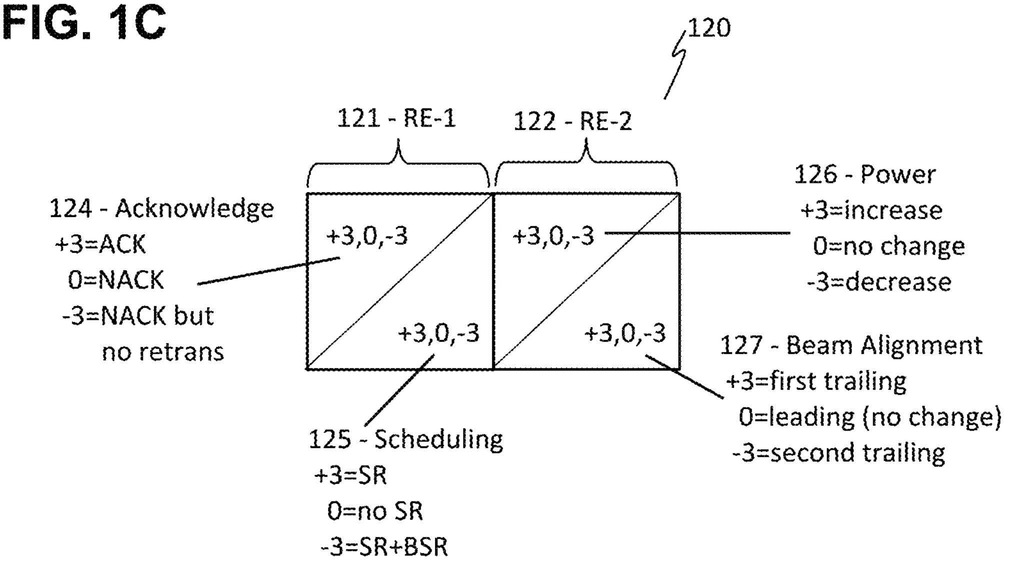
FIG. 1C is a schematic showing an exemplary embodiment of a feedback message, according to some embodiments.

FIG. 1C is a schematic showing an exemplary embodiment of a feedback message, according to some embodiments. As depicted in this non-limiting example, a user device transmits a feedback message that indicates which test signal has the highest received signal quality. Hence the feedback message, indicating preference for a test signal with higher transmission parameter is equivalent to a request, by the user device, to increase the transmission parameter, and likewise for lower. The feedback message may further indicate whether the received signal quality of the best-received test signal is between a lower and an upper threshold, or below both thresholds, or above both thresholds, and can thereby request to increase, decrease, or leave the transmission power unchanged.

In the depicted case, the feedback message 120 includes two resource elements 121, 122 encoding feedback information. In the first resource element 121 "RE-1", a first modulation component, such as an I-branch amplitude, can indicate both an acknowledgement and a retransmission request in various ways. In this example, the feedback message 120 is modulated according to 9QAM, which is a modulation scheme that includes 9 states symmetrically distributed around zero amplitude, with each branch modulated as +3, 0, −3 arbitrary amplitude units. Alternatively, the feedback message may be modulated in a 9-state amplitude-phase modulation scheme with three phase levels multiplexed with three amplitude levels. Both schemes include a zero-power state. Both schemes are well-suited for providing incremental feedback regarding two different parameters, such as the beam direction and the transmitted power, since the amplitude levels are well separated and readily recognized in a receiver. In addition, the 9 states can encode two feedback parameters, including the +/0/− "one-of-three" incremental selections as discussed, for both feedback parameters simultaneously, multiplexed into a single resource element.

In the depicted case, the I-branch 124 of the first resource element 121 can indicate a successful reception (ACK) with an amplitude of +3 arbitrary amplitude units, and an unsuccessful ("faulted") reception (NACK) as 0 units (zero amplitude in this branch). The third state at −3 amplitude may indicate an unsuccessful reception so that the transmitter knows there are problems, but nevertheless declining a retransmission. (The receiver may decline a retransmission for various reasons, such as having exhausted a number of allowed retransmissions, or being in a time-sensitive application where the retransmission would be too late, or other application in which a retransmission of a faulted message would not be useful.)

In the Q-branch 125 of the first resource element 121 of the feedback message 120, the receiver can indicate whether an uplink grant is requested ("SR"). In one embodiment, the +3 branch amplitude indicates "SR is requested, please send a BSR grant", while the −3 branch amplitude indicates "SR is requested and the BSR is appended", and the 0 branch amplitude represents "SR is not requested at this time". Thus +3 amplitude indicates that a BSR grant is desired, −3 amplitude indicates that a BSR (buffer status report) is appended to the feedback message and a message grant is desired, and zero amplitude indicates that no grant is desired, in this example.

The second resource element 122 may include a power feedback indicator 126 in the I-branch and a beam-angle selector 127 in the Q-branch, for example. The power feedback indicator 126 may be +3 to request an incrementally higher transmission power, 0 to keep the power unchanged, and −3 to reduce the power by a predetermined increment. For example, the receiver can evaluate the amplitude (or SNR or SINR or RSRP or other measure of the received signal quality or reception reliability) of the received test signals. The receiver can then compare that signal quality to a lower threshold and an upper threshold. If the signal quality is below the lower threshold, the receiver can request an incrementally higher transmission power, to meet reception requirements. If the signal quality is above the upper threshold, the receiver can request an incrementally lower transmission power, to save energy and avoid background generation. If the signal quality is between the lower and upper thresholds, the receiver can indicate "keep same" using the zero-amplitude feedback value. The upper and lower thresholds, and the increment size, and other parameters, may be determined by the network and may be indicated in system information files upon initial access, and may be revised when necessary using a broadcast message or an RRC. Alternatively, the user device can set its own upper and lower signal quality thresholds based on the requested QoS, according to network guidelines. As a further option, the user device can set the upper and lower thresholds based on the current fault rate or the like, as experienced by the user device.

The other branch of the second resource element 122 may provide beam alignment feedback. For example, the branch amplitude may indicate which test signal, of three received test signals, provides the best reception. The feedback may then allow the base station to adjust its downlink beam 127 direction toward the user device. Alternatively, the base station may vary another transmission parameter such as the angular width of the beam or some other parameter. For example, the first test signal and the data message may be transmitted in a previously selected direction θ, and the final two test signals 104, 105 may be transmitted in two incrementally different directions ±dθ. For example, the three directions may be termed θ−dθ, θ, and θ+dθ in which de is a predetermined angular increment. The receiver can then measure the received signals quality of each test signal, and may indicate, in the beam feedback 127, which one was received best. For example, the beam feedback amplitude may be +3 units if the θ+dθ direction is best, zero amplitude if the original message beam direction θ is best, and −3 if the θ−dθ direction is best. In this way, the transmitter can update the beam direction after each downlink message, thereby adjusting the beam direction as needed, and can thereby mitigate changing propagation conditions (or motion of the receiver, or diffraction, or changing obstructions, rain, etc.) in realtime upon each message.

The network can determine the size of the increment based on the user's previous feedback choices. For example, the base station may initially use a large increment, such as the full angular width of the transmitted beam, to rapidly converge on the general direction toward the user device. The base station may then switch to a much smaller increment (such as 1/10 of the beam width) for optimizing or fine-tuning the direction. In another embodiment, the transmitter can switch among a binary sequence of increments such as 2, 1, ½, ¼, ⅛ of the beam width.

The base station can change the increment size depending on the user device's previous choices. For example, if the user device requests an increase in the beam angle twice in succession, the base station can increase the size of the increment, for faster convergence on the best direction. Likewise if the user requests a decrease in angle repeatedly, the increment size can be increased in the same way. Increasing the size of the increment upon repeated like-sign requests may be termed “escalation”. In addition, the base station can reduce the increment size when the user device requests either no change, or a change in the opposite direction, (size reduction termed “de-escalation”). By varying the increment size in this way, the base station can converge rapidly on the optimal beam direction toward the user device.

The transmitted power can be incrementally adjusted in a similar way, based on the user device's feedback. The base station may use various increment sizes for power adjustment, based on the user device's previous feedback requests. For example, the user device may require that the received signal quality be within a lower and an upper signal quality thresholds, and may request higher or lower transmission power repeatedly until the signal quality is within those thresholds.

An advantage of such incremental feedback may be that the user device generally does not know, and does not need to know, the various increment sizes, nor the actual beam power levels, nor the particular beam angles involved, nor even which transmission parameter is varied among the test signals. The responsibility of the user device is to select which test signal is best received, and to indicate that selection in the feedback message 120. In addition, the user device may provide feedback regarding the signal quality in that best-received test signal, so that the base station can adjust its transmission power, as discussed above. Another advantage may be that the user device can provide incremental feedback on two parameters, such as beam angle and beam power, in a single feedback resource element. Another advantage may be that the depicted modulation scheme does not require amplitude calibration for unambiguous reception, so long as the receiver is synchronized with the base station, according to some embodiments.

In addition, if the user device has a beamforming capability, the base station can assist the user device in aligning the user device's uplink beam. For example, the base station may inform the user device of the optimal downlink beam direction when it has been determined, so that the user device can then aim its reception beam in the 180-degree opposite direction. Alternatively, or in addition, the base station can transmit multiple identical test signals which the user device can receive while varying the reception beam direction. By either method, the user device can determine which reception beam direction provides the best reception, and can thereby cause its transmission and reception beams to aim toward the base station.

A particular case may occur, in which the reception has failed (NACK), and no SR is requested, and no change in power or beam angle is requested. In that case, the feedback message would be zero, that is, both branches of both resource elements would have zero amplitude. The feedback message would include no transmission at all. The base station may interpret the absence of an acknowledgement as indicating that the user device did not receive the message, or it may interpret the null feedback as a feedback message including NACK and requesting no changes, as described, or it may assume that the acknowledgement has been somehow misdirected, or other mishap. In all such cases, however, the response is the same; retransmit the message. Hence in this case the 0,0 state is meaningful despite having no transmitted energy, and has the intended effect which is to prompt a retransmission. Notably, in this case, the correct feedback (a retransmission request with no changes) is conveyed to the base station, at zero cost in transmitted power.

Figure 1D:
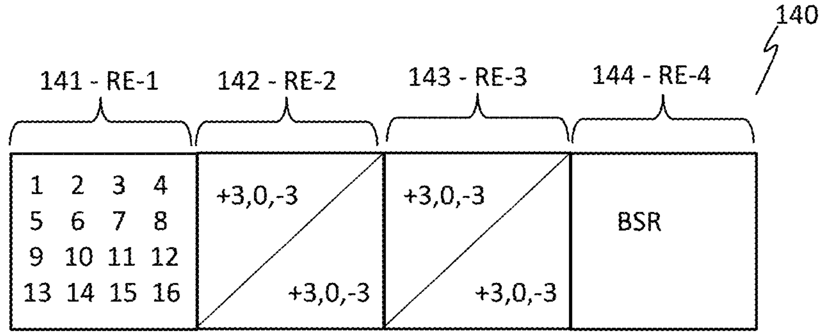
FIG. 1D is a schematic showing another exemplary embodiment of a feedback message, according to some embodiments.

FIG. 1D is a schematic showing another exemplary embodiment of a feedback message, according to some embodiments. As depicted in this non-limiting example, a feedback message 140 includes four resource elements 141, 142, 143, and 144. The first resource element 141 is an identification code that indicates, to the base station, which previous data message is associated with the feedback message 140. Often the base station transmits several data messages in the same downlink interval, so the base station embeds a code in each data message for identification. The user device then duplicates that code in the first resource element 141 of the feedback message 140, thereby indicating which data message is referred to in the feedback message. In other cases, the base station may grant specific resources for the feedback message 140, in which case the identification code 141 may not be necessary.

The second resource element 142 includes an acknowledgement multiplexed with a scheduling request, such as 121 of the previous figure, and the third resource element 143 includes a power adjustment and a beam selector, such as 122 of the previous figure.

The fourth resource element 144 is a BSR message. The BSR 144 indicates the size of a planned subsequent uplink message. The BSR may be included or appended to the feedback message when the user device requests a message grant. For example, the user device can request a message grant, and can indicate that the BSR is present, in the second resource element 142 of this example, or 122 of the previous example. The base station then interprets the BSR as indicating the size of the requested resources to accommodate the planned message. If, on the other hand, the BSR message is not included, then the base station can interpret the SR request as requesting a BSR grant, thereby requesting resources for uploading the BSR only.

It may be noted that the modulation scheme employed for the identification 141 and the BSR 144 is quite different from the modulation scheme used for the two feedback elements 142-143, that is, 16QAM versus 9QAM in the depicted case. The receiver is expected to know how to demodulate each resource element.

In this example, the receiver has identified which data message is associated with the feedback message, and has acknowledged the data message as faulted or unfaulted, and has requested a retransmission if needed, and has requested an uplink grant if needed, and has requested a power adjustment if needed, and has selected a beam angle adjustment if needed, and has specified the size of the requested uplink grant if needed, all at a cost of just four resource elements.

Figure 1E:
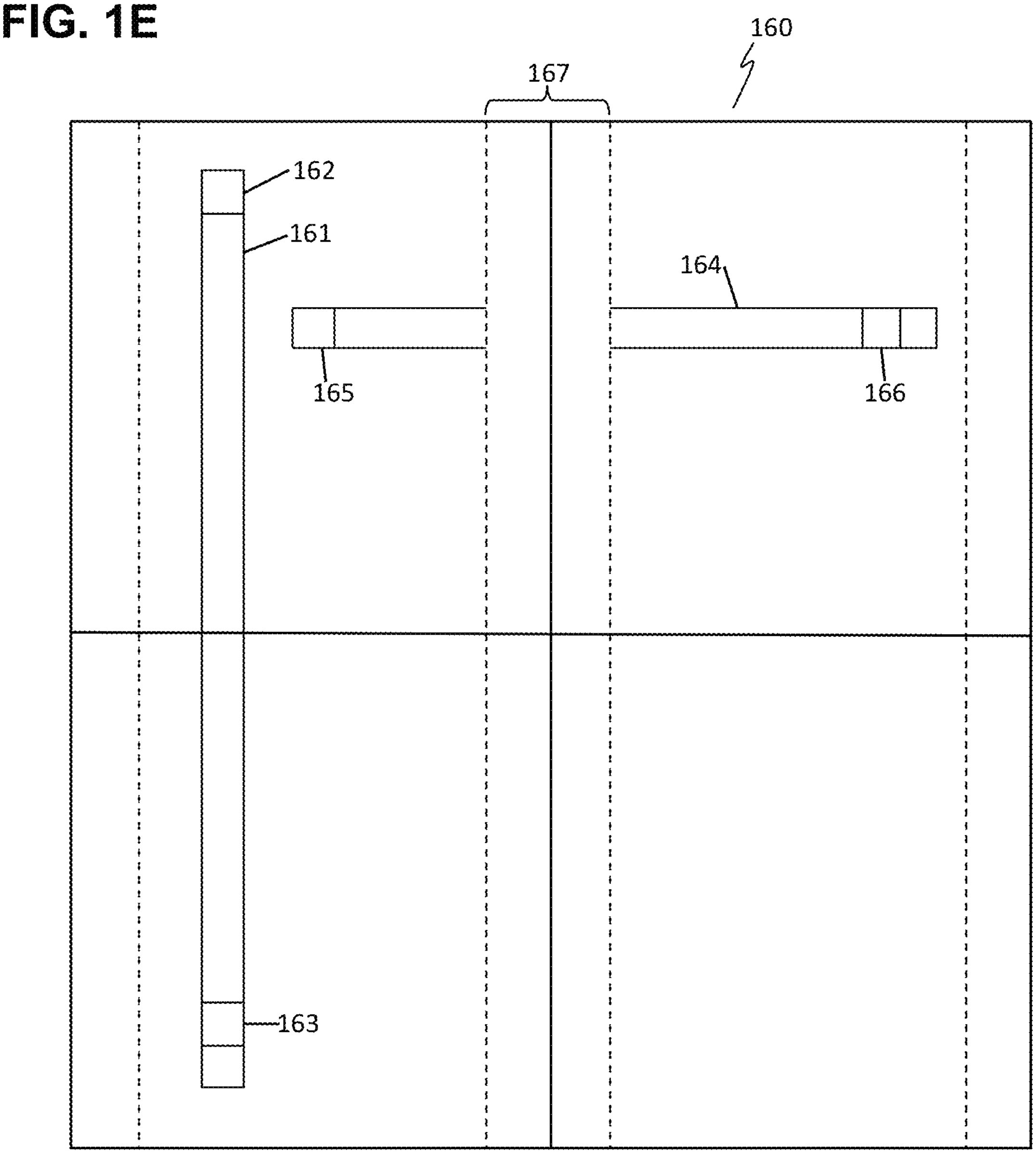
FIG. 1E is a schematic showing an exemplary embodiment of a resource grid with test signals, according to some embodiments.

FIG. 1E is a schematic showing an exemplary embodiment of a resource grid with test signals, according to some embodiments. As depicted in this non-limiting example, a resource grid 160 including two slots in time and two resource blocks in frequency, includes resource elements with a specific symbol-time and subcarrier frequency. A frequency-spanning message 161 includes a leading test signal 162 and two trailing test signals 163, all occupying a number of subcarriers at a single symbol-time. Also shown is a time-spanning message 164 with leading 165 and trailing 166 test signals. Dashed lines demark control regions 167. The rest of the area is allocated for downlink or unscheduled, thereby accommodating the two messages. Due to the control zone 167, the time-spanning message 164 breaks and then continues after the control zone 167.

As mentioned, the examples are non-limiting. The example messages may include other resource elements than those depicted, and one or more of the depicted resource elements may be altered or removed, and they may be in another order, and the branches (or other components) of the resource elements may be modulated or encoded in various ways other than those depicted, and may represent different requests or choices than those described, without departing from the disclosed principles.

Figure 2:
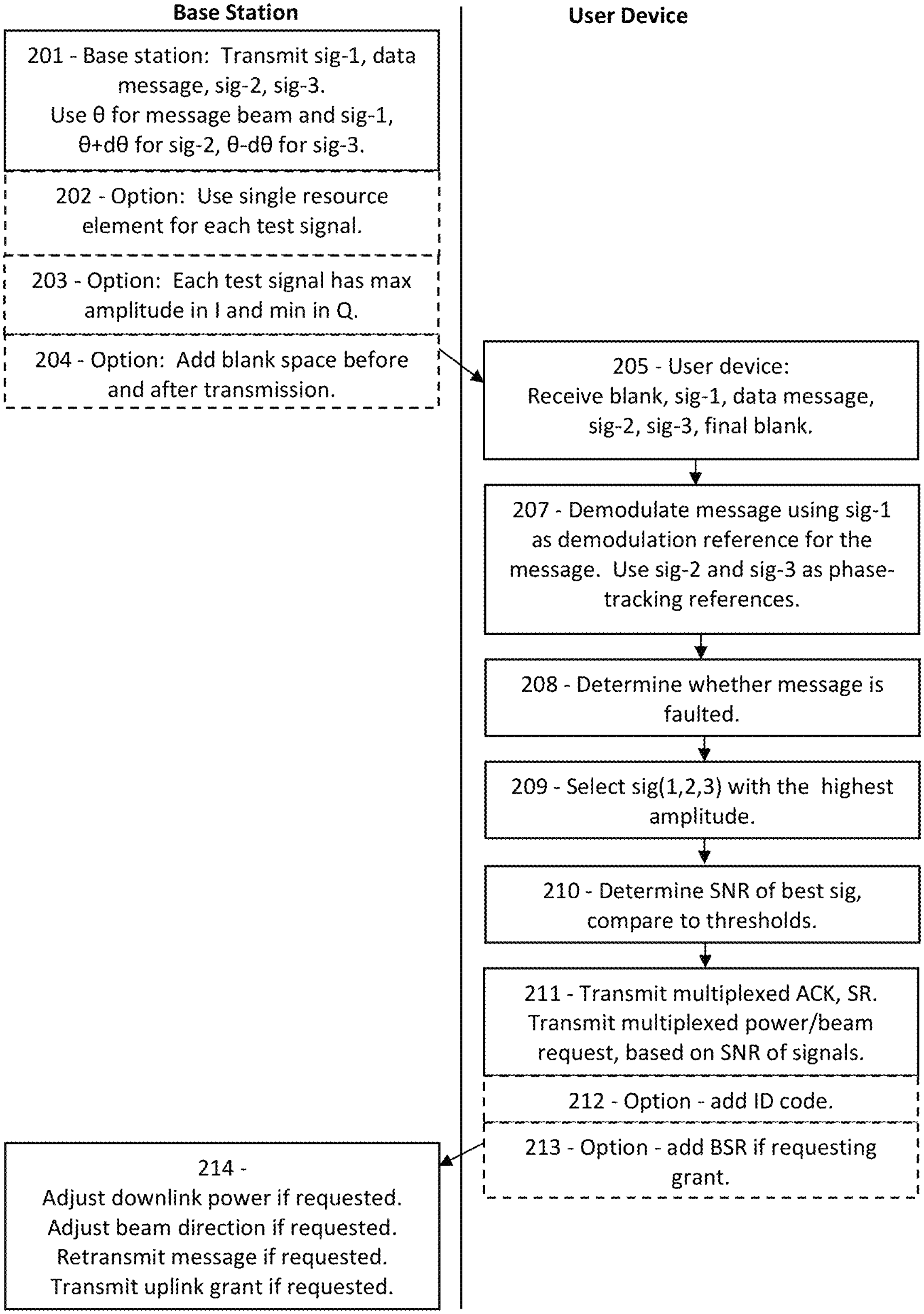
FIG. 2 is a flowchart showing an exemplary embodiment of a method for providing feedback to a base station, according to some embodiments.

FIG. 2 is a flowchart showing an exemplary embodiment of a method for providing feedback to a base station, according to some embodiments. As depicted in this non-limiting example, actions of a base station are shown on the left and of a user device on the right. At 201, the base station transmits a data message surrounded by three test signals ("sig-1" etc.), represented here by a first, second, and third demodulation reference, each at an incrementally different beam direction (at θ and θ±dθ) but with equivalent modulation and the same transmission power. Optionally, at 202, the test signals can be short-form type demodulation references that occupy a single resource element while exhibiting sufficient modulation levels so that the receiver can readily calculate the remaining modulation levels by interpolation. Optionally, at 203, each of the test signals may be configured with orthogonal I and Q branches, each transmitted with the maximum or minimum branch amplitude level, so that the receiver can determine phase noise according to the ratio of the branch amplitudes as-received. Optionally, at 204, the data message, with the test signals attached, may be preceded and/or followed by a blank resource element with no transmission therein, so that the receiver can evaluate noise and interference both fore and aft of the transmission, and also to demark the boundaries of the transmission.

At 205, the user device receives the first test signal, the data message, and the second and third test signals, plus blank resource elements. At 207, the user device demodulates each message element of the data message using the first test signal as a demodulation reference for amplitude calibration, and the second and third test signals as a phase calibration.

At 208, the user device determines whether the data message is faulted, for example by comparing the data message (or a digest or hash thereof) to an error-detection code such as a CRC or parity construct, associated with the data message.

At 209, the user device compares the amplitude or power or signal quality in the three test signals, and determines which one has the best reception, thereby indicating which beam direction produced the best reception.

At 210 (if not sooner), the user device determines a SNR or other measure of signal quality of the best-received test signal, and thereby determines whether additional transmitter power is needed. For example, the user device can compare the signal quality of the best test signal to two thresholds-a higher threshold and a lower threshold. If the signal quality is below the lower threshold, additional power is needed. If it is above the higher threshold, excess power is being wasted. If it is between the two thresholds, no power change is needed.

At 211, the user device transmits a feedback message to the base station, including a multiplexed acknowledgement, a retransmission request if needed, a scheduling request if needed, a power adjustment request if needed, and the beam selection based on the three test signals.

Optionally, at 212, the user device can add an identification code to the feedback message. The identification code may be extracted from the data message. The identification code may enable the base station to determine which data message is referred to. However, if the base station has already allocated specific resource elements for the feedback message, the base station would already know which data message is involved, and no identification code is needed. Optionally, at 213, the user device can append a BSR message for the requested uplink grant.

At 214, the base station receives the feedback message and adjusts the transmitted power level of future downlink messages. The base station also adjusts the beam direction toward that user device. The base station can then provide a retransmission of the data message if requested, and a grant for a subsequent uplink transmission if requested.

In some embodiments, the base station can vary the increment size depending on the user device's pattern of requests. In addition, the base station can apply the requested incremental change in the beam angle first, using the current increment size, and then increase or decrease the increment size depending on the user device's prior feedback messages. In other embodiments, the base station can escalate the increment size first, and then apply the adjustment to the beam angle or power using the updated increment size. The first way (rotate before escalating) is more conservative and stable, but the second way (escalate first, then rotate) may converge faster. The base station can select whether to apply the current or updated increment size when adjusting the power or beam angle. There are many other operational variations involving incremental feedback, which the base station or core network can determine.

In some embodiments, the base station or core network can record a history of past experience with incrementation, including external conditions, incrementation parameter choices, and user actions. The base station can use the history data in determining how to perform the incremental adjustments or set the incrementation parameters. For example, the base station can use machine learning to discern trends and patterns in how the incrementation choices subsequently affect network operations.

Thus the user device, in cooperation with the base station, has arranged to receive and demodulate the data message, and has requested a retransmission if needed, and has enabled the power and beam direction to be incrementally adjusted, and has obtained an uplink grant, with the minimal expense of just two to four resource elements in the feedback message, and a single extra resource element with the data message for the third demodulation reference.

AI Model for Feedback

Many feedback procedures are well-suited for automatic management by an artificial intelligence model. AI excels at complex, multidimensional decision-making. Often, an AI model can correct for subtle problems that even an expert human cannot discern. An AI model may be tuned using machine learning with large amounts of network data. After tuning, the AI model may assist both network managers and user devices, in generating and responding to feedback messages. The examples below illustrate AI models for determining the signal quality of test signals, for incrementally adjusting transmission beam parameters, and for selecting a modulation scheme to minimize faults and maximize throughput. Each specialized AI model is discussed in more detail below.

Figure 3:
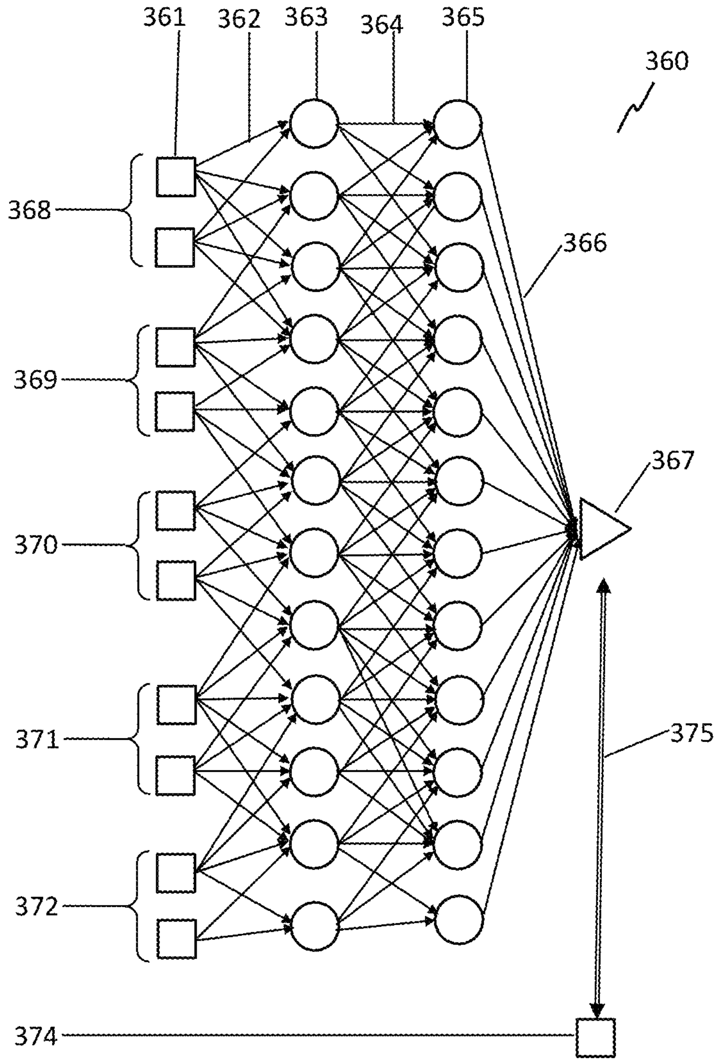
FIG. 3 is a schematic showing an exemplary embodiment of an AI structure based on a neural net, according to some embodiments.

FIG. 3 is a schematic showing an exemplary embodiment of an AI structure based on a neural net, according to some embodiments. As depicted in this non-limiting example, inputs and outputs are arranged to form an AI model configured and trained to assist a base station by predicting network performance under various conditions such as setting a particular transmission power level. Other embodiments may be trained to determine signal quality, manage incrementation, or select an advantageous modulation scheme.

A predictive AI structure 360 may be configured as a neural net, or as another type of artificial intelligence or machine learning structure that provides a choice or a prediction, based on input factors such as user requirements and limitations, network parameters, and current fault rates, among others.

The depicted AI structure 360 includes an input layer 361 of input parameters represented as boxes, one or more output 367 value(s) represented as a triangle, and two layers of internal functions 363 and 365 represented as circles. (The various items are sometimes called "nodes", not to be confused with the nodes of a wireless network.) Weighted directional links 362 indicate the flow of input data from the inputs 361 to the first internal layer 363, and additional weighted directional links 364 indicate the flow of processed data from the first internal layer 363 to the second internal layer 365, and further weighted directional links 366 indicate the flow of processed data from the second internal layer 365 to the output 367.

When provided with specific input parameters, and "trained" or adjusted to solve a particular problem based on real operational data, the AI structure 360 becomes an "AI model" that predicts network performance following a transmission power level adjustment, in the depicted case. The prediction is according to the input parameters, and thereby determines the effects of setting the transmit power level of messages in various ways.

The inputs 361 may include network operational parameters 368 such as the current message failure rate, the current throughput (in messages per second or bits per second, for example), the frequency of messages that do or do not obtain their desired QoS or QoE, the average message delay or latency, the number of active user devices in the network, the geographical extent of the network, the presence of mobile or fixed user devices, among other network parameters. The inputs 361 may further include parameters of the current message 369, such as the transmitter power used in transmitting the current message, the distance between the transmitter and receiver, the size of the message, the QoS or QoE expected by the recipient for the current message, whether the recipient is currently obscured and by how much, whether a prearranged fee or other financial arrangement is in place (with either the recipient or the message originator), whether the message is one of a series of messages or fragments, and other message parameters. The inputs 361 may further include external or environmental factors 370 such as the current noise or interference level from external sources, whether the base station has recently received complaints of interference from other adjoining networks, the spatial density of active user devices in the current cell and in the geographical area, among other external factors. Further inputs may pertain to various modulation schemes 371 or measured data regarding signal quality 372.

In addition, a final input 374 is the measured network performance, acquired after the message has been transmitted and the requested changes applied. However, this input 374 is not provided to the structure; it is used as a training value. In some embodiments, the network performance 374 may be quantified as a single metric 375, such as the throughput minus twice the message failure rate, or as a plurality of calculated values, such as the throughput, the retransmit rate, and the average delay per message, for example. The predicted output 367 may be cast in the same form. Then the measured network performance metric 375 can be compared with the predicted output 367 to evaluate the accuracy of the AI model predictions.

The weighted directional links 362, 364, 366 may include mathematical operations, such as multiplying the output from each node of a previous layer by a predetermined coefficient, and then passing the product to one or all of the nodes of the next layer, among other possible computation. In some embodiments, the links 362 and 364 may perform no computation, and all functionality is contained in the internal functions 363 and 365. Although links are shown in the figure connecting each node to just a portion of the next layer for clarity, in some embodiments every node of each layer is linked to every node of the next layer.

The internal functions 363 and 365 may include any mathematical or logical functions of the inputs. In various embodiments, each internal function 363 or 365 may include arithmetic or mathematical formulas, nonlinear functions (such as exponential or arctangent compression functions), Boolean logic (such as, "take input A if input B is larger than C, and take input D otherwise"), among many other functional options. Each internal function 363 and 365 may include one or more variables or adjustable parameters. In some embodiments, the internal functions 363 and 365 perform the same operations on all of their inputs, whereas in other embodiments the internal functions process each data flow from each connected link differently. In some embodiments, the directional links are simply passive conduits, and all the weighting factors and calculations are included in the internal functions. In some embodiments, the structure 360 may include feedback or bidirectional links or other complex topology not depicted here.

The output 367 is, in this case, a prediction of the subsequent network performance after adjusting the transmission power level. The network performance output 367 may be quantified as a performance metric, as mentioned. The output 367 may thereby indicate how the choice of transmission power influences the subsequent performance of the network. For example, if the message is sent with too much power, interference complaints from adjacent cells may increase, whereas if the message is sent with insufficient power, the message failure rate may increase and delays (such as retransmission delays) may increase. In some embodiments, network examples with similar parameters may be clustered or averaged, and the averaged parameters may be presented to the AI model as inputs, thereby saving computer time and potentially exposing more subtle effects.

The variables and weighting factors and other adjustable variables may be adjusted to "tune" or "train" the model based on network data. The AI model may initially start with the adjustable variables in arbitrary states, or set by logic or intuition, or otherwise. Then, data from actual network activity may be used as the inputs 361 and the AI model may calculate (or predict) a subsequent performance metric 367. Specifically, the data may include "pre-transmission" data, which is data measured before the message is transmitted. The prediction is then compared 363 to the measured "post-transmission" performance metric 362 of the network, measured subsequent to the message. In training the AI model, each variable (or a group of variables) may be adjusted in some "direction", and the prediction may be again calculated and compared with the actual metric. If the prediction is improved by that variation, the variables may be adjusted further in the same direction; but if the prediction is worse, the variables may be adjusted in the opposite direction or in some other direction. In each adjustment or series of adjustments of the variables, the most influential variables may be determined empirically, either by varying them individually or by tracing backwards from the output 367, and subsequent variations may focus primarily on those influential variables. This iterative training process, of repeated variation and comparison of the prediction, may be repeated for a large number of different message types with different transmission power levels under different network situations until, eventually, a particular set of values may be found that provides satisfactory predictions of network performance across a wide variety of situations and transmission power levels.

The next step may be to prepare an algorithm that base stations can use to determine how much transmission power to employ in transmitting each particular message. In some embodiments, the algorithm may be the AI structure itself, but with the variables frozen at the most advantageous settings. For case of use by the base stations, the algorithm may be configured to specify the preferred transmission power level instead of predicting the network performance metric. In addition, the algorithm may be simplified by removing the least-productive inputs and internal functions and links. In other embodiments, the algorithm may be distinct from the AI model but based on it. For example, the algorithm may be a computer program or subroutine, an interpolatable tabulation of values, or a graphical device, among many other calculation means for specifying a particular transmission power level for each message according to message parameters, current network conditions, and observed environmental inputs. The base station can use the algorithm to select an appropriate power level and then transmit the message with the indicated power level.

In another embodiment, the base station or user device operating an AI model may adjust certain variables in the AI model based on the current network experience. The entity developing the AI model originally (such as a supercomputer) may provide, to the base station or user device, an indication of which variables can be adjusted in response to certain events. Such a set of variables that can be altered to produce a specific effect may be termed a "solution vector" and passed to the end user for guided adaptation of the model. For example, the model developer may determine that, in some hypothetical situation, the network performance could be enhanced by adjusting the model variables according to a particular solution vector, such as placing higher importance on avoiding message faults and less importance on pushing throughput, to consider one hypothetical example. The developing entity, such as the supercomputer, may indicate such advice to the base station or user device that employs the AI model, so that the end user can adapt the model to its own situation empirically. By adapting the AI model according to the network or user experience, the predictions and other outputs may be optimized for each operating entity and each particular communication environment, thereby further enhancing operations and multiplying the value of the AI model.

When AI-derived algorithms are used by base stations and/or user devices to select appropriate transmission power levels of messages, or beneficial modulation schemes, or optimal beam angles, or realtime adjusted incrementation parameters, the network may achieve improved reliability, lower latency due to fewer delays, higher energy efficiency by avoiding wasted power, and improved overall network performance, according to some embodiments.

In some embodiments, the receiver may employ an AI model, or an algorithm derived from an AI model, to assist in determining the signal quality. The signal quality as used herein may be a composite parameter that accounts for the received amplitude or power, interference and noise, changing propagation conditions, accumulated delays or demodulation faults, and a host of other real-world effects that can influence the determination of which test signal provides the best "signal quality" in the current situations. For example, if a user device is measuring the amplitude or received power of test signals while an adjacent cell is intruding with transmissions at a similar frequency, the interference may distort the received signal, biasing the selection of the best-received test signal. Such interference may defeat the prior-art channel-state procedures that are based on received power alone because the interference power simply adds to the message received power, defeating the purpose of the prior-art feedback. An AI model, on the other hand, may correctly account for the intrusion by accounting for the SNR of the test signal, the power received during a blank (no transmission) resource element, and other influences. Thus the AI model may correctly evaluate signal quality in many situations where the prior-art procedures may fail. With reliable determinations of the received signal quality of the test signals, the user device can then provide useful feedback requests to the base station, according to some embodiments.

AI-Managed Signal Quality Determination

The following example shows how to use an AI model for determining which test signal provides the best reception.

Figure 4A:
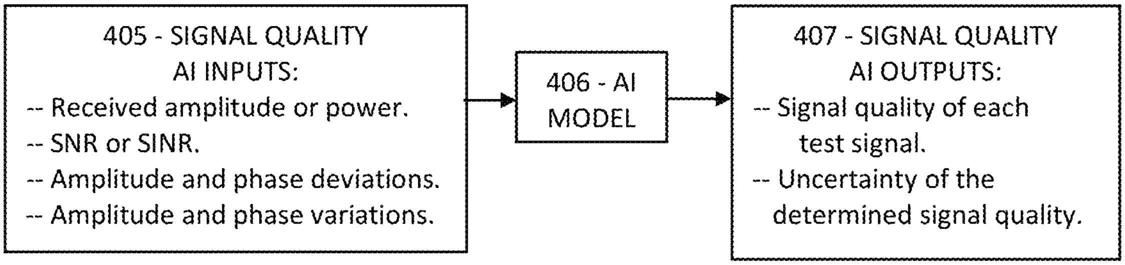
FIG. 4A is a flowchart showing an exemplary embodiment of a method for providing signal quality input parameters to an AI model, according to some embodiments.

FIG. 4A is a flowchart showing an exemplary embodiment of a method for evaluating signal quality using an AI model, according to some embodiments. As depicted in this non-limiting example, an AI model evaluates the signal quality based on user data. At 405, the user device provides, to the AI model 406, a plurality of input values related to the signal quality. For example the inputs can be data related to the test signals, such as the received amplitude or power level of each of the test signal, the SNR or SINR observed with each test symbol based on the raw waveform, deviations in amplitude or phase relative to the predetermined amplitude or phase levels of the modulation scheme, and the amplitude or phase variation during the test signal. The inputs can also be related to current network operations such as an amount of interference coming in from outside the cell (measured in a blank, no-transmission resource element), as well as fault rates or bit-error rates detected.

At 406, the AI model performs the analysis it has been tuned for, by determining a signal quality value at 407 for each test signal. In this example, the AI model, or a second AI model, or algorithm, determines an uncertainty in the signal quality which was calculated or estimated by the AI model. The uncertainty in the estimated signal quality value is important because the estimate would be worthless if the uncertainty is too large. The user device can compare the signal quality values of the test signals, as determined by the first AI model, with the uncertainties as determined by the second AI model (or an extension of the first one, or an algorithm), and can then decide whether to use the signal quality values of the test signals for feedback. If the uncertainty is high, the recommendations of the AI model should be disregarded, and the feedback opportunity should be skipped. In addition, when a feedback message is required yet the uncertainty is too high for reliable conclusions, the user device can configure the feedback message for "no change", and thus retain the possibility of making a better determination at a later time.

Figure 4B:
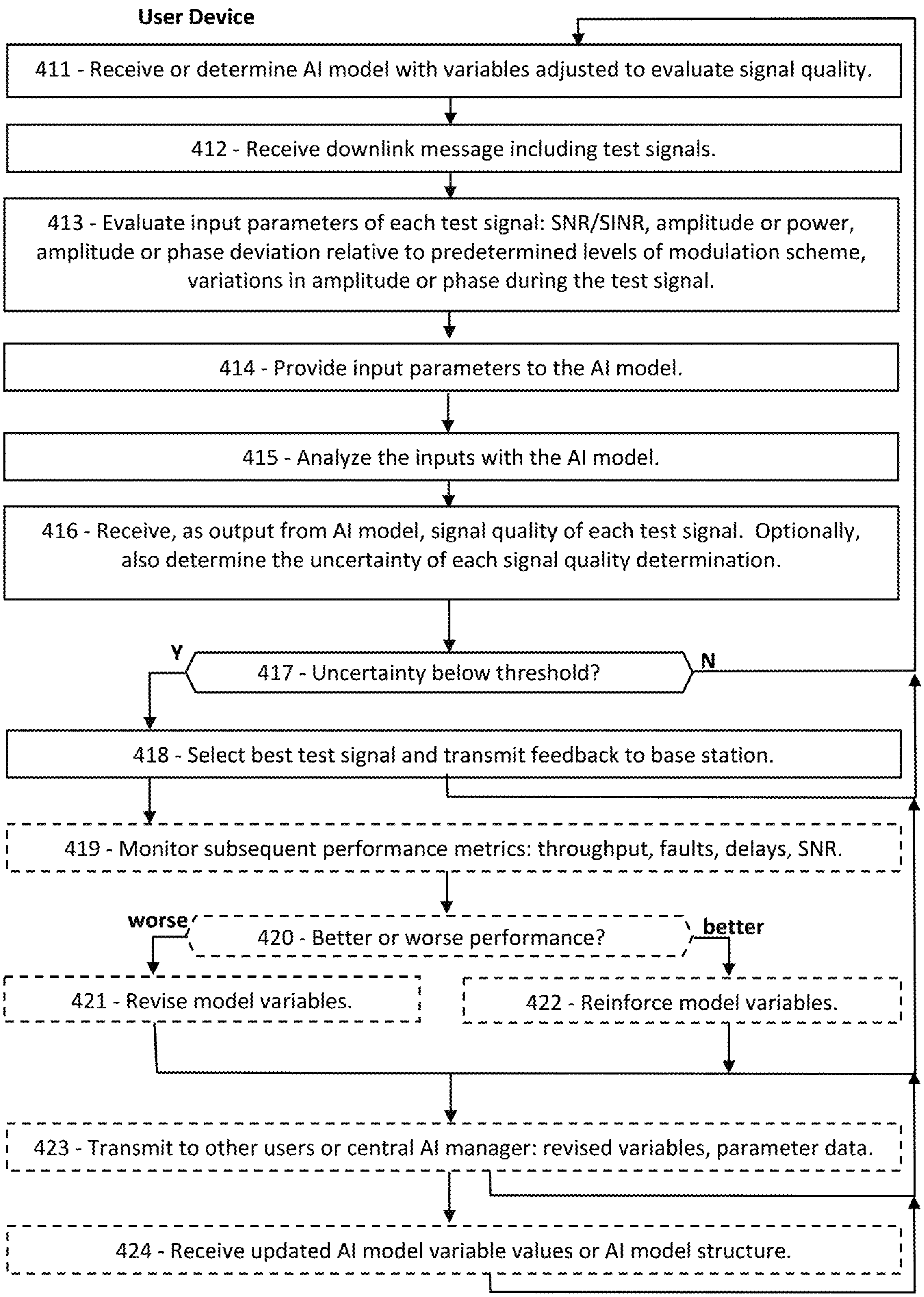
FIG. 4B is a flowchart showing an exemplary embodiment of a method for determining the signal quality of the received test signals, according to some embodiments.

FIG. 4B is a flowchart showing an exemplary embodiment of a method for determining the signal quality of the received test signals, according to some embodiments. As depicted in this non-limiting example, a user device uses an AI model to evaluate the signal quality of three test signals, using inputs and outputs as disclosed in the previous figure. The user device then transmits the selected choice back to the base station in a feedback message. Optionally, the user device may then monitor performance metrics and adjust the AI model variables accordingly, thereby continually improving the AI model.

At 411, the user device receives or develops or determines or otherwise arranges to use an AI model. In this example, the variables of the model have already been adjusted for evaluating a signal quality according to input parameters, for example using a supercomputer with machine learning on a large network data set. In other embodiments, the user device may adjust the model variables empirically, for example based on the user's experience. As a further alternative, the user device can receive periodic updates to the variables, and/or other updates to the AI model, based for example on the accumulated experience of many user devices.

At 412, the user device receives a message from the base station including several (such as 3 or 4) test signals. Each test signal is transmitted in a different way, such as at a different angle. The user device does not know, or care, how the test signals were transmitted in this case; the user device is only responsible for determining which test signal is best received.

At 413, the user device evaluates various parameters of the test signals such as the received amplitudes or power levels, the SNR/SINR of each test signal, the stability or variations in amplitude or power or phase during each test signal, and the like. The user device can also compare the amplitude and/or phase of each test signal to a predetermined amplitude or phase level, and can thereby determine a deviation between the received amplitude or phase and the closest predetermined level, for each branch of each test signal. The user device can also determine the interference level according to signals received during a blank (no transmission) resource element proximate to the test signals. High interference generally increases the uncertainty of the signal quality determination, even if the RSRP is high.

In some embodiments, each test signal may be configured as a demodulation reference, which the user device can use for demodulating the message. The demodulation reference may be a short-form demodulation reference that exhibits the maximum amplitude or phase levels of the modulation scheme, or the maximum and minimum amplitude levels, or other predetermined modulation levels in a single resource element or at most two resource elements.

At 414, the user device can provide the various parameter measurements of the test signals as inputs to the AI model. At 415, the AI model can analyze the inputs and determine the outputs, which at 416 may include the signal quality of each test signal. Optionally, the AI model can also provide outputs representing an uncertainty in each signal quality determination. Alternatively, another AI model, or another algorithm, can evaluate the uncertainty. The evaluation of the uncertainty may use the same inputs as the AI model that determines the signal quality, or they may be different inputs. If the uncertainty is large, such as comparable to the signal quality value or more, the user device may choose to ignore the signal quality value, and thereby avoid causing erratic changes based on a poor data.

It may be noted that the uncertainty in the signal quality determination is not a surrogate for the signal quality itself. If the signal quality is low, the transmission power needs to be increased, even if the uncertainty is larger than the low signal. Usually, higher transmission power increases the signal quality and decreases the uncertainty, leading to better evaluations of the uncertainty thereafter.

At 417, the user device can determine whether the uncertainty, in the signal quality determination of each test signal (and especially the best-received test signal) is above or below a predetermined threshold. If the uncertainty is above the threshold (that is, if the uncertainty is too high), the user device may ignore the results. For example, if the threshold equals 50% of the signal quality value or more, the user device may discard the results and provide no feedback, or the user can transmit a feedback message requesting no changes, notwithstanding the previous paragraph.

On the other hand, if the uncertainty is below the threshold, then at 418 the user device can transmit a feedback message to the base station indicating which test signal is favored. Optionally, the feedback message may include other feedback items such as an indication of whether more or less transmission power is needed, based on the signal quality of the best-received test signal. The base station can then implement that choice by adjusting the transmission beam angle, and optionally the transmission power, or other parameters.

Optionally (in dash) the user device can seek to update its AI model variables based on further performance data acquired by the user device. The user device may thereby customize the AI model according to the user device's experience, capabilities, wireless environment, etc. For example, at 419, the user device can continue to monitor the performance metrics after transmitting a feedback message to the base station, and thereby determine whether the requested change succeeded in improving the performance, or the reverse. The performance metrics of interest to the user device may include its success rate, throughput, fault rate, average delay, received SNR, or other measurables related to communication.

At 420, the user device can determine whether the performance is better or worse than it was before the change in beam properties. If better, the user device can reinforce the AI variables at 422, for example by causing them to be more resistant to future variations. However, if the user device experiences worse communications after the requested beam changes, this may indicate that the user device's AI model, tasked with evaluating the signal qualities of the test signals, was incorrect. That is, the AI model incorrectly evaluated the signal qualities of the test signals, and in fact one of the other test signals was better than the selected one. In that case, at

421 the user device can adjust one or more variables in the AI model in an attempt to improve the accuracy of the model, or at least to avoid the current disappointment.

In one embodiment, the user device can change the AI model variables at random, and can attempt to determine whether the resulting performance is better. This scattershot approach generally takes a long time for convergence, even when done by a supercomputer. More preferably, in another embodiment, the user device has foreknowledge of which variables to adjust under particular circumstances or to obtain particular results. For example, the entity (such as a supercomputer) that developed the AI model may have determined which variables should be altered, and in what direction, to mitigate various types of problems or to have some desired effect. As mentioned above, the set of alterations in the model variables may be termed a "solution vector" when it is related to an intended change in performance. The AI development supercomputer, or another entity, may vary the model variables in various combinations, and may analyze the effect of each such variation, and in this way may have determined which variables can be adjusted to counter certain problems. With knowledge of the solution vector and the performance that it is intended to improve, the user device can then select which variables to adjust, and in which direction, according to the problems observed. Preferably any changes made to the model variables, by the user device, are small incremental changes, which can be reversed if desired. In addition, the user device may record a history of changes made to the AI model variables, so that the changes can be reversed if the predictive power of the AI model deteriorates rather than improves.

As a further beneficial option, at 423 the user device can transmit the results of its experience with the model to other user devices, or to a central AI model developer that accumulates experiences from many users over time, thereby gradually improving the predictive power and utility of the model. In addition, at 424 the user device can receive updated values of the AI model variables, or a whole new AI structure, from the AI manager.

Incremental Feedback

The following examples show how a base station can adjust transmission parameters incrementally, responsive to a user request in a feedback message. For incremental adjustment of a transmission parameter, the base station can apply a predetermined increment value to the parameter. The sign of the adjustment is determined by the user device's request in the feedback message. This process continues until the user device finds that the current parameter setting is better than any of the alternatives offered in test signals, and therefore requests that the parameter remain at the current available value.

The increment size (or step size) may be variable and controlled by the base station. For example, the base station may vary the increment size according to the user device's previous incrementation requests. For example, if the user device repeatedly selects the test signal that corresponds to a positive increase in the beam angle, the base station can begin using larger increment sizes, and therefore may reach the optimal angle more quickly. However, when the user device finally reverses direction and begins requesting the opposite sign of adjustment, the base station can revert to a smaller increment size for fine-tuning the angle.

To consider a specific case, regarding the beam angle adjustment, the increment size can be set initially to 2 degrees say. If the user device selects the positive increment twice in succession, the base station can double the increment size to 4 degrees. As mentioned, this increase in the increment size is called "escalation". If the user device then selects a beam direction opposite to the previous change, the base station may switch to a smaller increment such as 1 degree, which thereby enables fine-tuning of the angle. Thus the base station can use increasingly larger increments as long as the user device requests increments in the same direction, and then can revert to smaller increments when the user device reverses and requests the opposite direction, or requests no change. The base station can thereby achieve the optimal angle more rapidly than otherwise. In addition, the same escalation and de-escalation processes can be applied to the incremental power level adjustments and other parameter adjustments served by the feedback message, according to some embodiments.

Figure 5A:
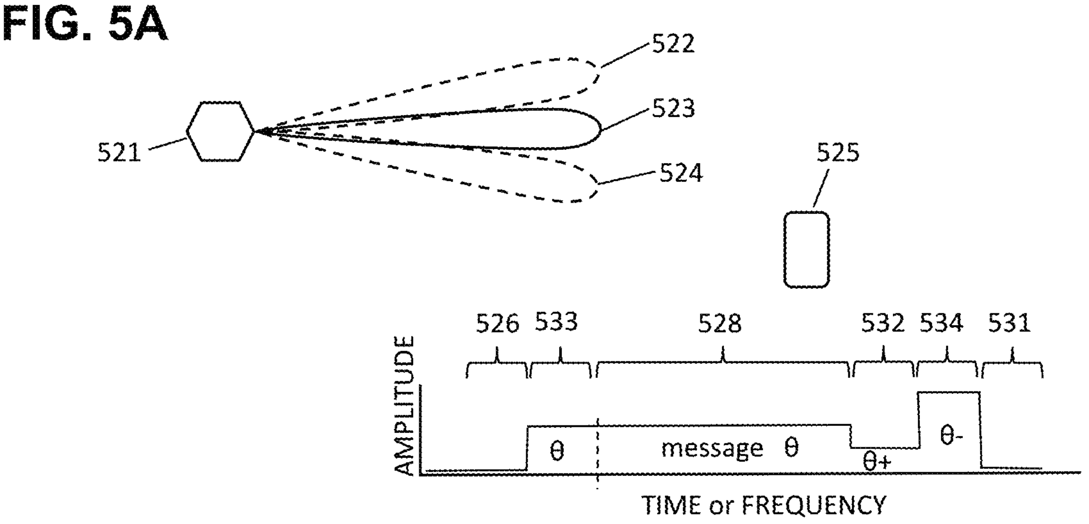
FIG. 5A is a schematic showing an exemplary embodiment of a beam-test signal, according to some embodiments.

FIG. 5A is a schematic showing an exemplary embodiment of three beam-alignment test signals, according to some embodiments. As depicted in this non-limiting example, a base station 521 transmits three directed beams 522, 523, 524 in various directions, and the amplitudes received by the user device 525 are shown schematically. A first test signal 533 and the message 528 are transmitted on the middle beam 523. Two additional test signals 532, 534 are transmitted on the other two beams (dashed) 522, 524, which deviate in positive and negative ways from the central beam.

The message 528 and the first test signal 533 are transmitted on the central beam 523, shown in solidline, because it was previously determined to provide adequate reception at the user device 525. However, in this case, one of the other beams 524 is now better aligned with the user device 525. After receiving and measuring the three test signals, the user device 525 has determined that the original beam 523 is not the best one, because one of the other test signals (534, transmitted on beam 524) is better received. The user device can then transmit a feedback message to the base station 521 indicating which of the test signals was received with the best signal quality, which in this case would be the last one 524.

A blank resource element 526 is received before the first test signal 533, and a second blank resource element 531 follows the last test signal 524. A dashed line is shown separating the first test signal from the message 528. Other two test signals 532, 534, are after the message. In this case, each test signal 532, 533, 534 is also a demodulation reference. The first test signal 533 is transmitted in a particular direction indicated by θ, and the message 528 is also transmitted in the same direction θ. The last two test signals 532, 534 are transmitted in other angles θ+ and θ− which are transmitted at higher and lower angles relative to the central beam 523. The height of the signal during the third test signal 534 indicates that the best reception is obtained with that beam 524.

The user device can then transmit a feedback message to the base station 521 indicating that the best signal was obtained with the last test signal 534. The base station 521 can then determine that the favored test signal 534 corresponds to the beam 524 with a lower angle, and therefore may incrementally adjust its transmission beam angle to a smaller angle.

The user device 525 does not need to know which test signal is transmitted in which direction, or the size of the increment between adjacent beam directions, or even that beam alignment is being tested. It is sufficient, in this example, for the user device 525 to determine which test signal was best received, and to indicate that selection in a feedback message. The base station 521 is expected to know what to do with the feedback information, such as to incrementally adjust the beam direction toward the user device, whereas the user device 525 has no such responsibility. In contrast, some prior-art CSI procedures require the user device to figure out what the base station is supposed to do regarding the transmission channel, and then tell the base station how to do it, which represents a substantial burden for the user device. Therefore, in the depicted version, responsibility for interpreting the feedback in terms of the transmission beam parameters is allocated to the base station, thereby allowing the user device to focus on its own tasks, while leaving network management to the base station.

In a first embodiment, the angular difference between the central beam 523 and each of the other two beams 522, 524 equals the current increment size. The base station will adjust the transmission beam to equal whichever test signal is favored by the user device, after which the base station may or may not change the increment size, depending on escalation rules. The user device can therefore determine the signal quality expected at the new beam angle already, since the user device has determined the signal quality in the favored test signal.

In a second embodiment, the angular difference between the central beam 523 and each of the other two beams 522, 524 may be arbitrary and not related to the increment size. In that case, the test signals merely indicate a direction of change of the beam angle that the user desires. The base station then applies the predetermined increment, in the selected direction. For example, the base station may first adjust the increment size according to certain rules, and then apply that increment in the requested direction. Alternatively, the base station may apply the current increment value in the requested direction, and then update the increment size. In each case, the subsequent messages to the user device are then transmitted at the newly updated beam angle.

As mentioned, a user device with beamforming capability can transmit test signals, and receive feedback responses, from a base station, and thereby keep the uplink transmission beam parameters adjusted properly. Likewise, two user devices communicating with each other, independent of a base station, can provide the same kind of feedback at negligible cost.

Figure 5B:
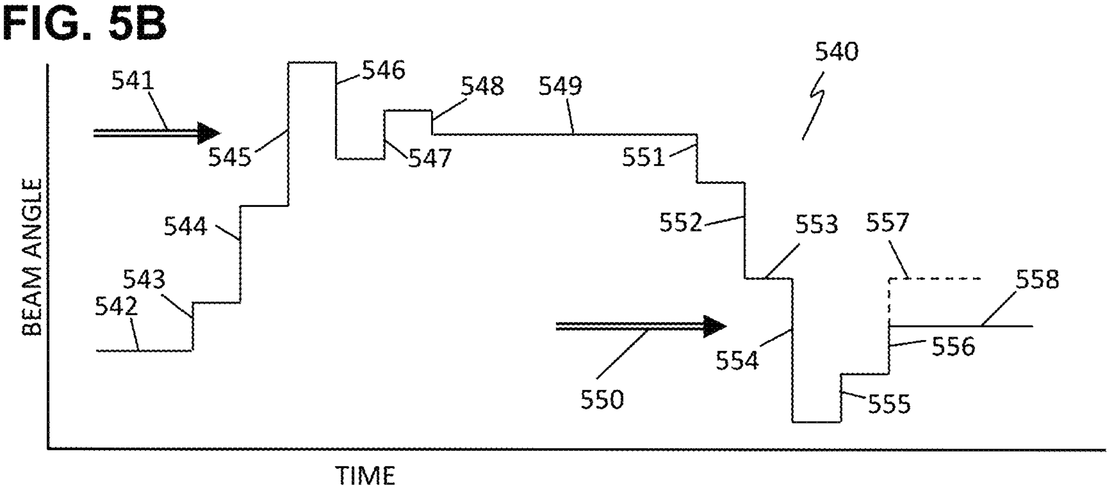
FIG. 5B is a schematic showing an exemplary embodiment of an iterative adjustment of beam angle, according to some embodiments.

FIG. 5B is a schematic showing an exemplary embodiment of iterative adjustments of beam angle, according to some embodiments. As depicted in this non-limiting example, the downlink transmission beam angle is varied incrementally, in response to the user device's signal quality feedback. Each downlink message contains three test signals. The user device indicates, in a feedback message, which test signal provided the best signal quality. The three test signals may be transmitted in three directions. For example, one of the test signals can be transmitted in a previously established "baseline" beam direction, and the other two test signals may be transmitted plus or minus a predetermined increment angle, relative to the baseline direction. Thus the base station can iterate toward the ideal beam direction in a series of directed increments.

In this example, the base station varies the size of the increment according to the user device's sequence of beam selections. If the user chooses the positive increment twice in succession, the base station increases the increment size by one unit and then adjusts the beam by adding the updated increment to the baseline direction. That is, the base station escalates the increment size responsive to repeated same-sign requests, and de-escalates it upon a reversal in sign. In this example, the base station follows a linear escalation, such as a "1, 2, 3, 4" size sequence, as long as the user device continues to request the same sign (positive or negative) increment. However, if the user device then reverses by selecting the opposite sign, the base station reduces or de-escalates the increment size by 1 unit, as in a "4, 3, 2, 1" sequence. The maximum increment size is 4 and the minimum is 1. In addition, whenever the user device requests no change in the beam direction, the base station resets the increment size to 1.

There are two exceptions to the above rules, in the depicted example. First, the base station avoids returning to an already-tested beam direction, unless the increment size has been reduced to the minimum size. This avoids instabilities. If the user device selects a test signal that would return the beam angle to a previously tested direction, the base station automatically reduces the increment size to the smallest size, and then applies the small increment in the requested direction. The base station thereby avoids repeating a previously tested direction, unless the increment size is already at its smallest. A previously-tested beam direction can be repeated, but only when the user device explicitly requests it, such as when some condition has changed. However, if sufficient time has elapsed since the last time that particular beam direction was tested, then the record may be erased because conditions may have changed over time. The amount of time required for the previous test of the particular beam direction to "go stale" depends on convention and/or on how rapidly the interference changes significantly. This may be monitored by measuring the background interference versus time and frequency.

The second exception is invoked when the user repeatedly alternates between positive and negative increment requests ("ping-ponging"). In that case, the base station averages the two alternating beam directions as a compromise, and then remains at that compromise angle until the user device requests the same sign twice in succession. Thus the user device can resume normal beam-angle adjustments by requesting the same sign of increment on two successive requests, at which time the base station resumes incrementing the direction using the smallest increment size. The increment size is restricted to a specific range, such as 1 to 3 units in this example. Each of these behaviors is illustrated in the chart.

Time is plotted horizontally and the beam angle is plotted vertically. The jagged line 540 traces the incremental changes in beam direction versus time. The optimal beam angle is indicated by a doublewide arrow 541. However, the initial beam angle starts at a completely different angle, as shown at 542. since the initial angle 542 is far below the optimal beam angle 541, the user device is going to select the higher-angle beam options at each feedback opportunity, until the beam angle becomes equal or close to the optimal angle 541.

At 543, the base station sends a downlink message containing three test signals to the user device. The user device selects whichever test signal gives the best reception, which in this case corresponds to a higher beam angle, and sends an uplink message specifying that selection. Responding to the feedback message, the base station increments the beam angle by the initial increment size, which is initially the smallest step size of 1 unit, as indicated at 543.

At 544, responsive to another downlink message, the user device again selects the test signal with the higher angle. The user device has thus requested the higher angle option twice in succession, and therefore the base station increases the increment size from 1 unit to 2 units, and then takes the step 544 as shown. The step 544 is twice as large as the one at 543 because the base station has escalated the increment size from 1 to 2 units.

The resulting beam is still below the optimal angle 541. Therefore, on the next feedback opportunity, the user device again selects the positive increment option. The base station again escalates the increment size, now to 3 units, and applies it by increasing the beam angle by 3 units at 545.

Unfortunately, this step has now overshot the optimum 541. Therefore, on the next feedback opportunity the user selects a lower angle. The base station sees that the user device has reversed the directional requests. Due to the direction reversal, the base station reduces the increment size from 3 units to 2 units, and then steps down at 546.

The resulting beam angle has again passed over the optimum 541, so in the next feedback message the user device again reverses by selecting the higher-angle option. The base station responsively reduces the increment further to 1 unit, and applies it at 547.

The next step causes one of the exceptions to be invoked. The user device again reverses direction at 548 and requests a lower angle. The base station cannot reduce the increment size further because it is already at the smallest size. According to one of the exceptions, a reversal while the increment size is just 1 unit causes the base station to average the two alternating values. The base station therefore applies a half-size increment at 548, in the requested direction, which is now the lower angle. This brings the beam angle within at most ½ unit from the optimal 541, which is generally a satisfactory beam angle. The base station then leaves the beam angle at that compromise position during the subsequent interval 549, during which the user either selects no change, or alternates between positive and negative requests, or requests a non-zero change alternating with a zero request, all of which are treated as requesting no change while in the compromise state.

At a later time, the optimal beam angle has suddenly changed to 550, due perhaps to motion of the user device or a change in propagation. Consequently, the user device now selects the lower angle option twice in succession at 551. Repeated same-sign requests cause the base station to exit the compromise state 549 and resume incremental adjustments. Therefore the base station applies a reduction in angle of one unit at 551.

The user device again selects the lower beam angle at 552, which causes the base station to escalate to a 2-unit decrement, which brings the beam angle to 553. However, it is still not enough, so at 554 the user device again asks for a lower beam angle, whereupon the base station increases the increment size to 3 units and applies it as shown. This overshoots the new optimum 550, so the user device then select a higher angle on the next feedback opportunity 555.

At this point, the base station changes the rules slightly. Previously, upon a reversal, the increment size was de-escalated by only 1 unit, that is, reduced from 3 to 2 units in that case. But the base station noted that de-escalating by only one unit tends to cause oscillatory motion, as in the 546-548 steps. In some systems, oscillation of the beam angle can be wasteful, or at least inconvenient to the base station. To avoid oscillations like that, the base station changes the rules so that now, upon a reversal, the increment size is reduced suddenly to the lowest value of 1 unit, instead of being de-escalated gradually. Therefore at 555, when the user device reversed and began requesting a positive change, the base station immediately reduced the increment size to 1 unit. That increment was then applied as shown 555. Reducing the step size to the lowest size upon a reversal is more conservative than reducing the size gradually, by one unit at a time. Oscillations are then limited to two reversals, at which time the compromise rule is invoked.

The base station adds the one-unit adjustment to the beam angle at 555, but the beam angle is still below the new optimum 550. Therefore, the user device again requests the higher beam angle at 556. The two successive positive requests should cause the base station to increase the increment size to two units at that point. However, doing so would return the beam angle to a previously-tested level 553. Specifically, applying a 2-unit increase at 556 would return the beam angle to 557 (dash) which equals the previously-tested level of 553, which would be a waste of time since that beam angle was recently tested and rejected by the user device. Therefore, the base station applies another exception at this point by not escalating the step size at all. Instead, the base station keeps the increment size at the smallest size, which is still 1 unit. The base station then applies an increment of 1 unit at 556. This brings the beam angle to 558, which is very close to the new optimum 550, and therefore is satisfactory. The beam angle then remains aligned with the new optimum thereafter, until conditions again change.

To summarize, the base station suppressed oscillations by de-escalating abruptly to the minimum size upon each reversal. If the user device tries to revisit a recently-tested angle, the base station also reduces the step size to the minimum. Upon a reversal while the increment size is already set to the minimum, the base station averages the two alternating beam directions and remains at that compromise setting until the user device requests two same-sign increments in succession.

In this example, the base station escalates the increment size first, and then rotates the beam direction by adding or subtracting the new increment size. In another embodiment, the order of action is reversed: the base station rotates the beam along the selected test signal direction first, and then performs the escalation of the step size. The former (escalate the step size first, then rotate the beam) is more aggressive at seeking the optimal angle when the error is large, but the latter (rotate beam first, then escalate) may reduce the incidence of oscillation. It is a matter of convention or network preference which action is performed first, escalation or rotation.

Figure 5C:
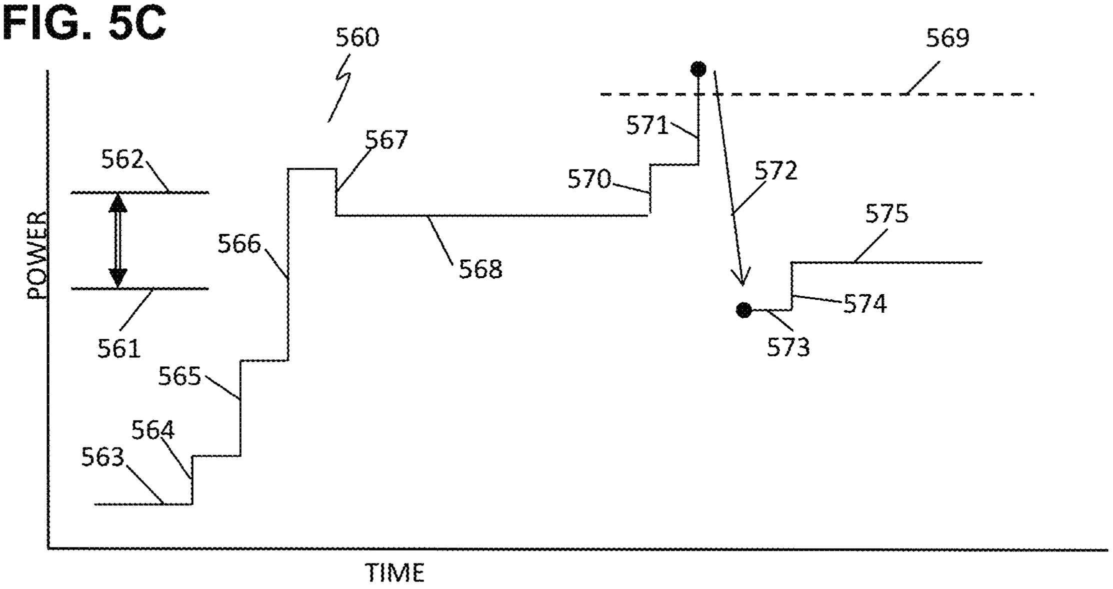
FIG. 5C is a schematic showing an exemplary embodiment of an iterative adjustment of transmission power, according to some embodiments.

FIG. 5C is a schematic showing an exemplary embodiment of an iterative adjustment of transmission power, according to some embodiments. As depicted in this non-limiting example, the transmitted power 560 is plotted vertically and time is horizontal. A doublewide arrow indicates a range of signal quality 561-562, within which the reception is acceptable. If the signal quality is below a lower threshold 561, the user device will ask for additional power at the next feedback opportunity. If the signal quality is above an upper threshold 562, the user device is obligated to request less power, to avoid generating excessive interference.

The base station successively adjusts the transmitted power level up and down by incremental changes, upon request by the user device, until the signal quality is within the acceptable range 561-562. The rules in this case call for the increment size to start out at the lowest size, initially. When the user requests the same sign of adjustment twice in succession, the increment size is doubled, and upon any reversal of sign, the increment size reverts to the smallest size. Upon two same-sign requests, the step size is doubled to 2 units, and upon the third same-sign request it is doubled again to 4 units, that is, a "binary" escalation. Then, upon a reversal, the base station reduces the increment size to the smallest size, 1 unit. In this case, a "reversal" includes changing from a positive to a negative request or vice-versa, or changing from zero to a non-zero request or vice-versa.

In this example, the width of the acceptable zone 561-562 is wider than the smallest size increment. This may avoid oscillations since any value within the acceptable zone would likely remain unchanged unless external conditions change.

Initially, at 563, the reception quality is poor because the transmitted power is too low. Upon receiving a message at 564, the user device measures the signal quality of the test signals provided with the message, and determines that the signal quality is below the lower signal quality threshold 561. Therefore the user device transmits a feedback message requesting an incrementally higher power level, which the base station applies at 564.

Later, at 565, the user device receives another message and again determines that the signal quality is below the acceptable range, and transmits feedback requesting a further incremental power increase. Having received two positive requests in a row, the base station then doubles the size of the increment and increases the power level by 2 units, as shown at 565. This is still below the lower threshold 561, so at 566 the user device requests a power increase a third time, whereupon the base station again doubles the increment size to 4 units and applies the power increment at 566. Thus the increment size is doubled upon each repeated request of the same sign.

The 4-unit increment 566 puts the power level above the upper threshold 562, which causes the user device to then select a lower power level on the next feedback. This reversal breaks the string of increases. Accordingly, the base station reduces the increment size back to the lowest 1-unit size, and applies it at 567. The last step 567 finally places the signal quality between the thresholds 561-562, and therefore the power level remains at 568.

At time 570, conditions change. Perhaps there is additional interference from outside the cell, or the mobile device moves farther from the base station, or other change. Consequently, the user device now requests additional power to compensate the losses, and receives a 1-unit increase 570, followed by a second request and a 2-unit power enhancement at 571. However, this would cause the transmitted power to be higher than the highest transmission power limit 569 (dash) permitted to the base station. The base station cannot exceed the upper limit 569 except in an emergency. Therefore, the base station decides to accommodate the user device by changing the modulation scheme instead of increasing the power.

The base station then changes to a different modulation scheme. In this case, the base station selects a modulation scheme that provides larger noise tolerance or a longer symbol-time or both, in an attempt to provide better reception to the user device, albeit with reduced information density. The modulation change is communicated to the user device in a downlink message 572 represented by an arrow. Because the new modulation scheme has better noise margins and/or a longer integration time per message element, the base station determines that the requested power increase is no longer necessary. Instead, the base station calculates that the new modulation scheme is sufficiently liberal that the power can safely be reduced, and will still provide sufficient signal quality to the user device. Therefore, the base station reduces the transmitted power to the level 573, instead of increasing it as requested. The base station estimates that the new power level 573 may be suitable, given the modulation change. In this case, the new power level is close to the desired signal quality range 561-562. Then, after slight fine-tuning at 574, the power level remains at 575 which is between the thresholds 561-552, and the base station continues to use the downgraded modulation scheme for communicating with the user device until conditions again warrant another change.

Figure 6A:
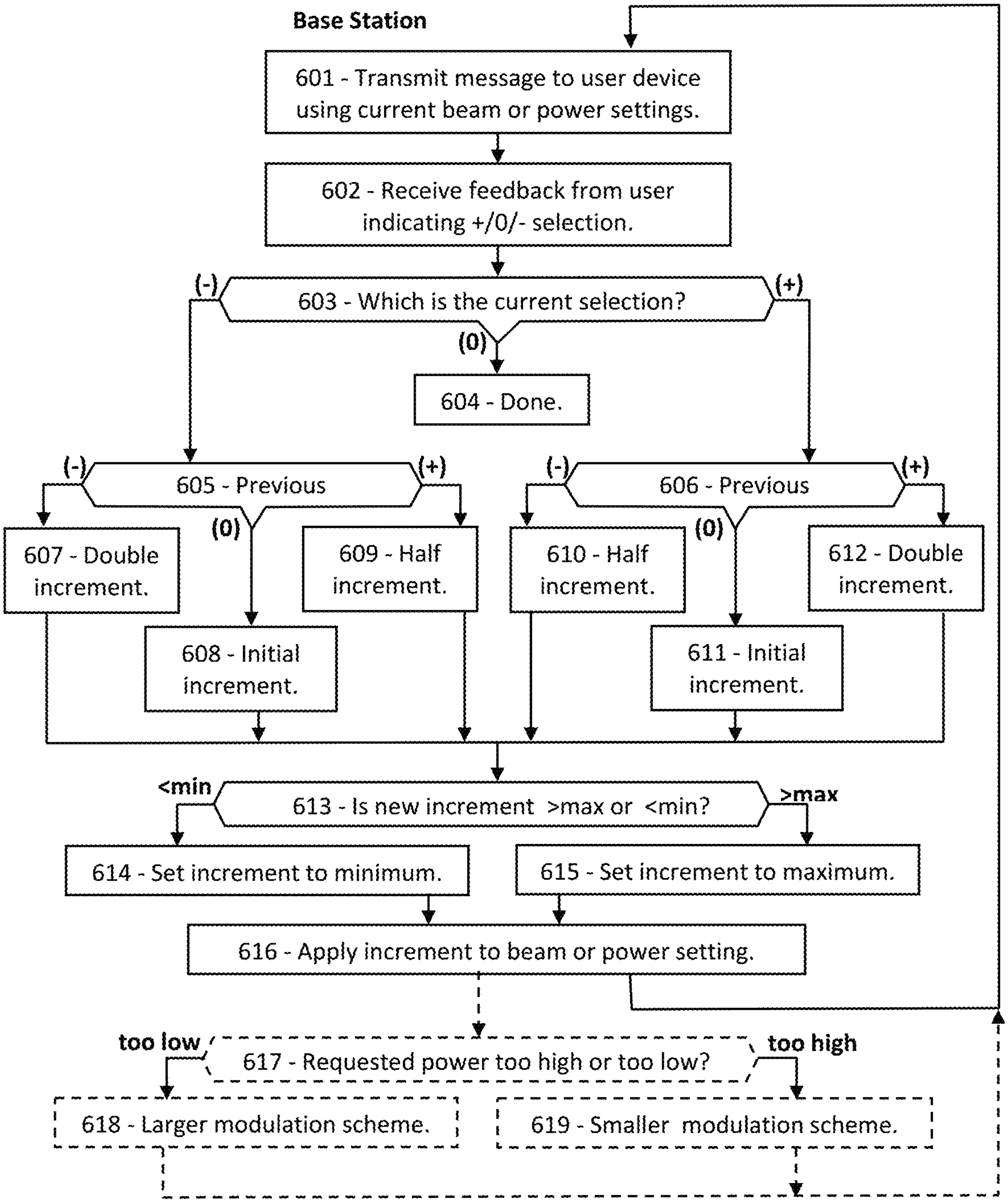
FIG. 6A is a flowchart showing an exemplary embodiment of a method for iteratively adjusting a transmission parameter, according to some embodiments.

FIG. 6A is a flowchart showing an exemplary embodiment of a method for iteratively, incrementally adjusting a transmission parameter, according to some embodiments. As depicted in this non-limiting example, a base station adjusts a transmission parameter (such as power or beam angle) incrementally up or down, according to a +/0/− feedback request from a user device. The increment size is variable, but is limited to a predetermined range between a minimum and maximum increment size. For example, the permitted increment sizes may be 1, 2, 3, 4, 5, 6, 7, 8 units. Initially, the increment size is set at 2 units in this case. On repeated requests for the same sign of increment, the increment size is doubled. On a reversal from positive to negative or vice-versa, the increment size is halved. If the user requests zero change, and then subsequently requests a positive or negative change, then the increment size is returned to the initial size of 2 units.

At 601, a base station transmits a downlink message to a user device using the current setting of a transmission parameter such as the beam angle or the transmission power. At 602, the base station receives a feedback message, optionally multiplexed with an acknowledgement for the downlink message, including a +/0/− feedback indicator for the transmission parameter. For example, the feedback indicator can have 3 modulation states, such as a positive amplitude, zero amplitude, and negative amplitude, corresponding to a selection of increasing, keeping unchanged, or decreasing the parameter setting. The user device may or may not know the actual value of the transmission parameter being varied, nor which selection corresponds to which increment. The base station is responsible for interpreting the feedback message, adjusting the increment size, and applying the requested adjustment.

At 603, the base station interprets the feedback message and determines whether the user device requests a positive (+) or negative (−) or zero change (0), as indicated by a three-output interrogator. If the user device selects zero change, the task is done at 604.

The base station then compares the current request with the previous selection. At 605, responsive to a negative change request, the base station doubles the increment size at 607 if the previous selection was also negative. The base station halves the increment size at 609 if the previous selection was positive. The base station restores the increment size to the initial value at 608 if the previous selection was zero. Likewise, responsive to a positive change request 606, the base station doubles the increment size at 612 if the previous selection was also positive, or halves the increment size at 610 if the previous selection was negative, and restores the increment size to the initial value at 611 if the previous selection was zero.

Then at 613, the base station checks whether the adjusted increment size is outside the max-min range, and if so, sets it to a minimum at 614 or to a maximum at 615. The base station then applies the increment at 616 to the parameter, thereby adjusting the beam angle or power, and waits for another message opportunity.

Optionally, in dash, the base station may switch to a larger or smaller modulation scheme when the requested power reaches a predetermined power limits. For example, at 617 the base station can check whether the requested power level is higher than a predetermined high power limit or lower than a lower limit. If the requested power is below the lower limit, this indicates that reception is so good that the throughput can be increased by selecting a larger (more bits per message element) modulation scheme at 618. On the other hand, when the requested power exceeds the transmission capabilities of the base station (or its regulation limits), then the base station can determine that the current modulation scheme is no longer suitable, and may switch to a smaller scheme 619 that has a larger separation between the modulation states, and hence a larger noise margin. If necessary, the base station may also switch to a lower numerology for longer integration times, or other strategy to achieve satisfactory communications with the user device.

The base station and the user device, in cooperation, have adjusted a beam parameter (or multiple multiplexed parameters) upon each downlink message. The incrementation selection was made according to the received signal quality. The adjustments were thus accomplished in realtime, with minimal-to-negligible expenditure of resources.

Figure 6B:
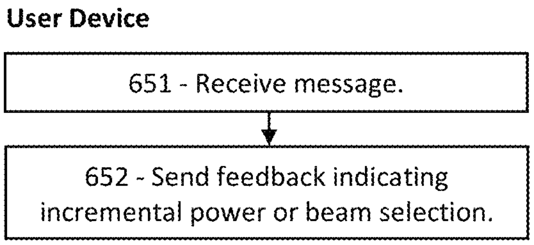
FIG. 6B is a flowchart showing an exemplary embodiment of a method for providing iterative feedback, according to some embodiments.

FIG. 6B is a flowchart showing an exemplary embodiment of a method for a user device to provide incremental feedback, according to some embodiments. As depicted in this non-limiting example, a user device receives a downlink message at 651. The downlink message may include multiple (such as three) test signals, and/or other message items which the user device can measure. The user device can then select one of the test signals as the favored version. At 652, the user device transmits a feedback message to the base station indicating one or more requests, responsive to the downlink message and its associated test signals or the like. For example, the feedback message may indicate a preferred selection of beam angles, or a request for higher or lower transmission power, or other transmission parameter.

The incrementation parameters can be established by convention or standard, and can be altered as needed by the base station or core network based on conditions. The increment can be changed in a linear or binary or other escalation formula. The base station can determine the number of equal-sign requests that cause an escalation, and whether the increment size is then decreased upon direction reversal and by how much, and whether to suppress oscillation by providing fractional-sized increments or a range of acceptable performance metrics or otherwise, and whether to avoid repeating previously tested values unless the increment size is at minimum, and how to limit the range of increment sizes, and how many increment sizes to allow, among many other variables that may be beneficially configured. In addition, it is the base station's option to change to a lower modulation scheme whenever the requested power exceeds a predetermined transmission limit, and to change to a higher modulation scheme (that is, with higher throughput) whenever the requested power drops below a lower limit (not shown).

Making changes to incrementation parameters, according to complex realtime network conditions and user demands, is a hard problem of the type that humans generally do poorly. AI is well suited to this type of multivariate optimization problem. Therefore, an artificial intelligence model may be developed to regulate the incrementation parameters in realtime, as described below.

AI-Managed Incrementation

In some embodiments, the base station can use an AI algorithm to determine which escalation rules and values to apply in incremental feedback adjustments. For example, an AI model can determine which set of rules to invoke depending on current conditions, and how to escalate or de-escalate the increment size, and when to apply an exception, and how to set limits, among several other options. Such complex realtime problems are difficult to foresee, and difficult for humans to manage when things happen on a millisecond time scale. Brute-force software, to account for the multitude of possible circumstances and incrementation options, would be unwieldy if not impossible. Fortunately, AI is competent in general to handle such problems. After being trained on actual network performance data under a variety of incrementation rules and conditions, the AI model can manage the incrementation process to adjust beam angles, transmission power levels, and other parameters related to communications. The AI model must be trained on network data to seek some kind of optimization, such as overall network performance or user experience, which may be represented by a metric for example. The AI model variables are then adjusted to provide satisfactory decisions based on the user's incremental feedback. With such automatic, realtime control, the network may provide substantially improved messaging throughput, reliability, efficiency, and user satisfaction overall.

An AI model or a machine learning routine may be employed to configure the incrementation features and settings, as depicted in the next figure. For example, the optimal configuration of beam angle incrementation may depend on the number and angular distribution of active user devices, because if the user devices are more widely spaced apart, they are less likely to encounter interference from signals beamed to another user. However, the user spacing may vary substantially during each day as users come and go, necessitating changes in the incrementation procedure as conditions change. Likewise the beam power incrementation rate, and associated rules, may depend on the radial distribution of user devices, because different distances from the base station generally require different transmission power. In addition, the optimal beam width may be adjusted, depending on the distribution of radial and angular separations of those devices, yet this optimum also varies substantially through the day. For these and many other reasons, it may be necessary, or at least preferred, to develop an AI/ML model to adjust the incremental feedback responses.

Accordingly, an algorithm is disclosed, consisting of or derived from an AI model, which is trained by machine learning with abundant network data as examples. The AI model may take as input, various network conditions, current user device distributions, external noise/interference, and other input parameters relevant to feedback responses regarding transmission. The AI model may provide as output, parameters of a suggested incremental feedback protocol, which may include values such as the number of incrementation sizes, and their values; whether to escalate the incrementation size in a linear or binary or other manner; under what conditions to change the increment size and when to apply the increment; when to change the modulation scheme instead of incrementing, and how to compensate the transmission parameter accordingly; and the other operational choices and issues listed in the previous paragraphs. In one embodiment, the base station may use the AI model itself to select each incrementation adjustment of each user device's beam direction. In another embodiment however (and probably more conveniently), the base station may use the AI model to determine suitable rules and values for incrementation responsive to each user device's conditions, and then allow a simpler software algorithm can carry out the realtime changes according to those rules and values.

With such a model or algorithm, base stations may be able to manage communications more efficiently and with less wasted power that prior art adjustment schemes, while generating less background energy and providing improved reliability overall.

Figure 7A:
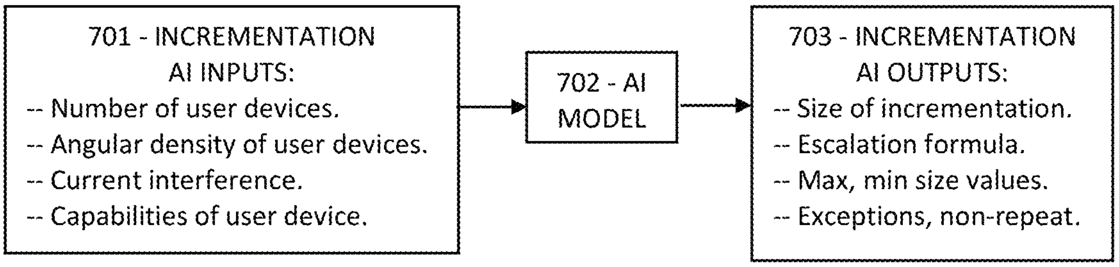
FIG. 7A is a flowchart showing an exemplary embodiment of a procedure for operating an AI model, according to some embodiments.

FIG. 7A is a flowchart showing an exemplary embodiment of a procedure for operating an AI model to adjust the incrementation parameters of an incremental feedback procedure, according to some embodiments. As depicted in this non-limiting example, an AI model 702 takes as input 701 a number of incrementation parameters related to a particular user device. The inputs may include data related to the network such as the distribution of user devices versus distance from the base station (which affects power required) and the angular distribution (which affects interference), as well as the variation in active users during each day, or during weekends versus weekdays, among other factors. The inputs may include data related to communications such as the network throughput, delays, fault rates, and traffic density among others. The inputs may include data related to the particular user device such as its most recent feedback requests, its proximity to the base station, noise and interference experienced by that user device, and its signal processing and beamforming capabilities, among others. The inputs may include data related to the incrementation such as the range of allowed increment sizes, a current increment value, the user device's recent feedback requests, and certain rules governing how the increment size is escalated and de-escalated, among others. The inputs related to transmission may include a beam power or direction or width, and a modulation scheme in which the test signals are modulated, among others.

The AI model 702 may provide as output 703 recommendations regarding the incrementation of beam angles, transmission power, or other transmission parameters. The outputs may include the recommended size of the incrementation step, the escalation formula (such as linear or binary escalation) and when to escalate the size, the maximum and minimum limits of the incrementation step and of the transmission parameter itself, and when to invoke exceptions to the rules such as the no-repeat exception.

Figure 7B:
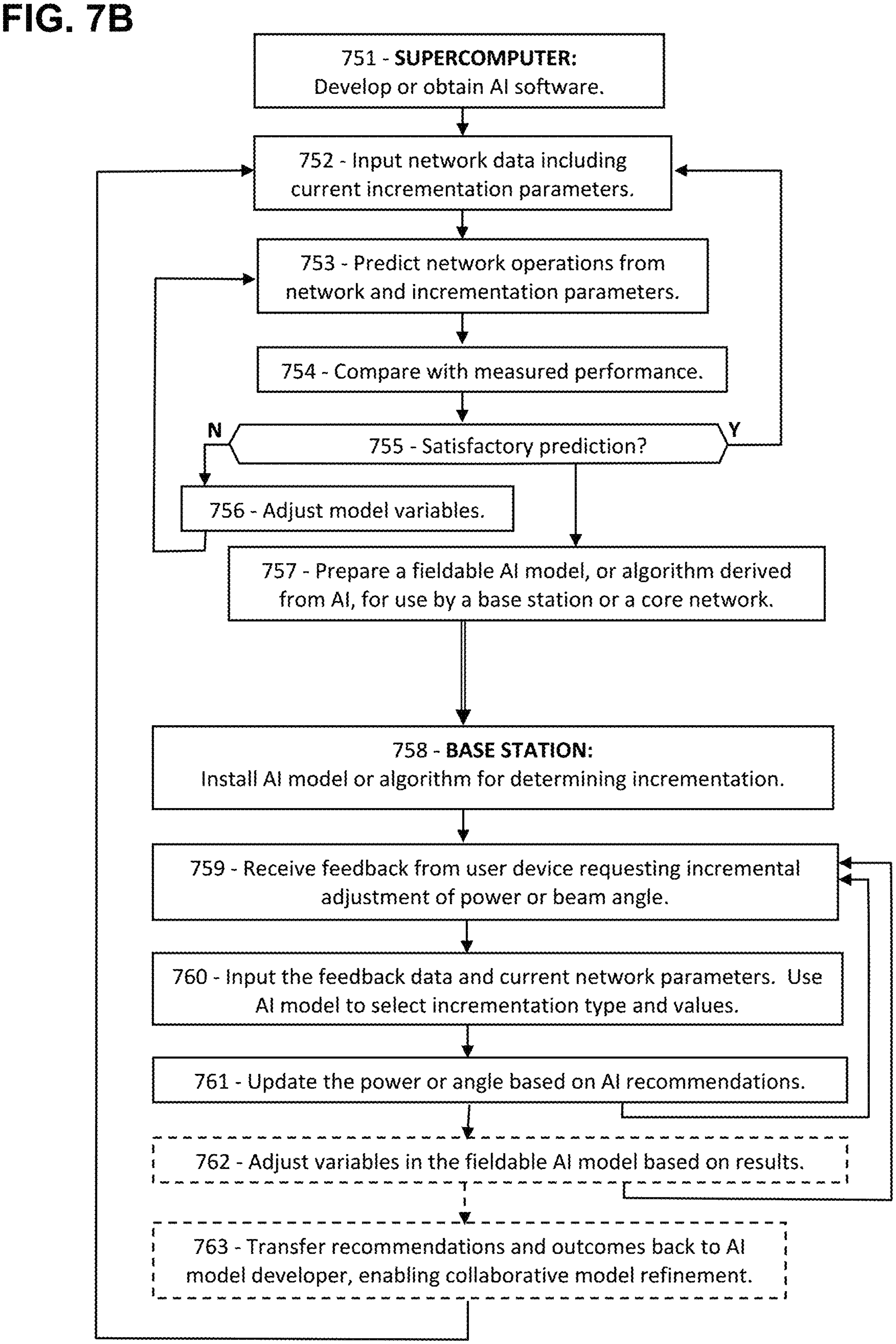
FIG. 7B is a flowchart showing an exemplary embodiment of a procedure for preparing an AI model, according to some embodiments.

FIG. 7B is a flowchart showing an exemplary embodiment of a procedure for preparing an AI model, according to some embodiments. As depicted in this non-limiting example, an AI model is prepared for a base station or a user device to use in connection with incremental feedback adjustments such as beam angle adjustments and beam power adjustments. In the example, the depicted model is configured to assist the base station (or its core network) in managing an incrementation parameter such as step size.

At 751, software for an AI model is acquired or developed or otherwise obtained for a supercomputer, or other processor suitable for developing an AI model. The AI model includes a plurality of inputs, a plurality of adjustable variables, and one or more outputs that depend on the inputs and the adjustable variables. At 752, network operational data is acquired for training the AI model, such as message throughput, average delay, failure rate, and other network performance parameters. The inputs may also include which parameters were in use when the network performance data were taken, such as the default increment size, the escalation formula (such as linear or binary) for increasing or decreasing the increment size, rules regarding direction reversal and no-repeat exceptions, among other possible parameters of the incremental adjustment process.

At 753, the AI model is operated to predict the future network operations, or a network performance metric, according to the input network parameters and the incrementation parameters. At 754, the prediction is compared with actual network performance data acquired while a network operated using those incrementation parameters. At 755, the accuracy of the prediction is evaluated. If the prediction is determined to be not satisfactory (that is, the predictions failed to agree with the actual network performance after the incrementation), the model variables are adjusted at 756 to improve the predictive power, and the flow then returns to the prediction and comparison steps for further refinement. If, however, the prediction is deemed satisfactory (predictions based on the input data largely agreed with subsequent network performance), the flow returns to 752 to repeat the procedure with a different set of network and incrementation parameters. The applicability and accuracy of the AI model are thereby broadened for eventual field use.

At 757, the predictions are determined to be satisfactory for a variety of network and incrementation conditions. Then the AI model, or an algorithm derived from it, is prepared for field use by a base station or a core network.

At 758, as indicated by a doublewide arrow, the AI model, or a trimmed version of it, or an algorithm derived from it, is installed in a base station or a core network. The purpose of the fielded AI model or algorithm is to determine the incrementation parameters most suitable for use according to the current operating conditions of that network. Alternatively, or in addition, the fielded AI model or algorithm may be configured to predict changes in network performance consequent to proposed changes in the incrementation parameters. If the network accumulates enough experience with the AI model, and develops trust in its predictions, the network may decide to allow the AI model to autonomously adjust the incrementation parameters in realtime, instead of having humans interpret the AI results and apply the changes themselves. Direct AI management of operations may thereby enable realtime optimization of parameters without human involvement, other than light supervision.

At 759, the base station (or core network) receives a feedback message from a user device requesting an incremental change to the power or angle of the transmission beam toward that user device. At 760, the feedback request and the current network conditions are provided to the AI model (or algorithm, etc.), which then selects the most suitable type of incrementation to apply (such as linear or binary escalation), and the incrementation values (such as initial, minimum, and maximum increment size), and exceptions (such as no-repeat) among many other possible parameters of the incrementation procedure. The parameters may be customized for each beam parameter (power, angle, width, etc.) and for each user device in the network.

At 761, the transmission beam is adjusted according to the AI outputs and the requested change, and the flow returns to 759 for the next feedback message. As mentioned, that adjustment may be done by the model or by a human interpreting the model outputs.

Optionally, at 762 (dash) the base station (or core network) can attempt to adjust the AI model variables in the field unit, based on the results observed by that base station. To assist the base station in choosing the right variables to vary, the supercomputer that developed the AI model may have determined which variables are associated with various types of faults, or a particular network condition, or a common incrementation problems. With that knowledge, the base station can then vary the AI variables, in the base station's field version of the AI model, with knowledge of which variables affect the problem in question. Thus each base station can adapt its version of the AI model to better respond to the base station's own situations. However, if those changes result in worse network performance, the base station or core network can reverse adjustments and return to the previously configured parameters, or perhaps adjust the variables in the opposite sense, or other strategy as seems appropriate to the base station. With knowledge of which variables can be altered to affect which types of problems, the base station can iteratively adapt the fieldable AI model to the specific current conditions in realtime, based on the types of feedback received and current network conditions, and thereby improve the predictions under those conditions.

Optionally, at 763, the base station (or core network) can prepare an operational history of the feedback requests, output recommendations of the model, the variables adjusted by the base station if any, and the resulting network performance changes. The base station or core network can then send the operational history back to the AI model developer. The supercomputer can then take the operational history as new field data for further refinement of the AI model. Collaborative model refinement, between the model developer and the model user, can result in rapid adaptation of the AI model for real-world networking applications.

Modulation Schemes for Feedback

The following figures show certain modulation schemes configured to efficiently transmit feedback messages, along with prior art schemes for comparison.

Figure 8A:
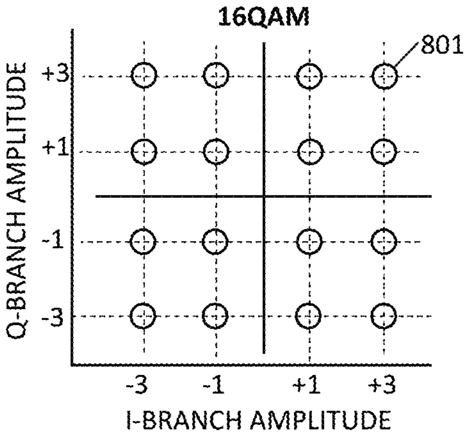
FIG. 8A PRIOR ART
FIG. 8A is a schematic showing an exemplary embodiment of a 16QAM modulation constellation chart, according to prior art.

FIG. 8A is a schematic showing an exemplary embodiment of a 16QAM constellation chart, according to prior art. As depicted in this non-limiting example, a 16QAM constellation chart includes 16 allowed states 801, each allowed state 801 configured as two orthogonal amplitude-modulated sinusoidal signals termed the I-branch (horizontally) and the Q-branch (vertically). Each branch is amplitude modulated according to a set of predetermined amplitude levels, in this case −3, −1, +1, and +3 arbitrary units. The central cross shape represents zero amplitude.

Figure 8B:
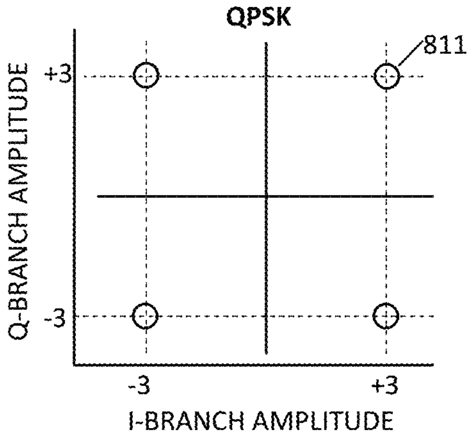
FIG. 8B PRIOR ART
FIG. 8B is a schematic showing an exemplary embodiment of a QPSK modulation constellation chart, according to prior art.

FIG. 8B is a schematic showing an exemplary embodiment of a QPSK modulation constellation chart, according to prior art. As depicted in this non-limiting example, QPSK includes four allowed states 811 which here are modulated with I and Q branches equal in magnitude, at the maximum branch amplitude of +3 arbitrary units. Other QPSK schemes are rotated by 45 degrees. An advantage of QPSK is that a receiver can demodulate a message transmitted in QPSK without calibrating the amplitude scale, as long as the receiver is time-synchronized with the transmitter. The states 111 differ in phase only, so the received amplitude (which depends on many unknowns) is not relevant to demodulation with this modulation scheme. Many system-information and control messages are transmitted in QPSK for that reason, when no amplitude calibration or demodulation references are present or needed. However, QPSK delivers only two bits per message element, and hence those messages tend to occupy large regions of the resource grid.

Figure 9A:
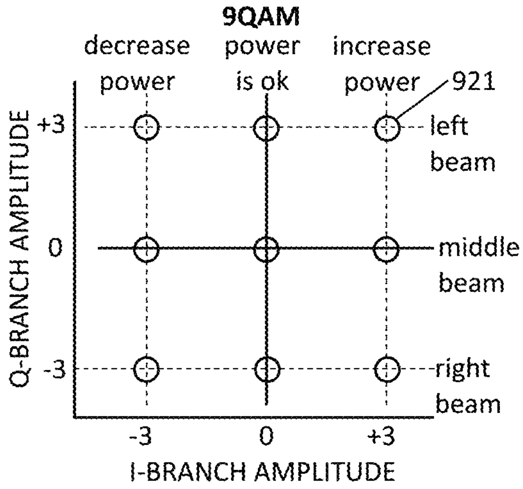
FIG. 9A is a schematic showing an exemplary embodiment of a 9QAM constellation chart, according to some embodiments.

FIG. 9A is a schematic showing an exemplary embodiment of a 9QAM constellation chart, according to some embodiments. As depicted in this non-limiting example, nine allowed states 921 are each configured with an I-branch and a Q-branch, and each branch is amplitude-modulated according to three predetermined amplitude levels, which in this case are +3, 0, and −3 arbitrary units. Thus the non-zero predetermined amplitude levels have the same amplitude as the maximum positive or negative amplitude levels of 16QAM and QPSK. In addition, there are states with zero transmission in one or both branches, which the standard modulation schemes lack. As mentioned, the receiver can generally discern a zero-power branch from a full-power branch, and can discern positive amplitude from negative amplitude, without having calibrated the amplitude scale. Hence a receiver can demodulate the 9QAM message natively, without calibrating the predetermined amplitude levels and without a prior demodulation reference. (There may be an exception in case of an extremely weak signal, so weak that the base station cannot reliably discriminate a zero amplitude from a non-zero amplitude. In such cases, however, then the SNR is likely so bad that communication is impossible anyway. Therefore such cases are ignored herein.)

Also shown are headings indicating what each of the predetermined branch amplitude levels may represent. Each branch may encode a different parameter such as incremental feedback of the beam angle or power. For example, the I-branch amplitudes may represent a request for an increase or decrease in transmission power, or a request to leave the transmission power unchanged. In the depicted case, +3 means to increase the power by some predetermined increment, −3 means to decrease it, and 0 means to leave it unchanged. In a similar way, the Q-branch levels may indicate which of three candidate beam directions provide the best reception, which are represented as the left, middle, and right beams or the first, second, and third test signals. Thus the receiver can request a transmission power adjustment and a beam alignment adjustment, all multiplexed in a single resource element, and which is demodulatable natively without an amplitude calibration. The base station, upon receiving the feedback resource element, can extract the I and Q amplitudes, determine whether the user requests a change in power or beam angle, and can then incrementally adjust the power or beam angle accordingly. Such an incremental adjustment, provided by the base station for each downlink message, may be more timely and less costly than the complex messages normally used for alignment and power control.

The base station is responsible for interpreting the feedback choices and adjusting the transmission beam accordingly. The user device may not know, or care, which transmission parameter is involved, nor which candidate values of those parameters appear in which test signals. In this case, the user device indicates which test signal has the best signal quality or received power, and the base station is responsible for responding accordingly. For example, the downlink data message may include three test signals, each directed in incrementally different beam directions. A first test signal may be transmitted in the same direction as the data message, and the other two test signals may be directed that direction plus or minus an angular increment (such as, say, ±10 degrees). The user device can then compare the signal quality in the three test signals, and can select which test signal had the best signal quality or received power, and can indicate that choice in the Q-branch of the feedback message, as shown. The base station can then adjust the beam direction as requested.

In some embodiments, the first test signal/demodulation reference is concatenated with the start of the message. The message is transmitted with the same beam as the first test signal. The other two test signals are concatenated with the end of the message, and are aimed in slightly higher and lower beam angles. The user device can then select which of the three test signals provides the best signal quality, thereby providing feedback on beam angle, and can also demodulate the message according to the leading test signal/demodulation reference. In addition, the user device can measure the signal quality of the best test signal, thereby determining whether additional transmission power is needed, and can include feedback on the transmission power along with the feedback on beam angle. Hence the test signals are doing triple duty: demodulation reference, beam alignment test signal, and transmission power test signal.

In some embodiments, each test signal may be a short-form demodulation reference configured to indicate modulation levels from which all the others can be calculated. For example, the test signal may occupy a single resource element in which the I-branch is amplitude modulated according to the maximum predetermined amplitude level of the modulation scheme and the Q-branch is the minimum amplitude level. The first test signal then serves as a beam-angle test signal and as a demodulation reference. For example, the receiver can use the test signal to recalibrate the predetermined amplitude levels of the modulation scheme of the message associated with the leading test signal. In addition, the trailing test signals, transmitted differently from the message elements, may still serve as phase tracking reference signals for refining the synchronization. Since the test signals are concatenated with the message, the recalibration is "fresh" and may result in improved noise cancellation.

An advantage of 9QAM, as a modulation scheme for the feedback message, may be versatility, since the user device can multiplex two incremental adjustment requests within a single 9QAM resource element, as shown. The base station can then separate the feedback message into the I and Q branches, extract the two different types of feedback information, and determine which option, of the three options, is requested for each branch. Another advantage may be reliability, since the receiver is generally able to discriminate between positive, negative, and zero signals with high reliability, even without a demodulation reference, and without calibrating the amplitude. In contrast, modulation schemes that have 4 amplitude modulation, such as 16QAM, generally require a demodulation reference for amplitude calibration. Another advantage may be that 9QAM provides slightly over 3 bits per message element, as opposed to 2 bits with QPSK, and hence a message modulated in 9QAM is shorter than the same information modulated with QPSK. (All of these advantages assume, as mentioned, that the receiver has been time-synchronized with the transmitter, and that sufficient SNR is present.)

Figure 9B:
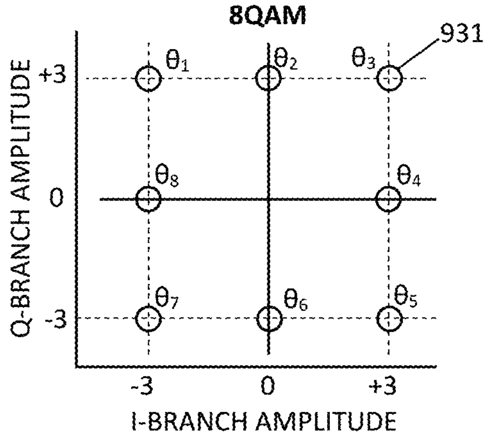
FIG. 9B is a schematic showing an exemplary embodiment of a 8QAM constellation chart, according to some embodiments.

FIG. 9B is a schematic showing an exemplary embodiment of an 8QAM constellation chart, according to some embodiments. As depicted in this non-limiting example, 8QAM includes states 931 similar to 9QAM of the previous figure, but without the central 0,0 state. Thus all of the allowed states in 8QAM include power transmitted in at least one of the I or Q branches. 8QAM may be preferable when there is a choice among 8 items, such as 8 angles ($\theta_1$ etc. as shown), since it provides 45 degrees of phase separation between adjacent states. 8QAM provides exactly 3 bits per message element, and thus messages will be ⅔ as long relative to QPSK.

Figure 10A:
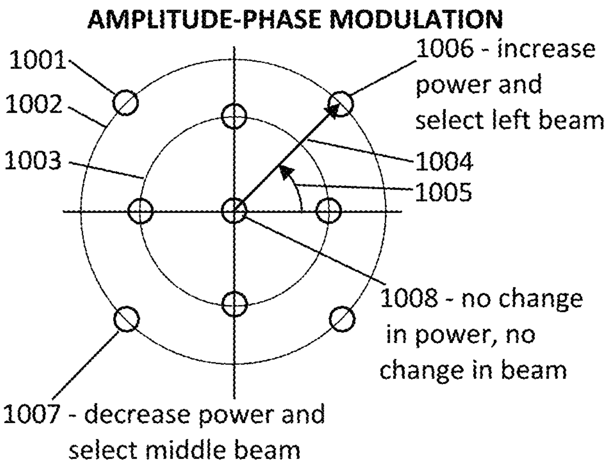
FIG. 10A is a schematic showing an exemplary embodiment of a polar plot of an amplitude-phase modulation scheme, according to some embodiments.

FIG. 10A is a schematic showing an exemplary embodiment of a polar plot of an amplitude-phase modulation scheme, according to some embodiments. As depicted in this non-limiting example, states 1001 of a modulation scheme are modulated using amplitude modulation multiplexed with phase modulation, as shown. Amplitudes are represented by circles 1002, 1003 and by a radius vector 1004, while phase is represented by an angle 1005. The modulation scheme includes nine states, each modulated in amplitude and phase. The nine states 1001 include four states with a large amplitude 1002 (such as five arbitrary units), four states with a smaller amplitude 1003 (such as three arbitrary units), and a central state with zero amplitude. As in the previous example, the amplitude-phase modulated states 1001 can encode two multiplexed feedback parameters, such as transmission power and beam angle. For example, state 1006 with the maximum amplitude level 1002, and a phase angle of 45 degrees, may represent a request to increase the power by one increment, and to prefer the second demodulation reference. That is, the resource element is modulated to indicate the power feedback in the amplitude, and the beam angle feedback in the phase, simultaneously. In a similar way, state 1007 may request a decrease in power and no change in angle. As with the previous example, the central state 1008 may indicate no change in the power or beam direction.

Each state 1001 in the depicted example has a full 90-degree phase acceptance region, since all the states are separated from their equal-amplitude neighbors by 90 degrees. Therefore the modulation scheme is able to accommodate substantial phase noise without faulting. 16QAM, and other prior-art schemes carrying more than 2 bits, generally do not have that feature, because some of their states are closer together than 90 degrees. As a further advantage of 9-state amplitude-phase modulation, the large-amplitude states 1002 are spaced apart in phase by 45 degrees from the closest small-amplitude states 1003, and vice-versa. This large separation in both phase and amplitude thereby provides additional noise margins, for unambiguous demodulation despite substantial amplitude noise and phase noise. As with 9QAM, the 9-state amplitude-phase modulated states can provide incremental feedback on two different transmission parameters in a single resource element. In this case, the two parameters are the beam power and beam angle. As a further advantage, the 9-states amplitude-phase modulation states, without an amplitude calibration, correspond to an 8PSK modulation scheme (45 degree phase separations) plus the central 0,0 state. Therefore, the receiver can demodulate the 9-state amplitude-phase states natively, without an amplitude calibration, by measuring the phase.

The base station or the user device can determine whether to use 9QAM or the 9-state amplitude-phase modulation scheme for compact feedback messages depending on reception, interference, and network conditions. For example, the base station or the user device can include an algorithm, derived from artificial intelligence using machine learning, to select the most appropriate modulation scheme. For example, if phase noise is high enough to cause excessive phase faults, the AI-derived algorithm can recommend switching to the amplitude-phase modulation scheme instead, for improved phase noise tolerance. This option may be especially important at high frequencies.

An advantage of 8/9QAM may be that there may be no need for a demodulation reference. The receiver may be able to unambiguously demodulate resource elements modulated in 8/9QAM without first determining the amplitude levels of the modulation scheme. Demodulation references are required for accurate amplitude demodulation, but if the task is merely to determine whether a signal is positive, negative, or zero, there may be no need for a calibration. Most receivers are capable of demodulating QPSK, which does not require a demodulation reference because the amplitude is not a modulation parameter, and the phase is readily recognized after synchronization. In the same way, receivers may be able to demodulate 8/9QAM based on the presence or absence of signal, and whether it has positive or negative sign, regardless of the magnitude. Thus a receiver capable of demodulating QPSK natively at 2 bits per message element should be able to demodulate 8/9QAM or 8/9-state amplitude-phase modulation natively, for the same reason.

8QAM carries 3 bits per message element, as does the 8-state amplitude-phase modulation scheme. Higher information density may be possible, even in difficult noise/interference environments, using asymmetric modulation. For example, asymmetric modulation schemes that may be advantageous include 3×4QAM and 5×3QAM. Alternatively, if a large phase-noise tolerance is required, amplitude-phase modulation schemes with 9 or 17 allowed states are available, and which generally resist phase faults much better than any QAM version, as detailed below.

Figure 10B:
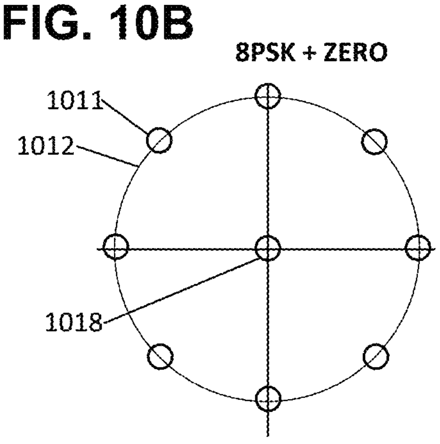
FIG. 10B is a schematic showing an exemplary embodiment of a polar plot of an 8PSK modulation scheme with a zero-power state, according to some embodiments.

FIG. 10B is a schematic showing an exemplary embodiment of a polar plot of an 8PSK modulation scheme plus a zero-power state, according to some embodiments. As depicted in this non-limiting example, a modulation scheme that includes 8PSK states 1011 plus a central zero-power state 1018 can transmit over three bits of information per message element, or two multiplexed feedback parameters each with +/0/− selectivity, without a prior amplitude calibration. The 8PSK states 1011 are generally transmitted with the same amplitude 1012 and with a phase separation of 45 degrees, while the central state has no power. An advantage of this modulation scheme may be that it carries 50% more information density than QPSK while still providing a substantial phase margin. Another advantage may be that the zero-power state can reveal external interference, including measuring the amplitude and phase of the interference if it is large enough.

Thus the base station can choose between a variety of modulation schemes including quadrature amplitude modulation with eight (FIG. 9B) or nine (FIG. 9A) states, or multiplexed amplitude-phase modulation with eight or nine states (FIG. 10A), or 8-state phase-shift keying plus a zero power state (FIG. 10B), among others disclosed below.

When combined with an acknowledgement for each downlink message, the multiplexed incremental feedback disclosed above can keep the base station's beams aligned in realtime, for each user device individually, at an insignificant cost compared with the message-heavy feedback protocols of the prior art.

Figure 11A:
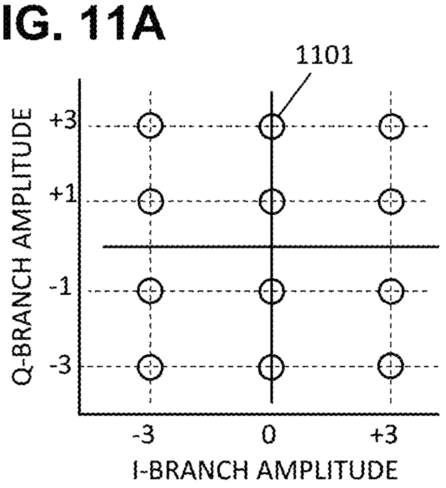
FIG. 11A is a constellation chart showing an exemplary embodiment of an asymmetric QAM modulation scheme, according to some embodiments.

FIG. 11A is a constellation chart showing an exemplary embodiment of an asymmetric QAM modulation scheme, according to some embodiments. As depicted in this non-limiting example, an asymmetric 3×4QAM modulation scheme includes 12 allowed states 1101 distributed across three I-branch amplitudes (here +3, 0, −3 arbitrary units) and four Q-branch amplitudes (+3, +1, −1, −3 units). Guidelines are shown dotted. The central cross shape represents zero amplitude. The pattern has rectangular symmetry since a 180-degree rotation reproduces the pattern, but not square symmetry because a 90-degree rotation does not. The scheme provides almost 3.6 bits per message element.

The depicted modulation scheme may be advantageous in applications wherein feedback selections are to be communicated for two different parameters, all in a single multiplexed message element. For example, the feedback may include selecting one of three power levels (such as increase, decrease, and stay the same), and selecting one of four beam angles. Using the 3×4QAM arrangement of states, the user device can specify its feedback request for both beam parameters in a single resource element, according to some embodiments.

Figure 11B:
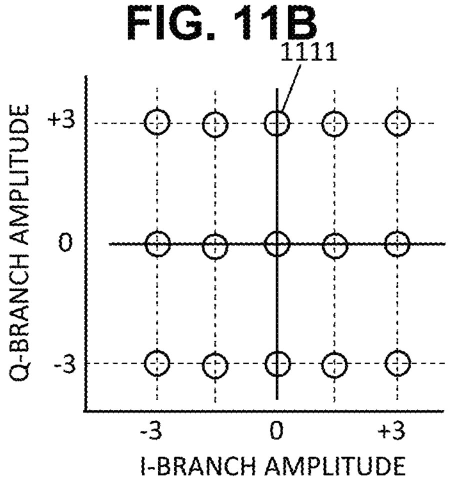
FIG. 11B is a constellation chart showing an exemplary embodiment of another asymmetric QAM modulation scheme, according to some embodiments.

FIG. 11B is a constellation chart showing an exemplary embodiment of another asymmetric QAM modulation scheme, according to some embodiments. As depicted in this non-limiting example, an asymmetric 5×3QAM modulation scheme with five I-branch amplitude levels (+3, +1.5, 0, −1.5, −3 units) is multiplexed with three Q-branch amplitude levels (+3, 0, −3 units), generating 15 allowed states 1111. This delivers 3.9 bits per message element, almost the same as 16QAM, but tailored to a multiplexed feedback message involving two different parameters with a one-of-three selection multiplexed with a one-of-five selection, in this example.

As an alternative, the 5×3QAM scheme may be provided by selecting just 15 states of a larger scheme, such as 25QAM. The remaining ten states may be used for some other purpose. An advantage of a one-of-five selection may be that a feedback parameter can be specified with more versatility than a one-of-three choice. For example, the five options may represent a request of no change (0), a small positive or negative change (±1.5), or a maximal positive or negative change (±3). While these requests can be represented by a larger standard modulation scheme, such as 64QAM, the level spacing of 25QAM (and therefore the noise margins) are generally larger than for 64QAM. Hence the non-standard QAM modulation schemes disclosed here, including with zero branch states, or a zero central state, or odd numbers of predetermined branch amplitude levels, or different numbers of levels in the two branches, may be considered for particular applications requiring such benefits.

Figure 12A:
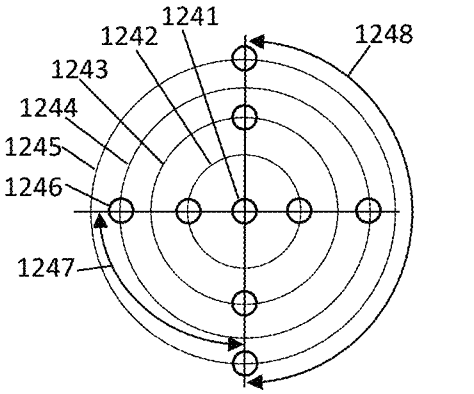
FIG. 12A is a polar plot showing an exemplary embodiment of an amplitude-phase modulation scheme with 9 states, according to some embodiments.

FIG. 12A is a polar plot showing an exemplary embodiment of an amplitude-phase modulation scheme with 9 states, according to some embodiments. As depicted in this non-limiting example, an amplitude-phase modulation scheme includes states that are both amplitude modulated and phase modulated. There are no branches. In this example, each allowed state 1246 is amplitude modulated according to non-zero levels 1242, 1243, 1244, 1245 as well as a zero-amplitude state 1241. The phase modulation levels are 0, 90, 180, 270 degrees (or alternatively, the same rotated by 45 degrees). Each state 1246 is separated from the other equal-amplitude state by 180 degrees, as indicated at 1248. In addition, each state is separated from the nearest equal-phase state by two amplitude levels. In addition, each state is separated from other states by 90 degrees in phase plus one amplitude level as indicated at 1247. Due to the relatively large phase separations between states, the 9-state amplitude-phase modulation scheme can provide a high degree of phase-noise tolerance. In addition, the amplitude-noise tolerance is also high, due to the multiple amplitude levels between equal-phase states. The scheme provides slightly over 3 bits per message element.

In some applications, the zero state 1241 may be problematic since it contains no detectable signal. In those applications, the remaining 8 states can be used instead, thereby providing 3 bits per message element. In that case, the central zero-power state may represent a special function such as demarking the start and end of a message. Messages modulated according to this amplitude-phase modulation scheme can then be ⅔ as long as with QPSK, while providing 2.4 times higher phase-noise immunity than 16QAM due to the larger phase separation between states.

Wireless receivers that process QAM transmissions can also process and demodulate messages modulated according to the depicted amplitude-phase modulation scheme using simple arithmetic. In one embodiment, the receiver can receive the message as an OFDM symbol, extract each message element according to its subcarrier frequency, extract the I and Q branches according to phase, measure the branch amplitudes, and then calculate the sum-signal amplitude and the sum-signal phase mathematically. For example, the sum-signal amplitude is the square root of a sum of the squares of the branch amplitudes, and the sum-signal phase is the arctangent of one branch amplitude divided by the other. Hence the receiver can determine the modulation state of each message element modulated in 9-state amplitude-phase modulation, by receiving and signal-processing according to orthogonal branch signals, and then convert mathematically to the sum-signal amplitude and sum-signal phase for demodulation, thereby obtaining large noise margins in amplitude and phase.

Figure 12B:
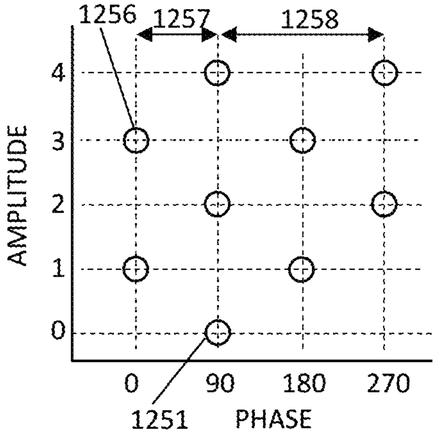
FIG. 12B is a modulation table showing an exemplary embodiment of an amplitude-phase modulation scheme with 9 states, according to some embodiments.

FIG. 12B is a modulation table showing an exemplary embodiment of an amplitude-phase modulation scheme with 9 states, according to some embodiments. As depicted in this non-limiting example, the states 1256 (corresponding to the states 1246 of the previous example) are now plotted in a modulation table with phase horizontally and amplitude vertically. As mentioned, each state 1256 is separated from the nearest equal-amplitude state by 180 degrees as indicated at 1258, and from the nearest state in an adjacent amplitude level by 90 degrees at 1257. The zero-amplitude state 1251 is arbitrarily placed at the 90-degree position, although the phase of a zero-amplitude transmission is actually undefined. As mentioned, if a particular application is incompatible with the zero-amplitude state 1251, the user device can discard it or use it for special purposes. Using only the other 8 states 1256, the user device can then obtain an information density of 3 bits per message element, while retaining the superior phase-noise margins and amplitude-noise margins of the amplitude-phase modulation schemes.

Figure 13A:
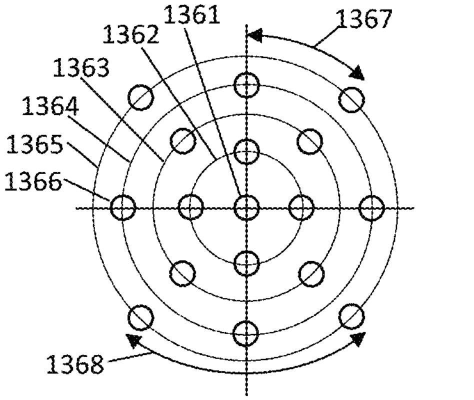
FIG. 13A is a polar plot showing an exemplary embodiment of an amplitude-phase modulation scheme with 17 states, according to some embodiments.

FIG. 13A is a polar plot showing an exemplary embodiment of an amplitude-phase modulation scheme with 17 states, according to some embodiments. As depicted in this non-limiting example, the 17 states 1366 are distributed on five amplitude levels 1361, 1362, 1363, 1364, and 1365, and eight phase levels of 0, 45 degrees, 90 degrees, and so forth. The central state 1361 has zero amplitude.

The 17-state amplitude-phase modulation scheme has many advantages. One advantage may be that it can provide over 4 bits per message element, thereby matching 16QAM, plus the central zero state 1361. Another advantage may be that the phase separation 1368 of equal-amplitude states is at least 90 degrees for every pair of equal-amplitude states, thereby providing wide phase-noise margins. Another advantage may be that the amplitude separation of all equal-phase states is two amplitude levels (except for the zero state 1361, which has undefined phase), which thereby provides additional amplitude-noise margins. Another advantage may be that the phase separation of any two states that differ in amplitude by one level is at least 45 degrees as indicated 1367. Another advantage may be that the zero-amplitude state 1361 can provide a measure of the background noise whenever it occurs in a message, which can thereby enhance message reliability and noise compensation. Hence the modulation scheme can provide information density that at least equals 16QAM, while also providing superior amplitude noise margins and superior phase noise margins, at negligible cost.

As mentioned, transmitters can employ the depicted amplitude-phase modulation scheme for transmission, and receivers can process the received signal by separating orthogonal I and Q branches as usual. The receivers can then demodulate the signals according to the amplitude-phase modulation scheme by calculating the sum-signal amplitude (square root of sum of the two branch amplitudes squared) and the sum-signal phase (arctangent of the Q amplitude divided by the I amplitude), and can thereby recover the high noise margins, in both amplitude and phase, at no cost other than the simple sum-signal calculations listed.

Figure 13B:
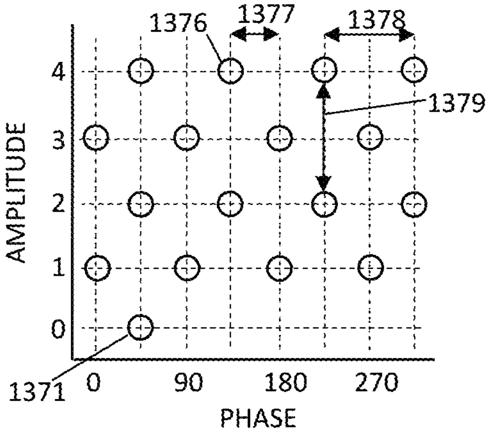
FIG. 13B is a modulation table showing an exemplary embodiment of an amplitude-phase modulation scheme with 17 states, according to some embodiments.

FIG. 13B is a modulation table showing an exemplary embodiment of an amplitude-phase modulation scheme with 17 states, according to some embodiments. As depicted in this non-limiting example, the states 1376 of an amplitude-phase modulation scheme correspond to the states of the previous example, but now plotted with phase horizontal and amplitude vertical. The zero-amplitude state 1371 is arbitrarily plotted at a phase of 45 degrees. The phase separation between all equal-amplitude states is 90 degrees as indicated 1378, and the phase separation between states differing by one amplitude level is 45 degrees as shown 1377. The amplitude difference between two equal-phase states is two amplitude levels, as indicated 1379. Hence the amplitude-phase modulation scheme can be expected to provide noise margins substantially superior to those of 16QAM, while at least matching the message throughput of 16QAM.

AI for Modulation Management

Due to the many competing parameters and the many available modulation schemes, the base station may employ an AI model to assist in determining whether conditions warrant changing modulation schemes for communicating with a particular user device, and which modulation scheme to switch to. Examples below illustrate such an AI model.

Figure 14A:
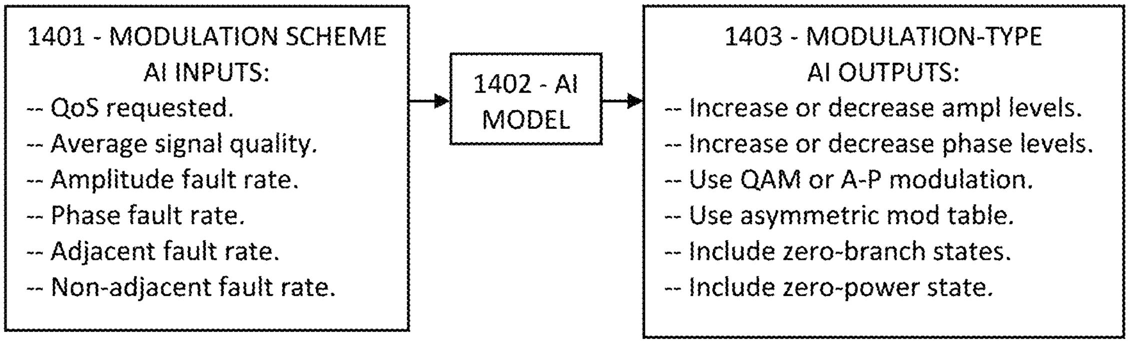
FIG. 14A is a chart showing an exemplary embodiment of a input parameters and output modulation choices of an AI model, according to some embodiments.

FIG. 14A is a chart showing an exemplary embodiment of an AI model configured to select a modulation scheme, according to some embodiments. As depicted in this non-limiting embodiment, the AI model can take various network conditions and user requests as input, and provide as output a recommendation of a more suitable modulation scheme.

At 1401 the base station (or other network entity) provides various input parameters to an AI model tasked with selecting a preferred modulation scheme. The inputs may include data about available modulation schemes such as 8/9QAM, 8/9-state amplitude-phase modulation, asymmetric schemes and schemes with odd numbers of predetermined modulation levels, and schemes with a zero-power state or a zero-power branch, among others. The inputs may include data about the user device such as the QoS required, the current signal quality of downlink messages, rates of various fault types, delays experienced by the user device, capabilities of user devices, among others. The inputs may include data about the network operations such as the current traffic in messages or bits per second, number of current active users, interference and error rates, among others.

At 1402, the AI model digests the input data according to certain internal functions and adjustable variables, which have been tuned using abundant prior network data, continuing until the AI model can provide useful output recommendations.

At 1403, the AI model specifies a preferred modulation scheme. The AI model may know what the current modulation scheme is, and then may suggest differences between the preferred and current schemes, such as increasing the phase margins or decreasing the number of amplitude levels, for example. Alternatively, the AI model may be unaware of the current modulation scheme, and then may provide the recommendations without prejudice. The outputs may also recommend changing from a QAM modulation scheme to an amplitude-phase “A-P” modulation scheme, for additional phase margins to combat frequent phase faults, or to change to an asymmetric modulation scheme with a different number of amplitude levels and phase levels, or to switch to a higher modulation level to increase throughput if the current interference level is low. For increased versatility, the AI model may recommend a modulation scheme with states having one zero-amplitude branch, or a state with zero power. These states may be used for message encoding, or special uses such as demarking the start and end of each message.

Figure 14B:
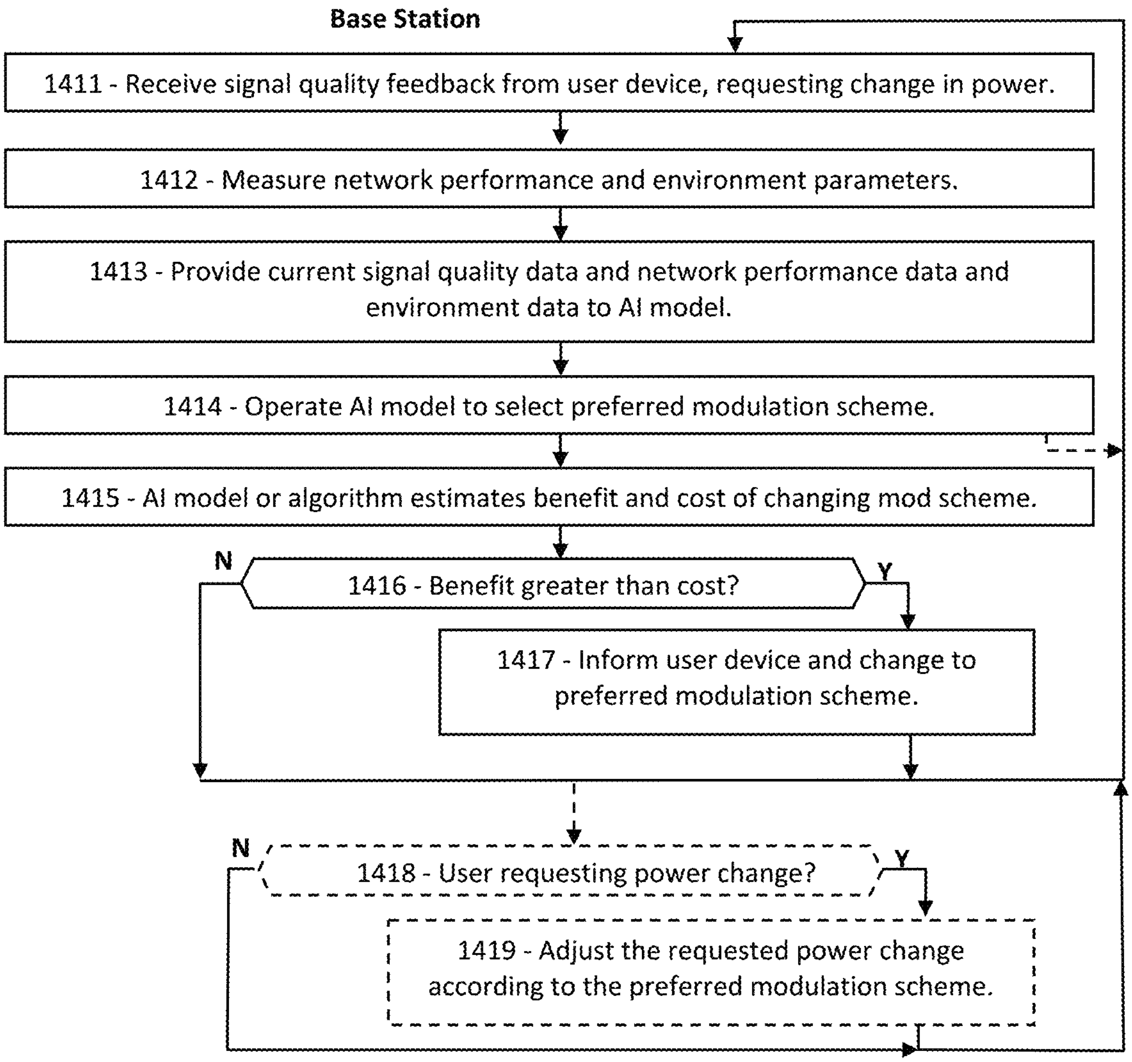
FIG. 14B is a flowchart showing an exemplary embodiment of a method for selecting a modulation type using AI, according to some embodiments.

FIG. 14B is a flowchart showing an exemplary embodiment of a method for selecting a modulation scheme using AI, according to some embodiments. As depicted in this non-limiting example, a base station uses an AI model to select a new modulation scheme based on feedback from a user device and network conditions.

At 1411, the base station receives a feedback message that indicates which test signal, of a plurality of downlink test signals, provides the best signal quality. The feedback message also indicates whether the user device requests additional transmission power or less transmission power, among other things. At 1412, if not sooner, the base station measures one or more network operation parameters such as the current throughput and fault rate, average delay or latency per message, and optionally certain detailed performance criteria such as whether faults are primarily phase faults or amplitude faults. The base station also checks the QoS requested by this user device, and especially notes whether that required QoS is not being fulfilled.

At 1413, the base station (or core network or other network asset) provides the user data and current conditions data to an AI model trained on network performance data, taken with various network conditions and modulation schemes. The base station then operates the AI model at 1414 to select a preferred modulation scheme. If the preferred modulation scheme is the same one currently in use for this user device, then the flow returns to the beginning as indicated by a dashed arrow. In this example, however, it is assumed that the preferred modulation scheme is different from the one currently in use, so a change may be recommended.

At 1415, the base station also evaluates the costs and benefits of changing the modulation scheme. The base station may operate the same AI model, or a different AI model, or an algorithm that may or may not be derived from AI, to estimate the costs of changing the modulation scheme from the current modulation scheme to the preferred modulation scheme. The costs may be calculated for this particular user device or for the entire network to make the change. The cost may be evaluated according to the extra messaging required to inform the user device of the change, the interruption and delay introduced to the user device by such a change, as well as the intended beneficial consequences of making the modulation change. Some of these may be estimates.

At 1416, the base station determines whether the benefit of making the change is greater than the cost, and if so, at 1417 the base station informs the user device, and then (after receiving an acknowledgement) the base station and user device make the change in modulation scheme at the same time. The flow then returns to the beginning.

Optionally, in dash at 1418, the base station can determine whether the user device has requested an increase or decrease in transmission power, to bring the received signal quality into agreement with a predetermined range. If so, and if the base station changes the modulation scheme, then the base station may decide that the new modulation scheme is sufficiently effective that the transmission power can be reduced, instead of increased. Therefore the method shows, at 1419, the base station adjusting the power (or other transmission parameter) up or down according to the properties of the new modulation scheme, calculated to provide the QoS level that the user device has requested, but with the new modulation scheme.

Initial Access Feedback

The following examples show how a base station can align its beam toward a newly arriving user device, as early in the initial access process as possible. For example, the SSB (synchronization signal block) message may be transmitted once isotropically instead of multiple times at different directions, but with a set of embedded test signals, each test signal transmitted in a different direction. The user device can determine which test signal is best received, and then communicate that choice to the base station later, such as during the random access preamble or one of the initial access messages, for example.

Figure 15A:
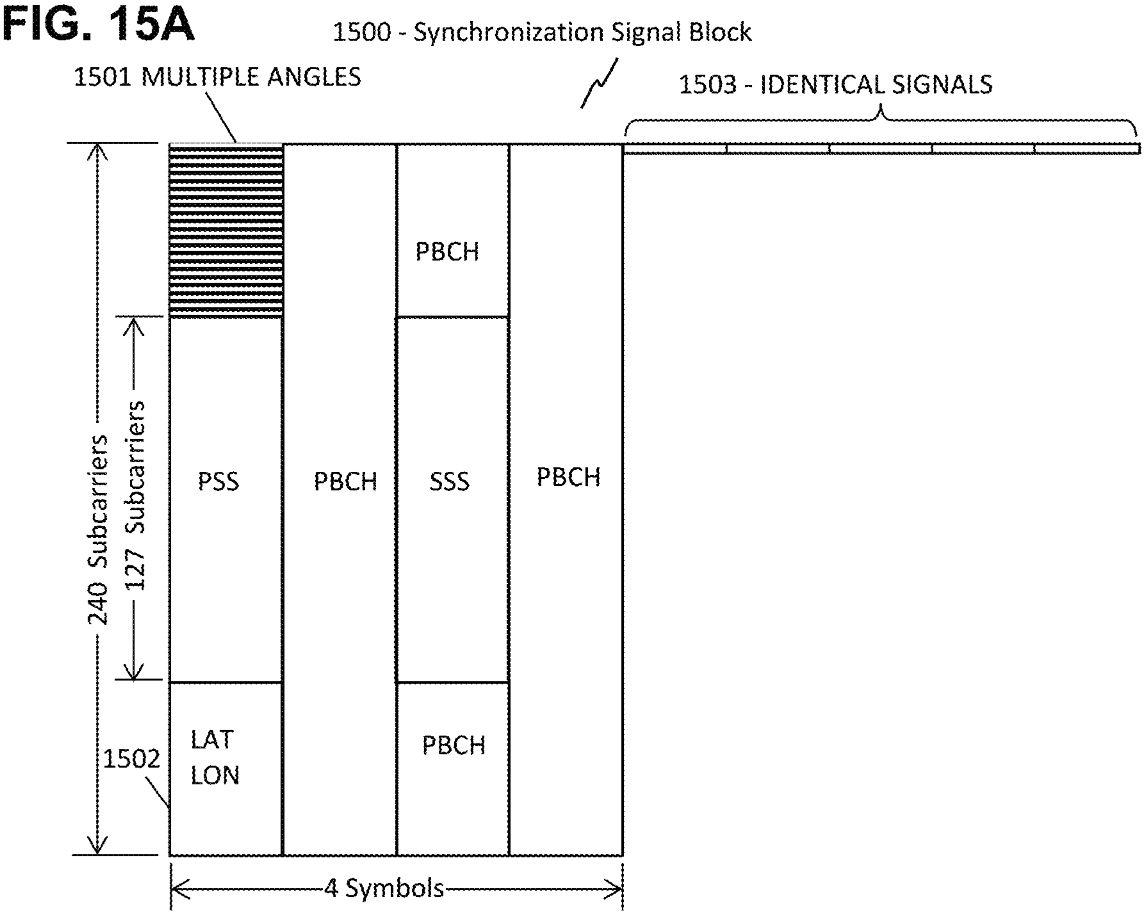
FIG. 15A is a schematic showing an exemplary embodiment of a system information message including multiple angular transmissions, according to some embodiments.

FIG. 15A is a schematic showing an exemplary embodiment of a system information message including multiple angular transmissions, according to some embodiments. As depicted in this non-limiting example, a synchronization signal block SSB message 1500 includes a primary synchronization signal PSS, a secondary synchronization signal SSS, and a distributed physical broadcast channel PBCH message. The SSB occupies 4 symbol-times across 240 subcarriers totaling 3.6 MHz bandwidth at the lowest numerology, or 960 resource elements including some unassigned areas. In contrast, prior-art access procedures call for the SSB to be transmitted numerous times in different directions, which consumes huge amounts of bandwidth and transmission power.

Advantageously, the depicted SSB message is transmitted just once, isotropically, per 20 msec interval. Prospective user devices can receive it from positions all around the base station. For localization, the depicted SSB includes a number of test signals in one of the unassigned regions 1501, each test signal transmitted in a different direction. For example, the test signals can be inserted in the first 56 resource elements of the first symbol-time. Those resource elements are unassigned and therefore do not overlap with the primary synchronization signal or other parts of the SSB. The test signals thereby enable the user device to determine its direction relative to the base station based on the received amplitude or power of the test signals. It is not necessary to pre-calibrate the amplitude scale because the measurements are relative. It is not necessary to pre-synchronize with the base station because the best direction should be clearly revealed in the amplitude of the raw waveform (and in the sum-signal, if analyzed according to orthogonal branches). It is not necessary for the user device to have a beamforming capability since it is merely determining the amplitude of a received signal (although user devices with beamforming can adjust their transmission beams according to the angle of the best-received test signal, without further cost).

In addition, the latitude and longitude of the base station may also be added to a second unassigned region 1502, for further localization. Thus the prospective user device can obtain the SSB information, and also determine the optimal downlink beam direction, by measuring which of the test signals 1501 provides the best signal quality. The user device can then indicate that preference in a feedback message, which may be added to one of the initial access messages. The base station can then transmit to the user device using a directed beam thereafter.

In some embodiments, the 56 test signals are transmitted in 56 narrow transmission beams, each beam 6.4 degrees wide, thereby enabling the user device to specify its angle within 6.4 degrees all around the 360 degree circle. In another embodiment, each beam can be 8.5 degrees wide, overlapping each of the neighboring beams by 2.1 degrees. Then the user device can specify in the feedback message whether the best-received signal was in one of the test signals or in a pair of adjacent test signals, thereby indicating whether the user device is located in a region dominated by one of the directed beams or in an overlap region. The user device can thereby indicate its location within about 2.1 or 2.2 degrees. Such finesse may be needed in future high-density, high-frequency environments to minimize background generation and unwanted interference. Determining the downlink beam with high precision early in the initial access process, such as upon the first message, may thereby enable efficient use of the available spectrum.

In summary, the prior-art SSB message is generally transmitted many times in different directions, whereas the disclosed method has the SSB transmitted only once per cycle, and includes numerous test signals in the SSB for directionality. The SSB (other than the test signals) is broadcast isotropically, and each test signal is transmitted directionally, in a different direction. Thus the simplified SSB scheme accomplishes user localization, with vastly less transmitted power and resource usage than the prior scheme.

The figure also shows several identical signals 1503, transmitted time-spanning after the SSB 1500 in a single subcarrier, such as the first subcarrier of the SSB. The identical signals 1503 are all transmitted isotropically, in this example, at the same frequency and power. User devices that have a beamforming capability can then align their reception beam toward the base station by varying their reception beams during the identical signals 1503, and can thereby find the best reception beam angle.

An advantage of providing the beam test signals 1501 in the SSB 1500 may be that the prospective user device can determine the optimal beam angle for reception, before making contact with the base station, by measuring amplitudes of the received test signals 1501 with various reception beam directions. Another advantage may be that the user device may be able to select the best test signal 1501 without a prior demodulation reference, since the user device can measure the amplitude or signal quality of the raw signals without demodulating them and prior to synchronization. Another advantage may be that the user device can transmit a feedback message later during the initial access messaging sequence, indicating which of the test signals was best received. Another advantage may be that the SSB can be broadcast omnidirectionally (except for the test signals), and hence can be transmitted just once per cycle.

There may no longer be a need to use up large amounts of bandwidth and power by transmitting the entire SSB sequentially in multiple directions. For example, the user device can determine the beam selection, according to the best-received test signal, and can indicate so to the base station in a feedback message, or by another code embedded in or appended to the RACH preamble, or appended to one of the other initial access messages, or some other uplink message following the initial access procedure. Optionally, the feedback may also include a power adjustment request based on the amplitude of the best-received test signal 1501, which may further streamline the initial access procedure.

After receiving the SSB, the user device with beamforming capability can detect several uniform signals 1503 following the SSB, in this case time-spanning, while varying the reception beam direction or width. Thus the user device can determine the direction toward the base station for its own use.

As another alternative, the base station may use a formula or table to transmit each test signal 1501 in a predetermined direction, and the user device may know that relationship. Then the user device can determine the direction of the base station, relative to the user device, by adding or subtracting 180 degrees to the angle of the best-received test signal, and thereby determine the direction toward the base station for uplink messages.

As a further alternative, the base station can transmit a location message to the user device after receiving a feedback message, the location message indicating to the user device the direction corresponding to the selected test signal 1501. The user device can then direct its uplink transmission and downlink reception beams in that direction plus 180 degrees.

Figure 15B:
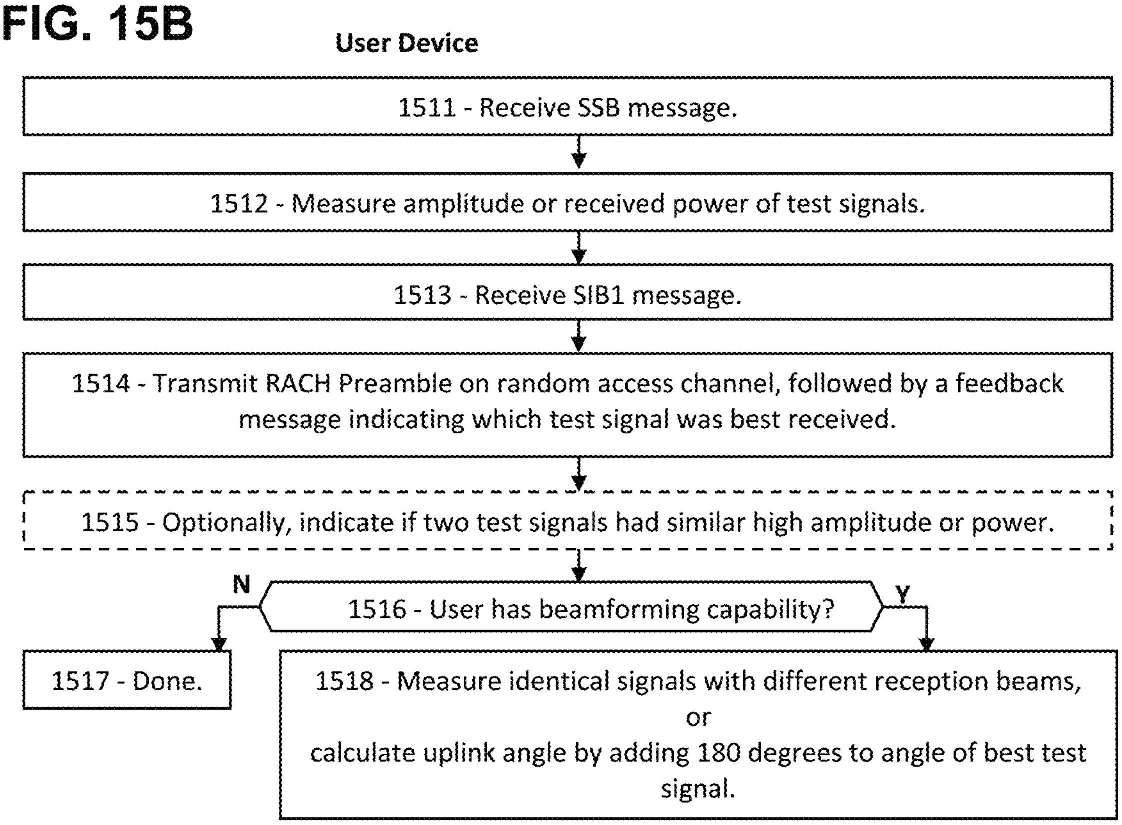
FIG. 15B is a flowchart showing an exemplary embodiment of a procedure for aligning beams prior to initial access, according to some embodiments.

FIG. 15B is a flowchart showing an exemplary embodiment of a procedure for aligning beams prior to initial access, according to some embodiments. As depicted in this non-limiting example, a user device can determine its direction relative to the base station based on test signals in the SSB message, and then transmit a feedback message concatenated with the random access preamble.

At 1511, the user device receives the SSB message of a base station, and at 1512 measures the amplitude or received power or signal quality of each test signal embedded in the SSB. The user device then receives an SIB1 message 1513, and at 1514 transmits a random access preamble followed by a feedback message to the base station. The feedback message may be modulated in a modulation scheme, such as 8QAM or 9-state amplitude-phase modulation, that does not require a prior amplitude calibration. Alternatively, the feedback message may be transmitted with the same modulation and timing as the preamble. In either case, the feedback message indicates which of the test signals provided the best signal quality, and thereby indicates to the base station which beam direction to use in communicating with the user device.

Optionally, at 1515, the user device can also indicate in the feedback message when two of the test signals provided similar high signal quality, and can thereby obtain improved angular resolution.

As a further option, the user device, after determining the angle toward the base station according to the test signals in the first symbol-time of the SSB message, may then be able to receive the remaining symbols of the SSB using a reception beam aimed at the base station, and thereby obtain substantially better signal and noise during the important PBCH and SSS portions of the SSB message. The user device can then obtain the same advantages while receiving the SIB1 system information message and other system information messages, even before logging on to the network.

If the user device does not have beamforming capability at 1516, the task is done at 1517. However, if the user device does have beamforming capability, and if the SSB message is followed by some identical signals, the user device can measure 1518 those identical signals using various reception beams, and thereby determine which beam angle the user device can use for communicating with the base station.

As a further option, the user device can determine, according to which test signal is best received, an angle from the user device toward the base station. This relies on the user device knowing which test signal is transmitted in which direction. For example, a formula may relate the subcarrier of each test signal with the direction it is transmitted in. Then the user device can add or subtract 180 degrees to the angle of the best-received test signal, and thereby determine the direction of the base station.

Figure 15C:
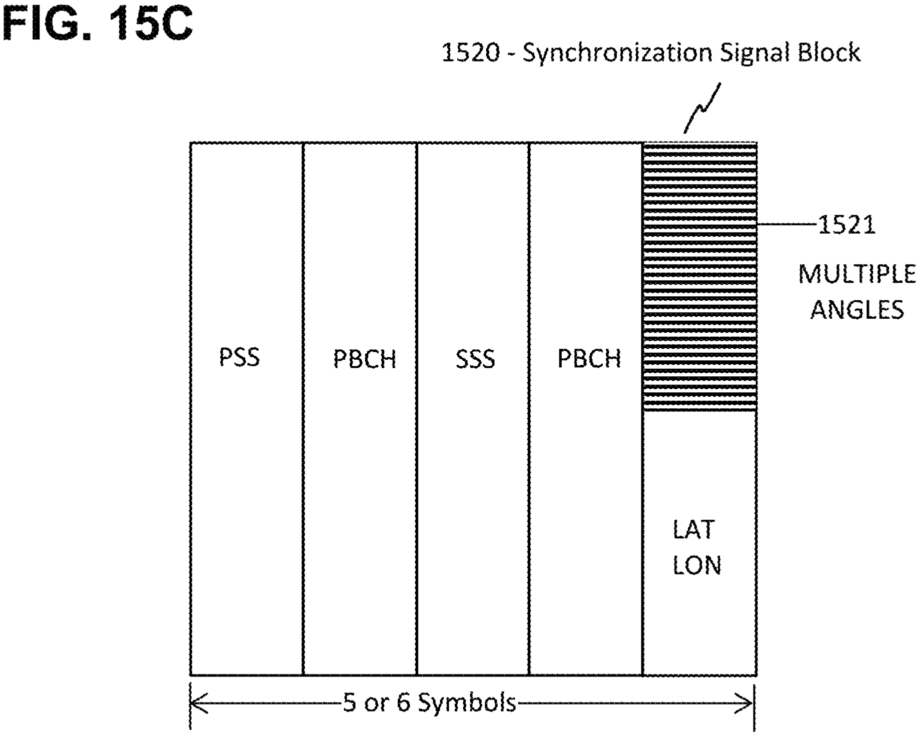
FIG. 15C is a schematic showing another exemplary embodiment of a system information message including multiple angular transmissions, according to some embodiments.

FIG. 15C is a schematic showing another exemplary embodiment of a system information message including multiple angular transmissions, according to some embodiments. As depicted in this non-limiting example, a modified SSB 1520 spans 5 or 6 symbol-times with a bandwidth of about 1.9 MHz, substantially smaller than the configuration of the previous example. The last symbol-time includes a large number of separately-aimed test signals 1521 for beam alignment, along with the latitude and longitude of the base station. Optionally (not shown) the SSB 1520 can include further PBCH data or other data that the user device may need in one of the extra symbol-times.

As a further option, the base station may transmit the test signals first, in a special symbol before the PSS. The user device could then align its reception beam toward the base station for receiving the remaining symbols of the SSB.

As a further option, the base station may transmit the test signals on the PBCH periodically, in a symbol-time not connected to the SSB transmissions. The user device can then detect the test signals, determine the direction toward the base station, and then use a corresponding reception beam for improved reception of the subsequent SSB and other system information messages, before making contact.

The user device can measure the amplitudes of the various test signals 1521 as-received, and can then indicate the favored beam direction in one of the initial access messages, such as the preamble or the MsgA of a two-step procedure. As mentioned, the test signals 1521, covering multiple angles around 360 degrees, may thereby enable the base station to use the optimal downlink beam angle right from the beginning of the initial access procedure. Also, if the user device already knows which angle corresponds to which of the test signals, relative to geographical north, and also has an electronic compass or the like, then the user device may transmit the preamble and other initial access messages toward the base station in a directional uplink beam, further improving the access process.

The following examples show how feedback can be incorporated in the uplink and downlink messages of an initial access procedure.

Figure 16A:
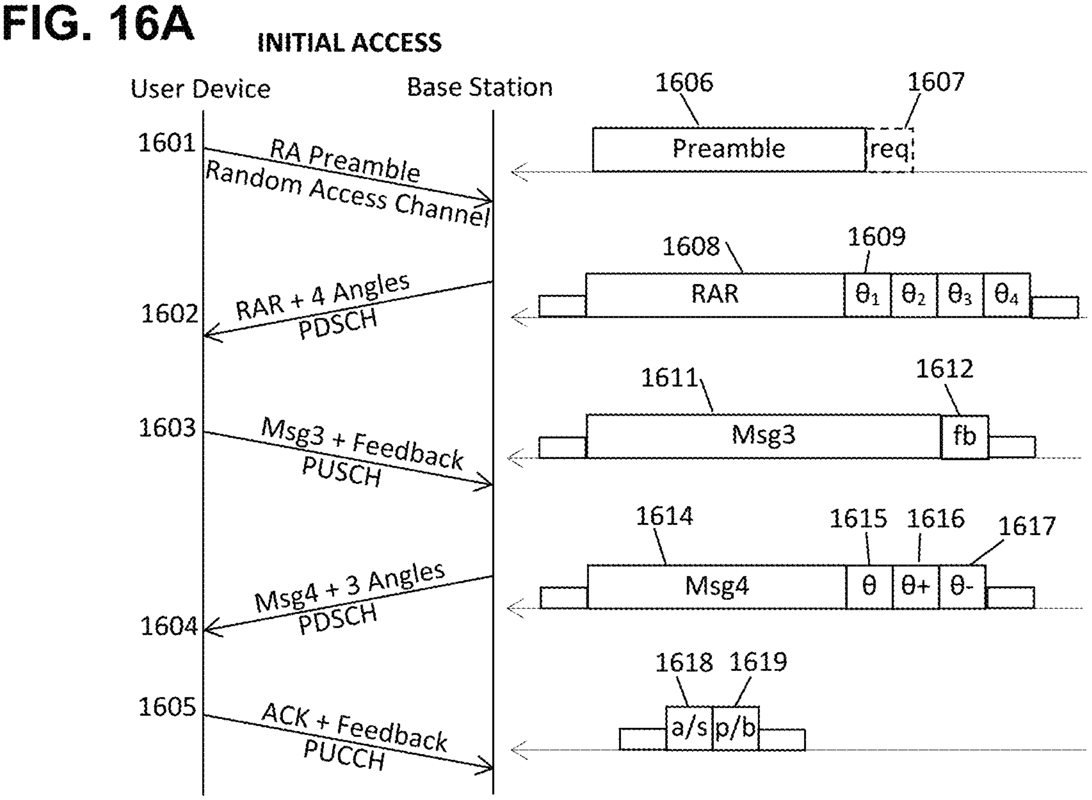
FIG. 16A is a schematic showing an exemplary embodiment of messages for initial access, according to some embodiments.

FIG. 16A is a schematic showing an exemplary embodiment of messages for initial access, according to some embodiments. As depicted in this non-limiting example, a new user seeking entry into the cell of a base station can initiate the entry process by first finding and receiving the SSB system information message broadcast by the base station. In the prior art, the base station transmits the SSB message multiple times in a variety of directions, each transmission including a sequence code. The user device determines which SSB transmission results in the best signal strength, and then indicates the associated sequence code during initiation, thereby informing the base station of the favored downlink beam for that user device. However, this requires that the base station consume a large amount of resources to transmit the heavy SSB message (960 resource elements) multiple times in multiple directions. The example discloses a far more economical procedure for accomplishing the same task.

In this example, the base station broadcasts the SSB message omni-directionally, instead of multiple copies in various directions. The test signals of the previous example are not used in this example. Instead, in this example, the user devices determines the downlink beam direction using feedback during the initial access messages. The initial access tasks are listed on the left, and possible message formats are shown for each action on the right. The SSB and SIB1 are assumed to have been transmitted omnidirectionally (without the test signals of the previous example) and have been received by the user device. The user device than seeks beam alignment during the access message process as follows.

At 1601, the user device transmits a random-access preamble 1606 on the random-access channel, which the base station receives. Optionally, the user device can append an alignment request 1607 to the preamble 1606. Preferably the alignment request 1607 is modulated in a modulation scheme that permits ready demodulation without a demodulation reference, such as 9QAM.

At 1602, the base station transmits a random access response (RAR) 1608 message on the PDSCH, plus some number of trailing test signals 1609. (Here and elsewhere, blank resource elements are represented by half-height boxes.) The test signals 1609 are configured as short-form single-element demodulation references in this example, and are transmitted in four different directions spaced by 90 degrees, as indicated by $\theta_1$, etc. The user device then receives the test signals 1609 and determines which one provides the best reception. At 1603, the user device transmits "Msg3" 1611 of the RACH sequence on PUSCH, followed by feedback "fb" 1612, which in this example includes a beam selection indicating which of the four test signals 1609 was best received. The feedback 1612 includes sufficient bits to specify the favored beam from among the test signals 1609. Optionally, the feedback 1612 may further include bits indicating which overlapping regions are also received. Indicating the overlap regions may provide improved angular resolution, as described later in the disclosure.

At 1604, the base station transmits "Msg4" 1614 on PDSCH, followed by three more test signals 1615, 1616, 1617. The message 1614 and one of the test signals 1615 are transmitted in the previously-selected beam direction θ. In addition, further test signals are transmitted at incrementally higher and lower angles θ+ and θ− labeled 1616, 1617. The user device can then transmit a multiplexed acknowledgement on PUCCH, with feedback at 1605 including the ACK/NACK multiplexed with an optional scheduling request SR 1618, followed by a feedback selection 1619 indicating both power and beam direction feedback. Thus the user device has selected a rough beam direction, fine-tuned that beam direction, and requested a power adjustment, at the expense of just 8 or 9 resource elements beyond those required for prior-art access procedures. More importantly, the network has eliminated many thousands of unnecessary resource element transmissions of redundant directional copies of the SSB message, since the directional information is now supplied by test signals and feedback messages appended to the other access messages, at negligible resource cost.

Figure 16B:
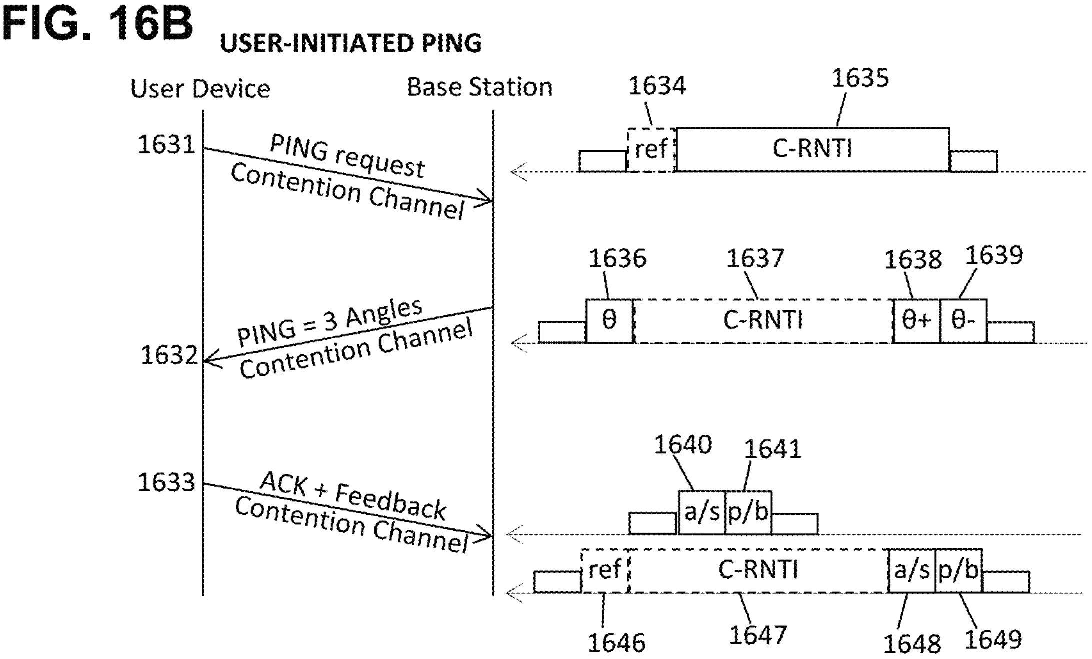
FIG. 16B is a schematic showing an exemplary embodiment of messages for a user-initiated beam and power adjustment procedure, according to some embodiments.

FIG. 16B is a schematic showing an exemplary embodiment of messages for a user-initiated beam and power adjustment procedure, according to some embodiments. As depicted in this non-limiting example, a user device can request a beam and power adjustment service from the base station. In a first embodiment, the request, the beam test signals, and the feedback message are all transmitted grant-free on a contention-based channel, such as the random access channel or another channel allocated for grant-free transmissions. In a second embodiment, the user device can transmit a scheduling request, obtain an uplink grant, and then use that grant for the alignment request instead of a BSR message. In a third embodiment, the user device can transmit a scheduling request, get a BSR grant, transmit a BSR on the BSR grant, receive a message grant, and then transmit the alignment request message using the message grant. In a fourth embodiment, the user device can transmit the alignment request instead of the scheduling request, and the base station can then reply with a grant that includes three test signals aimed at three different directions, from which the user device can select the best reception, and can transmit the multiplexed power and beam feedback message on the resources provided by the grant. In the depicted example, the first embodiment is assumed, and communications are bidirectional TDD on the contention channel, in which each message may be time-spanning or frequency-spanning.

For the contention-based version, at 1631 a user device can transmit an alignment request or "ping request" on the contention channel. The depicted ping request here includes the C-RNTI identification 1635 of the user device, optionally preceded by a demodulation reference "ref" 1634. The ping request may be preceded and followed by silent resource elements as shown, to demark the message and enable a measure of interference.

At 1632, the base station transmits an alignment message "ping" consisting of three test signals, configured as demodulation references 1636, 1638, 1639 transmitted at three angles. In this example, the angles are, first, the current beam direction previously established for downlink messages to the user device, followed by the same plus and minus angular increments, that is, two beams incrementally left and right of the first direction. The alignment message may be transmitted frequency-spanning (in one symbol-time) or time-spanning (on multiple symbol-times) depending on the capabilities of the base station. The alignment message is transmitted on the contention channel in this case, but in other embodiments it may be transmitted in downlink scheduled intervals, as mentioned. If the alignment message is to be transmitted at a pre-arranged interval following the request message, then the user device may be expecting the three test signals 1636, 1638, 1639 at that time. On the other hand, if there is no pre-arranged transmission time (or if the alignment message is delayed by cross traffic, for example), then the base station can transmit the alignment message at a later time along with the C-RNTI 1637 of the user device. Thus the user device can get the ping and test signals as soon as the channel is clear.

At 1633, the user device can reply, after a pre-arranged delay, with a multiplexed acknowledgement that also includes an SR scheduling request if desired, along with power and beam angle feedback 1640, 1641 as previously described. Alternatively, also shown, the user device can transmit its feedback data 1648, 1649 along with its identification code 1647 at a later time, if the reply is delayed by cross-traffic or other delay. If necessary, the user device can also include a demodulation reference 1646.

As an option, the user device may submit the alignment request on the contention-based channel, and then receive the alignment message of three test signals on another channel such as the PDCCH or PDSCH. The user device can then transmit the feedback message on the PUSCH or PUCCH, or it can continue transmitting on the contention channel, depending on the capabilities of the user device.

Thus the user device can provide feedback on power and beams whenever the received signal quality drops below a predetermined threshold, at a cost of just a few resource elements.

Figure 17A:
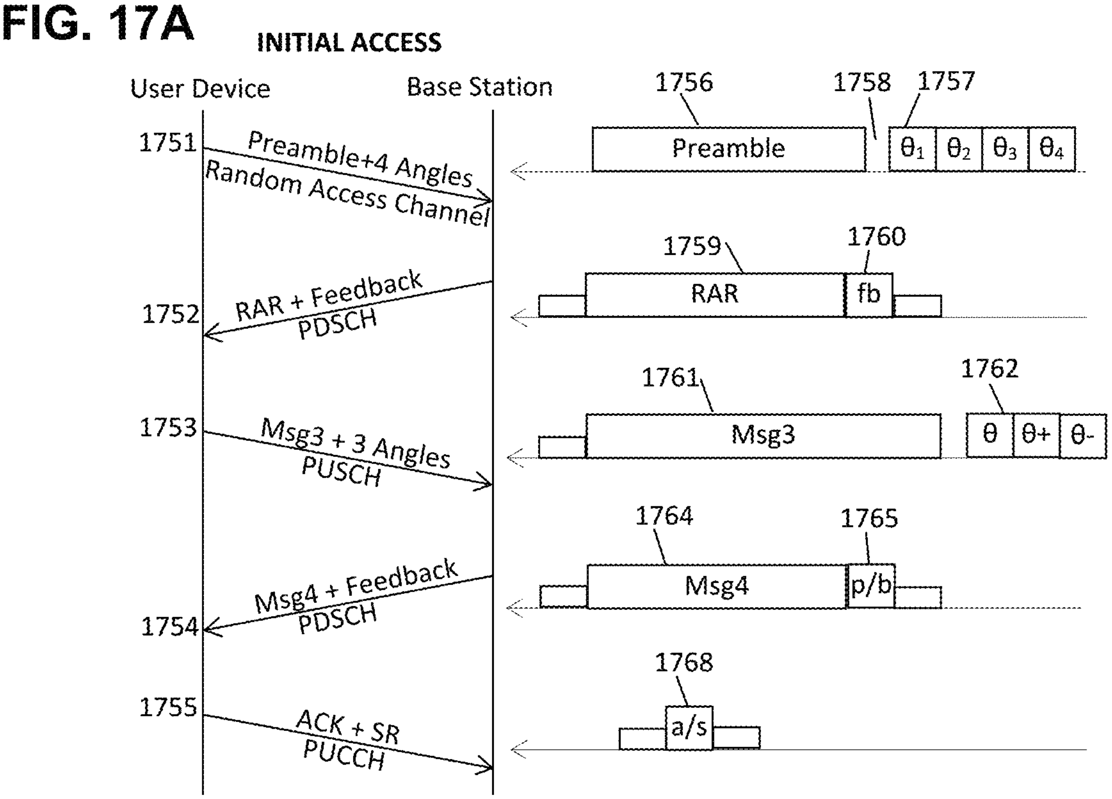
FIG. 17A is a schematic showing an exemplary embodiment of messages for initial access with user beam alignment, according to some embodiments.

FIG. 17A is a schematic showing an exemplary embodiment of messages for initial access with user beam alignment, according to some embodiments. As depicted in this non-limiting example, a user device that has beamforming capability provides test signals during an initial access procedure and the base station provides feedback, so that the user device can align its transmission and reception beam toward the base station. This is opposite to the case of FIG. 16A in which the base station provided the test signals and the user device sent the feedback message.

At 1751, the user device transmits a random access preamble 1756 on the random access channel, followed by four overlapping beam signals at various angles preferably covering 360 degrees. In some cases, the user device may not be able to transmit multiple beams in different directions at the same time. In that case, the user device can transmit the preamble 1756 frequency-spanning as usual, and then switch to time-spanning for transmission of the test signals 1757 sequentially. That is, the preamble 1756 may be transmitted in a single symbol-time, while the test signals 1757 may be transmitted in sequential symbol-times. The switch from frequency-spanning to time-spanning, if needed, is indicated by a gap 1758.

The test signals 1757 are wide-beam transmissions in this case, each beam spanning 135-degrees, spaced at 90 degrees around the full circle. Thus the wide beams are overlapped with neighboring beams, with 45-degree overlap regions overlapping each neighboring beam. The four beams thereby define 8 sections ("octants") covering 360 degrees, each octant being identified by which beam or beam-pair is best received. The user device can determine its octant by measuring the amplitude or signal quality from each of the four test signals 1757, as described in more detail below.

At 1752, the base station transmits the RAR (random access response) message 1759 followed by a feedback message 1760. The feedback message 1760 may occupy a single resource element, and may be modulated to indicate which of the eight (beam or beam-pair) sections provides the best signal quality or amplitude. For example, 8QAM or 9QAM can provide the necessary bits in a single resource element, without the need for absolute amplitude calibration. Alternatively, the feedback message may be transmitted using the 8-state or 9-state amplitude-phase modulation scheme instead, thereby obtaining improved noise margins at no additional cost.

At 1753, the user device transmits a "Msg3" 1761 message on the PUSCH channel, followed by three fine-tuning test signals 1762, directed at three different angles within the selected quadrant or octant as determined by the previous feedback message. For example, each test signal may be transmitted with a beam width of 15 degrees, arranged to fill the octant that was selected in the previous step, thereby enabling the base station to select the best beam direction with a resolution of 15 degrees (or 7.5 degrees if the overlap regions are also counted). The three test signals 1762 may be transmitted frequency-spanning or time-spanning, depending on the user device's antenna capabilities.

At 1754, the base station receives the test signals 1762, determines which one, or which pair, provides the best signal, and transmits "Msg4" 1764 along with a feedback message 1765 on the PDSCH channel. The feedback 1765 in this case is an incremental power adjustment request, multiplexed with a beam selection among the fine-tuning test signals 1762, as discussed above.

At 1755, the user device transmits an acknowledgement multiplexed with a scheduling request 1768 on the PUCCH. Thus the user device has enabled the base station to adjust the downlink beam direction and fine-tune it, and has also provided incremental feedback regarding the transmission power using the final downlink beam configuration, and has also submitted a scheduling request if desired, with minimal expense of resources.

Figure 17B:
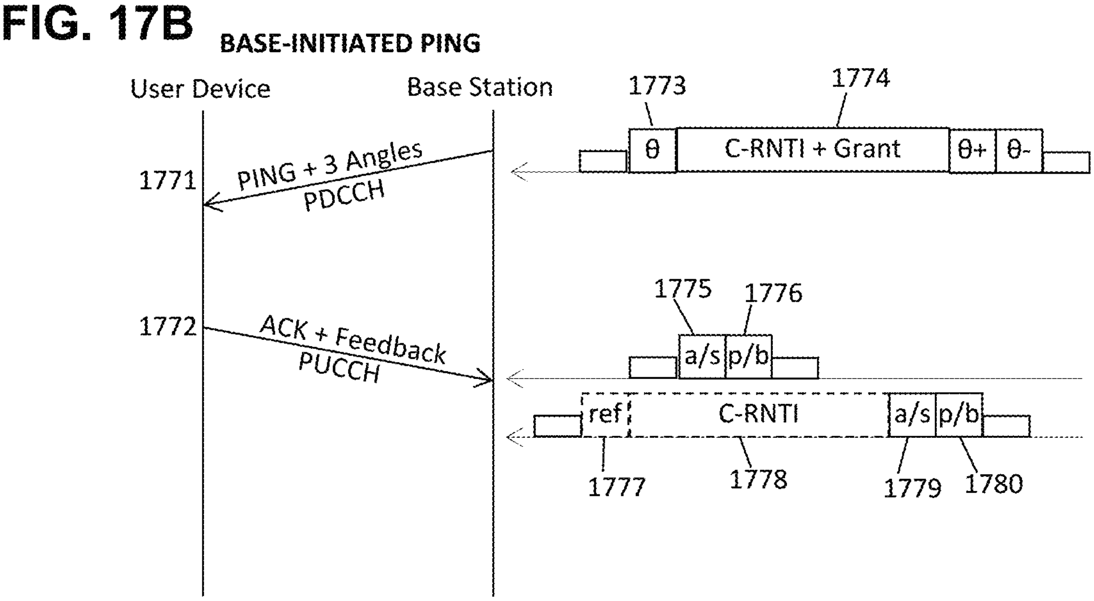
FIG. 17B is a schematic showing an exemplary embodiment of messages for a base-initiated beam and power adjustment procedure, according to some embodiments.

FIG. 17B is a schematic showing an exemplary embodiment of messages for a base-initiated beam and power adjustment procedure, according to some embodiments. As depicted in this non-limiting example, a base station can provide beam test signals along with a grant, and the user device can respond with a multiplexed feedback at the granted time.

At 1771, the base station determines that the downlink beam to the user device needs to be refreshed, and therefore transmits a PDCCH message 1774 which in this case includes the identification of the user device and a grant for the user device to reply. The message 1774 also includes a leading beam test signal 1773 which may be a short-form single-element demodulation reference, and two trailing beam test signals at incremental angles relative to the leading signal 1773.

At 1772, the user device can respond by transmitting an acknowledgement including multiplexed feedback on the PUCCH. In one version, the acknowledgement includes a multiplexed ACK/NACK with a SR request 1775, followed by a power and beam adjustment request 1776 based on the beam test signals 1773.

In another version, also shown, the user device includes an optional demodulation reference 1777 and/or an identification code C-RNTI 1778 with the acknowledgement/SR feedback 1779 and the power/beams feedback 1780, to indicate which user is involved, or other information such as a requested change in the modulation and coding scheme for example.

In summary, the examples show how a user device can assist the base station in aligning the base station's beam using test signals embedded in the SSB message or added to various RACH messages, or subsequently provided as part of a ping procedure initiated by either the user device or the base station, resulting in rapid and efficient alignment very early in the access procedure, with low to negligible costs in resources and transmitted energy.

Directionality Beams

The following examples show how beams can be configured in various directions to define angular sectors efficiently.

Figure 18A:
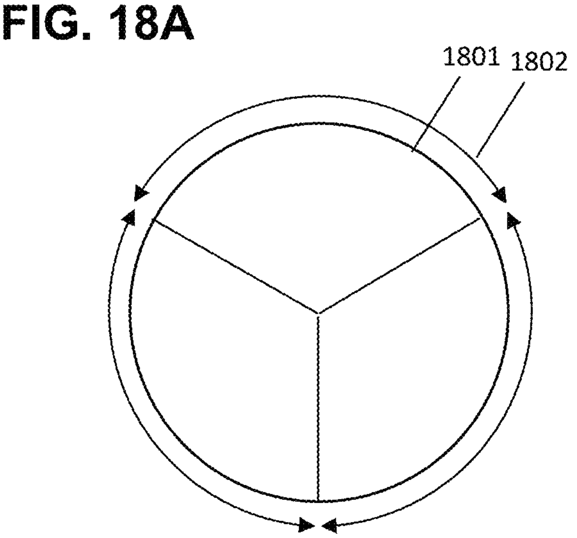
FIG. 18A is a schematic showing an exemplary embodiment of three directional regions, according to some embodiments.

FIG. 18A is a schematic showing an exemplary embodiment of three angular regions, according to some embodiments. As depicted in this non-limiting example, a base station can transmit three test signals in three directions separated by 120 degrees, and can thereby reach user devices in each section 1801 within an angular zone 1802. The user devices can then respond with a feedback message, indicating which beam test signal was best received. The feedback may be a multiplexed ACK/SR/power/beam feedback message indicating which of the sections 1801 provided the best signal quality, as discussed. The base station can then transmit further downlink messages to the user device in the selected section 1801.

Figure 18B:
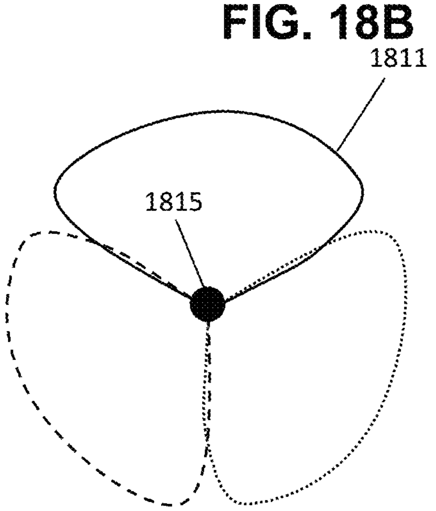
FIG. 18B is a schematic showing an exemplary embodiment of three wide directional beams, according to some embodiments.

FIG. 18B is a schematic showing an exemplary embodiment of three wide-angle beams, according to some embodiments. As depicted in this non-limiting example, a beam profile 1811 approximately matches the 120-degree section 1801 of the previous example. The base station 1815 can configure its antenna according to one of the beam profiles 1811, and can thereby deliver messages to user devices encompassed by the selected section 1811.

Figure 18C:
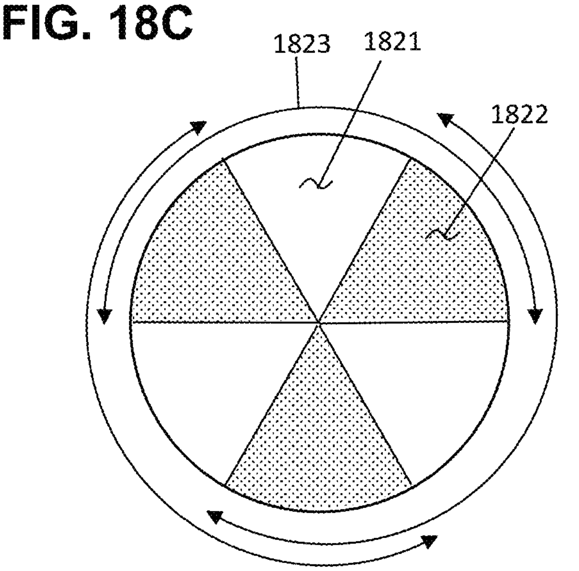
FIG. 18C is a schematic showing an exemplary embodiment of six regions defined by three overlapping beams, according to some embodiments.

FIG. 18C is a schematic showing an exemplary embodiment of six regions defined by three overlapping beams, according to some embodiments. As depicted in this non-limiting example, six sections 1821, 1822 are indicated, each section 1821, 1822 spanning 60 degrees, yet they can be identified using just three transmission beams. Each transmission beam is 180 degrees wide, as indicated 1823. Hence there are three overlap regions 1822 in which two of the beams overlap, and three non-overlap regions 1821 in which one beam predominates. The user device measures three test signals, one for each of the wide beams, and thereby determines whether the best reception is obtained on just one of the test signals or on two of the test signals with nearly equal amplitude.

Thus the user device determines whether one of the three 180-degree-wide beams is received with highest signal quality, or whether two of the beams provide roughly comparable high signal quality. The sections in stipple 1822 represent overlap regions in which two of the beams provide similar high signal quality, whereas the undecorated sections 1821 represent regions in which only one of the three beams prevails. The user device can then indicate, in a feedback message that includes at least 6 options, which of the sections 1821, 1822 provided the best signal quality, and can thereby determine the correct downlink angle within 60 degrees.

Figure 18D:
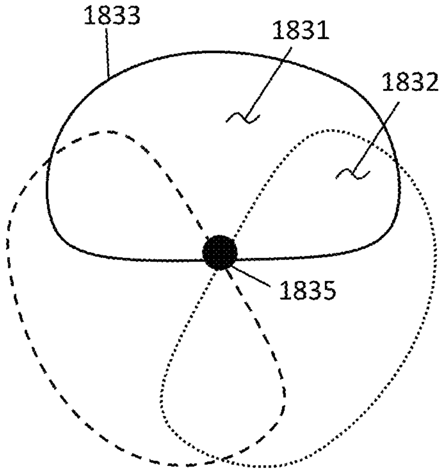
FIG. 18D is a schematic showing an exemplary embodiment of three overlapping beams that define six regions, according to some embodiments.

FIG. 18D is a schematic showing an exemplary embodiment of three partially-overlapping beams that define six regions, according to some embodiments. As depicted in this non-limiting example, three 180-degree-wide transmission beams 1833 (shown in three different line types for clarity) are transmitted by a base station 1835 in three sequential resource elements. A user device can receive the transmission beams 1833 and measure the signal quality for each beam. The user device can then determine which section it occupies. The location determination is based on which of the beams or beam pairs provides the best signal quality as-received. For example, if the user device is in a first section 1831, it will determine that the first transmitted beam provides the best beam quality, and the other two beams provide much lower beam quality or none at all. If, however, the user device is in an overlap section 1832, the user device will determine that two of the beams provide high and comparable signal quality. The user device can then transmit a feedback signal indicating which of six sections the user device is in, based on the signal quality measurements. Thus with three partially-overlapping wide beams, the user device can determine the optimal beam direction within 60 degrees.

Figure 19A:
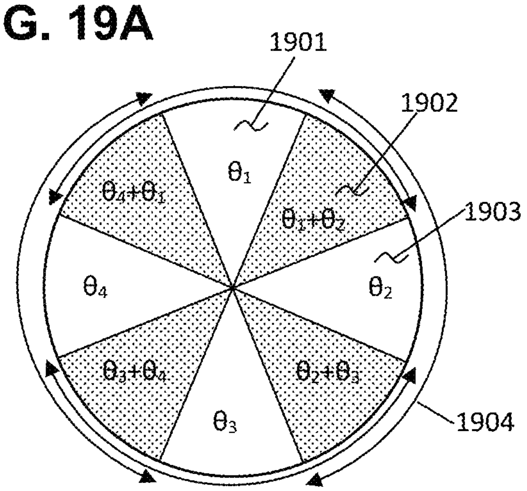
FIG. 19A is a schematic showing an exemplary embodiment of eight regions defined by four overlapping beams, according to some embodiments.

FIG. 19A is a schematic showing an exemplary embodiment of eight regions defined by four overlapping beams, according to some embodiments. As depicted in this non-limiting example, eight octant sections 1901, 1902, 1903 are each 45 degrees wide. The sections are generated by four overlapping transmission beams each 135 degrees wide, as indicated by curvy arrows 1904. A user device can determine which section it is in, by measuring the signal quality for each of the four transmission beams 1904. If the user device determines that one of the four beams produces a signal quality substantially above all the other beams, then the user device can determine which of the non-overlapping sections 1901 it is in, labeled as $\theta_1$, etc. However, if the user device determines that two of the beams have similar high signal quality, then the user device is in one of the stippled overlap sections 1902 labeled as $\theta_1+\theta_2$, etc. Thus with just four shaped partially-overlapping transmission beams, the user device can determine its direction within 45 degrees.

Figure 19B:
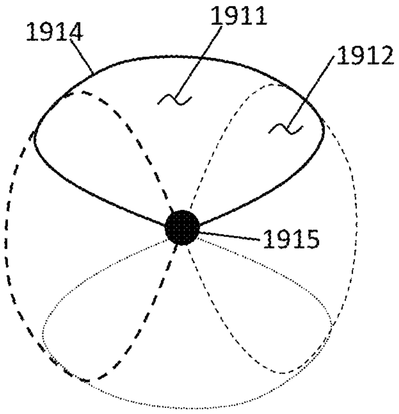
FIG. 19B is a schematic showing an exemplary embodiment of four overlapping beams that define eight regions, according to some embodiments.

FIG. 19B is a schematic showing an exemplary embodiment of four partially-overlapping beams that define eight angular regions around a base station 1915, according to some embodiments. As depicted in this non-limiting example, four shaped 135-degree-wide transmission beams 1914 are shown partially overlapping by 45 degrees (each beam is drawn in a different line type, for clarity). The beams 1914 produce both overlapping 1912 and non-overlapping 1911 regions, thereby generating the eight sections of the previous figure. The user device can thereby indicate whether a single test signal provided the best signal quality, or two adjacent beams provided similar high signal quality, and thereby determine its angle to within about 45 degrees.

Figure 19C:
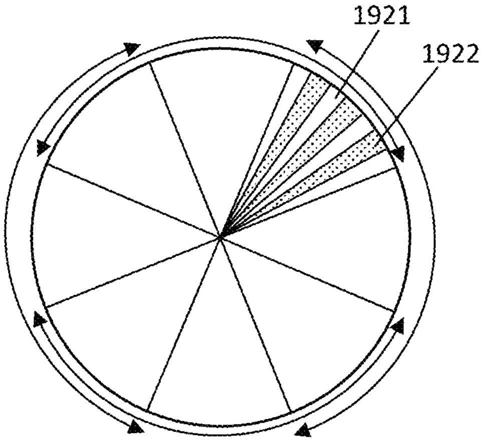
FIG. 19C is a schematic showing an exemplary embodiment of angular regions defined by overlapping beams, according to some embodiments.

FIG. 19C is a schematic showing an exemplary embodiment of seven angular regions defined by partially overlapping narrow beams, according to some embodiments. As depicted in this non-limiting example, a user device determines that it is in the octant section marked 1902 or 1912 of the previous examples. The user device then receives four additional partially-overlapping beams which define seven sub-sections 1921, 1922. The seven sub-sections include four non-overlapping sub-sections 1921, alternating with overlapping (stippled) sub-sections 1922. A user device in one of the non-overlapping sub-sections 1921 determines that the best signal quality corresponds to one of the beams, whereas a user device in one of the overlapping sub-sections 1922 determines that two of the beams provide about the same high signal quality. Therefore, the user device can determine which sub-section it is in by comparing the signal quality for each of the four beams, and determining whether the signal quality for one of them is substantially better than any of the other beams, and if not, which two of the partially-overlapping beams provide about the same high signal quality. The user device can thereby determine its sub-section, with an angular resolution of about 6 or 7 degrees in this case.

Figure 19D:
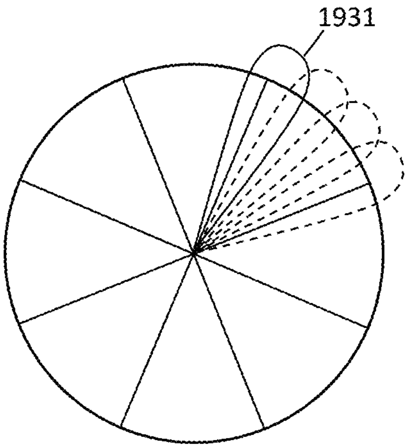
FIG. 19D is a schematic showing an exemplary embodiment of four overlapping beams, according to some embodiments.

FIG. 19D is a schematic showing an exemplary embodiment of four partially-overlapping beams, according to some embodiments. As depicted in this non-limiting example, four 19-degree partially-overlapping transmission beams 1931 are configured to produce regions wherein the signal is dominated by one of the beams, alternating with regions wherein two of the beams produce about equal signals. Hence a user device can measure the signal quality for each of four test signals, determine whether high signal quality is provided in just one of the test signals, or whether two of the test signals provide comparable high signal quality. The user device can thereby indicate which sub-section it is in.

Figure 20A:
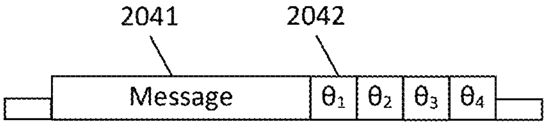
FIG. 20A is a schematic showing an exemplary embodiment of a message with multiple signals transmitted in different directions, according to some embodiments.

FIG. 20A is a schematic showing an exemplary embodiment of a message with multiple beam-test signals transmitted in different directions, according to some embodiments. As depicted in this non-limiting example, a message 2041 may include, in this case, four test signals 2042, such as demodulation references, transmitted in various directions, as indicated by $\theta_1$ etc. For example, the various beams 1914 as in FIG. 19B, or the narrower fine-tuning beams 1931 as in FIG. 19D, may be used for transmitting the test signals 2042. The user device can then indicate which of the beams, or their overlap regions, provides the best signal quality. In the depicted embodiment, the four test signals 2042 are provided at the end of the message 2041. In another embodiment, one or two of the test signals 2042 may be placed before the message 2041. One of the test signals 2042 may be transmitted in the same transmission beam as the message 2041 and therefore can be used for calibrating the modulation levels and demodulating the message. The other test signals 2042 can serve as phase-tracking references, for enhanced phase-noise rejection.

Figure 20B:
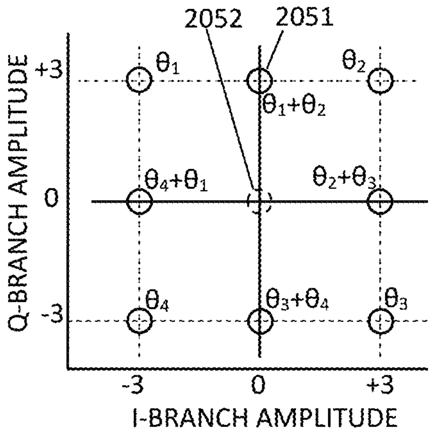
FIG. 20B is a constellation chart showing an exemplary embodiment of a feedback procedure to select seven or eight angular directions, according to some embodiments.

FIG. 20B is a constellation chart showing an exemplary embodiment of a feedback procedure to select one of eight angular directions, according to some embodiments. As depicted in this non-limiting example, eight states 2051 of 8QAM are shown. Each state 2051 can represent one of the sections of FIG. 19A, or one of the subsections of FIG. 19C, and can thereby enable the user device to select the beam direction or overlap that provides the best signal quality, using just a single modulated resource element for the feedback.

The central zero state 2052 is not needed in this example. In other embodiments, requiring nine selection choices, the zero state 2052 may be used.

Suitable for Standards

Due to the many options and variations disclosed herein, and other versions derived therefrom by artisans after reading this disclosure, it would be helpful for a wireless standards committee to establish conventions governing formats and implementation options for efficient feedback procedures, such as those disclosed. Beneficial realtime beam adjustment and power adjustment, and corresponding feedback procedures, may enable users to communicate in 5G and 6G multi-GHz bands with increased reliability, while avoiding unnecessary signaling and delays.

The wireless embodiments of this disclosure may be aptly suited for cloud backup protection, according to some embodiments. Furthermore, the cloud backup can be provided cyber-security, such as blockchain, to lock or protect data, thereby preventing malevolent actors from making changes. The cyber-security may thereby avoid changes that, in some applications, could result in hazards including lethal hazards, such as in applications related to traffic safety, electric grid management, law enforcement, or national security.

In some embodiments, non-transitory computer-readable media may include instructions that, when executed by a computing environment, cause a method to be performed, the method according to the principles disclosed herein. In some embodiments, the instructions (such as software or firmware) may be upgradable or updatable, to provide additional capabilities and/or to fix errors and/or to remove security vulnerabilities, among many other reasons for updating software. In some embodiments, the updates may be provided monthly, quarterly, annually, every 2 or 3 or 4 years, or upon other interval, or at the convenience of the owner, for example. In some embodiments, the updates (especially updates providing added capabilities) may be provided on a fee basis. The intent of the updates may be to cause the updated software to perform better than previously, and to thereby provide additional user satisfaction.

The systems and methods may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, or sooner, are loaded into random access memory. Inputs to the application, e.g., from the plurality of users or from any one user, may be by any number of appropriate computer input devices. For example, users may employ vehicular controls, as well as a keyboard, mouse, touchscreen, joystick, trackpad, other pointing device, or any other such computer input device to input data relevant to the calculations. Data may also be input by way of one or more sensors on the robot, an inserted memory chip, hard drive, flash drives, flash memory, optical media, magnetic media, or any other type of file-storing medium. The outputs may be delivered to a user by way of signals transmitted to robot steering and throttle controls, a video graphics card or integrated graphics chipset coupled to a display that may be seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or Wi-Fi-connected device downloads a copy of the application to their device from a server using a wireless Internet connection. An appropriate authentication procedure and secure transaction process may provide for payment to be made to the seller. The application may download over the mobile connection, or over the Wi-Fi or other wireless network connection. The application may then be run by the user. Such a networked system may provide a suitable computing environment for an implementation in which a plurality of users provide separate inputs to the system and method.

It is to be understood that the foregoing description is not a definition of the invention but is a description of one or more preferred exemplary embodiments of the invention. The invention is not limited to the particular embodiments(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms “for example”, “e.g.”, “for instance”, “such as”, and “like” and the terms “comprising”, “having”, “including”, and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

The invention claimed is:

1. A method for a first wireless entity to communicate with a second wireless entity, the method comprising:

transmitting a first message concatenated with a “higher” test signal, and a “lower” test signal, wherein the downlink message is transmitted with an initial value of a transmission parameter, the higher test signal is transmitted with a higher value of the transmission parameter higher than the initial value, and the lower test signal is transmitted with a lower value of the transmission parameter lower than the initial value;

receiving a feedback message from the second wireless entity indicating that the first message, or the higher test signal, or the lower test signal, was received with a best signal quality;

adjusting the transmission parameter to an adjusted value, according to the feedback message; and transmitting an acknowledgement message to the second wireless entity according to the adjusted value of the transmission parameter;

wherein the feedback message comprises exactly one resource element indicating that the first message, or the higher test signal, or the lower test signal, was received with the best signal quality;

wherein: the feedback message is concatenated with a third test signal and a fourth test signal, wherein the third test signal is transmitted with a higher value of the transmission parameter higher than the feedback message, and wherein the fourth test signal is transmitted with a lower value of the transmission parameter lower than the feedback message; and wherein the method further comprises transmitting, by the first wireless entity, to the second wireless entity, an additional message indicating that the feedback message, or the third test signal, or the fourth test signal, was received with a best signal quality.

2. The method of claim 1, wherein the first message is transmitted according to 5G or 6G technology.

3. The method of claim 1, wherein: when the feedback message indicates the higher test signal, the adjusted value equals the higher value; when the feedback message indicates the lower test signal, the adjusted value equals the lower value; and when the feedback message indicates the first message, the adjusted value equals the initial value.

4. The method of claim 1, wherein: when the feedback message indicates the higher test signal, the adjusted value equals the initial value plus a predetermined increment; when the feedback message indicates the lower test signal, the adjusted value equals the initial value minus the predetermined increment; and when the feedback message indicates the first message, the adjusted value equals the initial value.

5. The method of claim 4, further comprising: increasing the predetermined increment by a predetermined factor after either: adjusting the transmission parameter to higher values twice in succession; or adjusting the transmission parameter to lower values twice in succession; and decreasing the predetermined increment to a predetermined minimum size after either: adjusting the transmission parameter to higher and then lower values in succession; or adjusting the transmission parameter to lower and then higher values in succession.

6. The method of claim 5, further comprising: recording each adjusted value of the transmission parameter in a memory; and upon determining that the transmission parameter is to be set to a value already recorded in the memory, decreasing the predetermined increment to the predetermined minimum size.

7. The method of claim 1, wherein the higher test signal comprises exactly one resource element and the lower test signal comprises exactly one resource element.

8. The method of claim 1, wherein the feedback message comprises an acknowledgement multiplexed or concatenated with exactly one resource element, wherein the exactly one resource element indicates that the first message, or the higher test signal, or the lower test signal, was received with the best signal quality.

9. The method of claim 1, wherein the first wireless entity comprises a first user device, the second wireless entity comprises a second user device, and the first message is transmitted on a frequency band reserved for sidelink communications.

10. The method of claim 1, wherein the signal quality of each test signal comprises at least one of: a received amplitude of the test signal; a received power level of the test signal; a signal-to-noise ratio of the test signal; a difference between a modulation of the test signal and a predetermined modulation of a modulation scheme; and combinations of these.

11. The method of claim 1, wherein the transmission parameter comprises at least one of: a transmission direction or angle; a transmission power level; a transmission beam width; a polarization; an elevation angle; and combinations of these.

* * * * *